United States Patent
Bauer et al.

(10) Patent No.: US 6,415,028 B1
(45) Date of Patent: *Jul. 2, 2002

(54) SYSTEM AND METHOD THAT ALLOWS A TELEPHONE DATA REPOSITORY TO COMMUNICATE WITH AN EXTERNAL SYSTEM

(75) Inventors: Deborah Bauer, Leesburg; Samuel S. Howlette, Great Falls, both of VA (US); Kevin Germann, Gatineau (CA); Susan Jane McQuigge Ernst, Gloucester (CA); Francis Cornelius Sommers, Ottawa (CA); Mike Cavanagh, Woodlawn (CA); William Kayln, Kanata (CA); Ross Edward Button, Ontario (CA); Steve Sauve, Orleans (CA); Ralph Holmes, Glenn Dale, MD (US)

(73) Assignee: MCI Communications Corporation, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/167,956

(22) Filed: Oct. 6, 1998

Related U.S. Application Data

(63) Continuation of application No. 08/897,906, filed on Jul. 21, 1997.

(51) Int. Cl.[7] .......................... H04M 3/54; H04M 7/00; G06F 17/30

(52) U.S. Cl. ........................ 379/221.13; 707/7; 707/523
(58) Field of Search .................................. 379/112, 113, 379/207, 219, 220, 221, 229, 230, 112.01, 201.01, 211.02, 220.01, 221.13; 707/7, 523

(56) References Cited

U.S. PATENT DOCUMENTS 5,218,632 A    6/1993    Cool (List continued on next page.)

FOREIGN PATENT DOCUMENTS

EP    0710042 A2    1/1996

OTHER PUBLICATIONS

Lane, M., Data Communication Software Design, Boyd & Fraser Publishing Company, 1985, pp. 116–117
Newton, "Newton's Telecom Dictionary," Flatiron Publishing, Inc., 1994, p. 714.

*Primary Examiner*—Harry S. Hong

(57) ABSTRACT

The present invention allows a telephone data repository to communicate with an external system, the interface system comprising a first communications link connecting the telephone data repository to an interface, a second communications link connecting the interface to the external system, and the interface configured to retrieve a plurality of telephone data from the telephone data repository via the first communications link, format the plurality of telephone data into a plurality of formatted telephone data that is compatible with the external system, and to send the plurality of formatted telephone data to the external system via the second communications link. The present invention also provides a method that allows a telephone data repository to communicate with an external system, comprising the steps of connecting to the telephone data repository via a first communications link, connecting the external system via a second communications link, retrieving a plurality of telephone data from the telephone data repository via the first communications link, formatting the plurality of telephone data into a plurality of formatted telephone data that is compatible with the external system, and sending the plurality of formatted telephone data to the external system via the second communications link.

28 Claims, 36 Drawing Sheets

U.S. PATENT DOCUMENTS

| | | | | |
|---|---|---|---|---|
| 5,325,290 A | | 6/1994 | Cauffman et al. | |
| 5,333,183 A | | 7/1994 | Herbert | |
| 5,384,822 A | | 1/1995 | Brown et al. | |
| 5,546,574 A | | 8/1996 | Grosskopf et al. | |
| 5,566,235 A | | 10/1996 | Hetz | |
| 5,606,600 A | | 2/1997 | Elliot et al. | |
| 5,625,681 A | | 4/1997 | Butler, II | |
| 5,625,816 A | | 4/1997 | Burdick et al. | |
| 5,703,939 A | | 12/1997 | Bushnell | |
| 5,715,303 A | | 2/1998 | Marks et al. | |
| 5,717,745 A | | 2/1998 | Vijay et al. | |
| 5,717,749 A | * | 2/1998 | Sneed, Jr. et al. | 379/207 |
| 5,734,705 A | | 3/1998 | Scholossman et al. | |
| 5,757,895 A | | 5/1998 | Aridas et al. | |
| 5,761,272 A | | 6/1998 | Williams et al. | |
| 5,764,745 A | | 6/1998 | Chan et al. | |
| 5,765,172 A | | 6/1998 | Fox | |
| 5,774,532 A | | 6/1998 | Gottlieb et al. | |
| 5,784,443 A | | 7/1998 | Chapman et al. | |
| 5,787,147 A | | 7/1998 | Gundersen | |
| 5,793,861 A | | 8/1998 | Haigh | |
| 5,809,108 A | | 9/1998 | Thompson et al. | |
| 5,832,068 A | | 11/1998 | Smith | 379/114.14 |
| 5,835,497 A | | 11/1998 | Litzenberger et al. | |
| 5,835,757 A | | 11/1998 | Oulid-Aissa et al. | |
| 5,854,834 A | | 12/1998 | Gottieb et al. | |
| 5,883,948 A | | 3/1999 | Dunn | |
| 5,896,440 A | | 4/1999 | Reed et al. | |
| 5,901,215 A | | 5/1999 | Dezenno | |
| 5,903,632 A | | 5/1999 | Brandon | |
| 5,910,983 A | | 6/1999 | Dezonno et al. | |
| 5,912,962 A | | 6/1999 | Bosco | |
| 5,933,489 A | | 8/1999 | Sensabaugh et al. | |
| 5,940,492 A | | 8/1999 | Galloway et al. | |
| 5,949,867 A | | 9/1999 | Sonnnberg | |
| 5,951,654 A | | 9/1999 | Avsan et al. | |
| 5,978,464 A | | 11/1999 | Sonnenberg | |
| 5,987,114 A | | 11/1999 | Sonnenberg | |
| 6,047,045 A | | 4/2000 | Sommers et al. | 379/26.01 |
| 6,058,175 A | | 5/2000 | Schultz | 379/201 |
| 6,064,887 A | | 5/2000 | Kallioniemi et al. | |
| 6,067,354 A | * | 5/2000 | Bauer et al. | 379/113 |
| 6,122,362 A | | 9/2000 | Smith et al. | 379/230 |
| 6,169,793 B1 | | 1/2001 | Godwin et al. | 379/221.13 |

* cited by examiner

MINA/SMS Interface Response to Terminate Signal

MINA/SMS Interface Response to Suspend Signal

MINA/SMS Interface Response to Resume Signal

MINA/SMS Interface Initialization Process (404)

"Received" Message Process
(594, 604, 640)

"Waiting" Message Process (598, 606)

ARIS Request Processing Interface (210)

ARIS Interface Response to Terminate Signal

**NCS Interface
Response to Terminate Signal**

**NCS Interface
Response to Suspend Signal**

**NCS Interface
Response to Resume Signal**

**NCS Interface
NCS Partner Reply Processing (1252)**

**NCS Interface
Database Updating Process (1132)**

SYSTEM AND METHOD THAT ALLOWS A TELEPHONE DATA REPOSITORY TO COMMUNICATE WITH AN EXTERNAL SYSTEM

The present application is a continuation of U.S. application Ser. No. 08/897,906, filed Jul. 21, 1997, and entitled "System and Method for Achieving Local Number Portability."

FIELD OF THE INVENTION

The present invention relates in general to the field of telecommunications and more specifically to a system and method that allows a telephone data repository to communicate with an external system.

BACKGROUND OF THE INVENTION

Without limiting the invention, its background is described in connection with local telephone services and providers of such services. In general, the telecommunications industry has evolved into a highly competitive and sophisticated network of equipment manufacturers and service providers. Since the early 1980s, the industry has seen a shift from pure analog techniques over copper wire to digital techniques over optical fiber. Today, customers can choose from a large array of consumer telecommunications services including local and long distance calling, 800 and 900 calling accounts, TCP/IP (i.e. the "Internet") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may consume a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network ("PSTN") comprises the telecommunications backbone for most voice/data traffic in the world. For most local and long distance telephone calls a local telephone company acts as a local entry point to the PSTN. Typically, a Local Routing Number ("LRN") is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until the present invention, there was no way to port a customer's number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Until the present invention, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan, to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Thus, a need exists for a system and method of achieving local number portability on a nationwide basis. A system and method of sharing a single telephone number over different local exchange carriers would fill a void not presently addressed by the prior art.

SUMMARY OF THE INVENTION

The present invention allows a telephone data repository to communicate with an external system, the interface system comprising a first communications link connecting the telephone data repository to an interface, a second communications link connecting the interface to the external system, and the interface configured to retrieve a plurality of telephone data from the telephone data repository via the first communications link, format the plurality of telephone data into a plurality of formatted telephone data that is compatible with the external system, and to send the plurality of formatted telephone data to the external system via the second communications link.

In addition, the present invention provides an interface that allows a telephone data repository to communicate with an external system, the interface system comprising a first communications link connecting an interface to the external system, a second communications link connecting the interface to a data distribution subsystem, a third communications link connecting the data distribution subsystem to the telephone data repository, and the interface configured to retrieve a plurality of telephone data from the telephone data repository via the first communications link, format the plurality of telephone data into a plurality of formatted telephone data that is compatible with the external system, and to send the plurality of formatted telephone data to the external system via the second communications link.

The present invention also provides a method that allows a telephone data repository to communicate with an external system, comprising the steps of connecting to the telephone data repository via a first communications link, connecting the external system via a second communications link, retrieving a plurality of telephone data from the telephone data repository via the first communications link, formatting the plurality of telephone data into a plurality of formatted telephone data that is compatible with the external system, and sending the plurality of formatted telephone data to the external system via the second communications link.

The present invention provides a hardware and software platform to effect the porting of local telephone numbers from one service provider to another. The systems and subsystems of the invention are designed to communicate with a Number Portability Administration Center and Service Management System ("NPAC/SMS") which receives and stores updated customer routing information and makes it available to participating service providers. The NPAC/SMS contains a record of all ported numbers and a history file of all transactions relating to the porting of a number.

The present invention provides a system for Local Number Portability ("LNP") that submits service orders changes to a NPAC/SMS. In this regard, a Service Order Administration ("SOA") Subsystem is provided as means of entering and submitting services order changes to the NPAC/SMS via an interface that supports the retrieval and update of subscription, service provider and network information. A graphical user interface or a message-based interface to a service provider's upstream systems is used for this purpose.

The present invention provides a facility for administering the service provider subscription information relating to a particular customer. In this regard, the SOA is equipped with a host of functions for creating, canceling, acknowledging, modifying, retrieving, activating, disconnecting and removing subscription version information. The SOA has an audit capability that permits audits of a customer's porting activity based on a telephone number and receives notifications from the NPAC/SMS to ensure that it is fully informed of relevant events relating to a service provider's subscriptions.

The present invention provides the interface structures that permit service providers to read and update their own service provider information within the NPAC/SMS. In this regard, the interface permits service providers to update the information in their service provider profile as well as add and delete their own network data. The information is accessible to all service providers via a standard interface to assure correct call routing.

The present invention provides a system that interfaces directly with existing telecommunication equipment operated by all service providers. In this regard, a new service provider can obtain authorization to port a customer using a standardized message format that notifies the old service provider according to processes internal to the old service provider. The messaging format includes signal protocols that can be used by both the old and new service providers to sends update notifications to the NPAC/SMS using the SOA. Upon receipt of the notification(s), the NPAC/SMS performs certain validation checks, and attempts to match a notification received from the new service provider with a concurring notification that may be sent from the old service provider, permitting the two service providers to complete the port.

The present invention provides a means of downloading subscription and network data from the NPAC/SMS to the local service provider's applications for correct call routing and network provisioning. In this regard, an Interface Broadcast Agent ("IBA") Subsystem is provided as a means of interfacing a service provider's downstream systems with the NPAC/SMS. In one embodiment, the IBA Subsystem is configured to automatically receive new network or subscription data or modifications to existing data. The IBA Subsystem may also request data using a download request. The request can be based on a time period, telephone number, telephone number range or other indicator. The service provider can also directly read the data from the NPAC/SMS.

The present invention provides the software and hardware platforms for achieving Local Number Portability. A central or regionalized database is used to keep track of local numbers and the corresponding local service provider that services each number. Service providers interface with the database and obtain information at the telephone number level that permits individual providers to determine which carrier is providing service to which telephone number. A neutral third party maintains and administers the database allowing free access by any participating provider. Methods for transferring a customer's port data from an old service provider to a new service provider are also disclosed.

Disclosed, in one embodiment, is a system for maintaining a customer's local telephone number when a switch is made from a current service provider to a new service provider. The system uses a regional number portability subsystem containing a plurality of telephone number porting data defining how to route a call from one service provider to another. A service order administration application is communicably linked to the regional number portability subsystem and configured to send a porting request for a specific customer to the portability subsystem and the service providers interfaced to the portability subsystem. A local service management application is communicably linked to the regional number portability subsystem via a second data pathway and configured to receive the porting data. The local service management application supports the interface to the second service provider and delivers the porting request containing the new routing data for the customer allowing the service provider to continue to route calls to the customer at their existing telephone number once the switch is made.

The local service management application supports a host of interface processing applications used for porting a customer's telephone number among different service providers once the port request has been arranged between the old and new service providers. An interface processing application processes messages from a system's Interface Broadcast Agent Repository ("IBAR") into a defined format compatible with a local service providers downstream interface system and ports a customer's present telephone service information from a IBAR database to a second service provider's downstream interface system. The interface processing application updates the IBAR to reflect the current status of processed messages.

For a more complete understanding of the present invention, including its features and advantages, reference is now made to the following detailed description, taken in conjunction with the accompanying drawings.

BRIEF DESCRIPTION OF THE DRAWINGS

Corresponding numerals in the drawings refer to corresponding parts unless otherwise indicated.

DETAILED DESCRIPTION OF THE INVENTION

Throughout the following description, the terms "interface", "line", "lines", "link", "communications link", "inbound link" and/or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the Unix operating system structure and associated protocols. Such conventions are well known to those skilled in the art.

Figure 1:
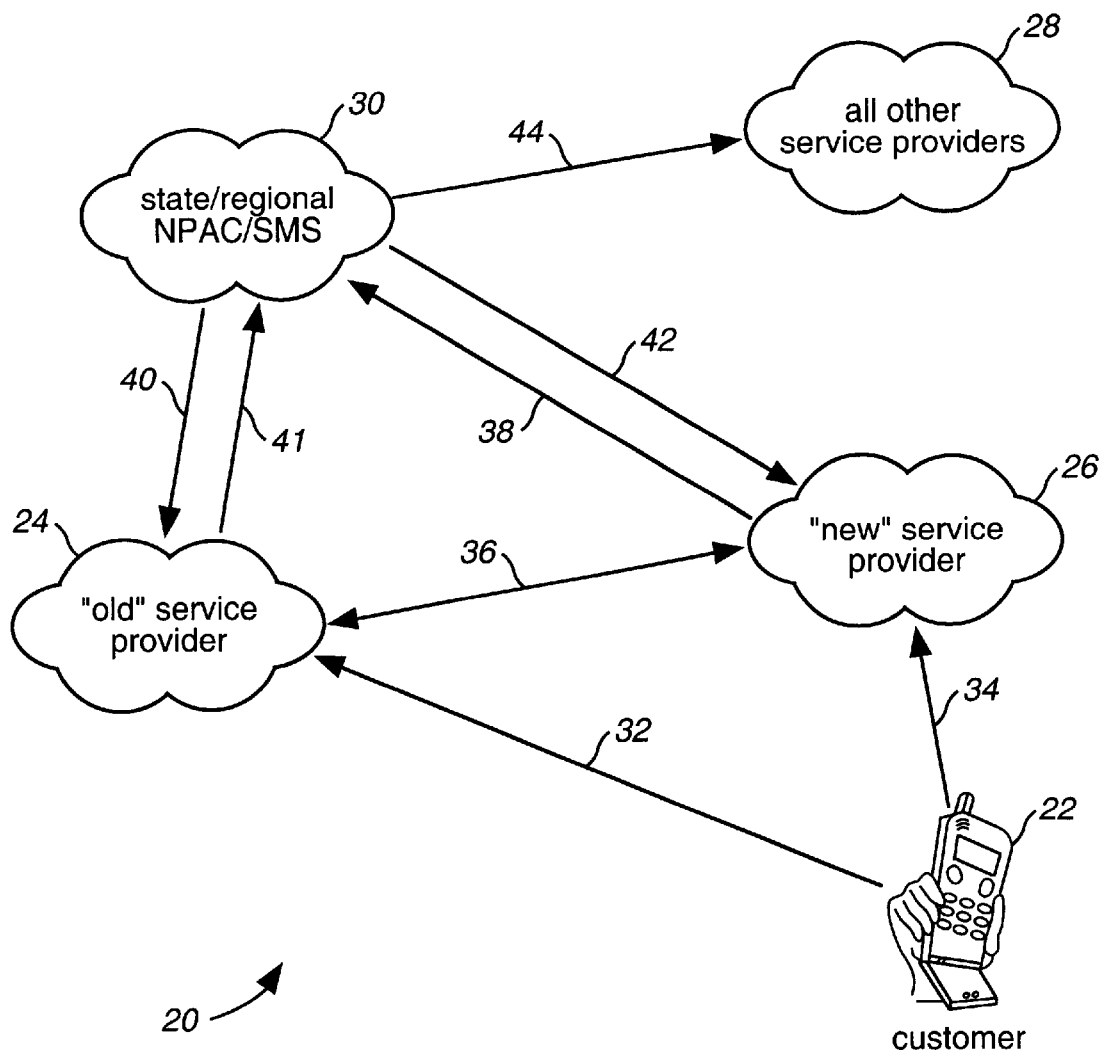
FIG. 1 is an overall process flow diagram for the method used to transfer a customer's port data from an old service provider to a new service provider according to one embodiment of the invention.

Turning now to FIG. 1, a flow diagram of a telephone number porting process, denoted generally as 20, is shown. In general, the telephone number porting process 20, which achieves Local Number Portability ("LNP"), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. Thereafter, the old service provider 24 and new service provider 26 arrange the port details for the customer's telephone number as denoted by line 36.

Once the new service provider 26 obtains the customer's port request, the new service provider 26 notifies a Number Portability Administration Center and Service Management System ("NPAC/SMS") 30, which maintains a centralized regional number database for all customers in a given region, of the pending port as denoted by line 38. Alternatively, the old service provider 24 can notify the NPAC/SMS 30 of the pending port as denoted by line 41.

When the NPAC/SMS 30 receives the notification it performs certain validation checks. If the NPAC/SMS 30 only received a notification from one of the involved service providers, either the old service provider 24 or the new service provider 26, will notify the service provider that failed to sent a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or the new service 26 provider sends and activation notice to the NPAC/SMS 30. The NPAC/SMS 30 activates the port of the customer's telephone number by sending the new port data to the old service provider 24 as denoted by line 40, the new service provider 26 as denoted by line 42, and all other service providers 28 as denoted by line 44. This ensures proper call routing to the customer because all the service providers in the region 24, 26, and 28 can update their networking equipment accordingly.

If during the validation process described above the old service provider 24 failed to respond, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMS 30 will place the notification in a "conflict" state and notify the conflicting service providers 24, 26 or 28 of the conflict status. The conflicting service providers 24, 26 or 28 will determine who will serve the customer 22 using appropriate internal conflict resolution procedures. If the conflict is resolved, the NPAC/SMS 30 will remove the notification from the "conflict" once it is notified of the resolution and the process proceeds normally as described above. Alternatively, the new service provider 26 can cancel the port request.

The present invention incorporates significant advantages over the prior art in that it allows for the sending and receiving of porting data from regional databases, which are maintained at the NPAC/SMS 30, and provides a smooth transition from the old service provider 24 to the new service provider 26.

Figure 2:
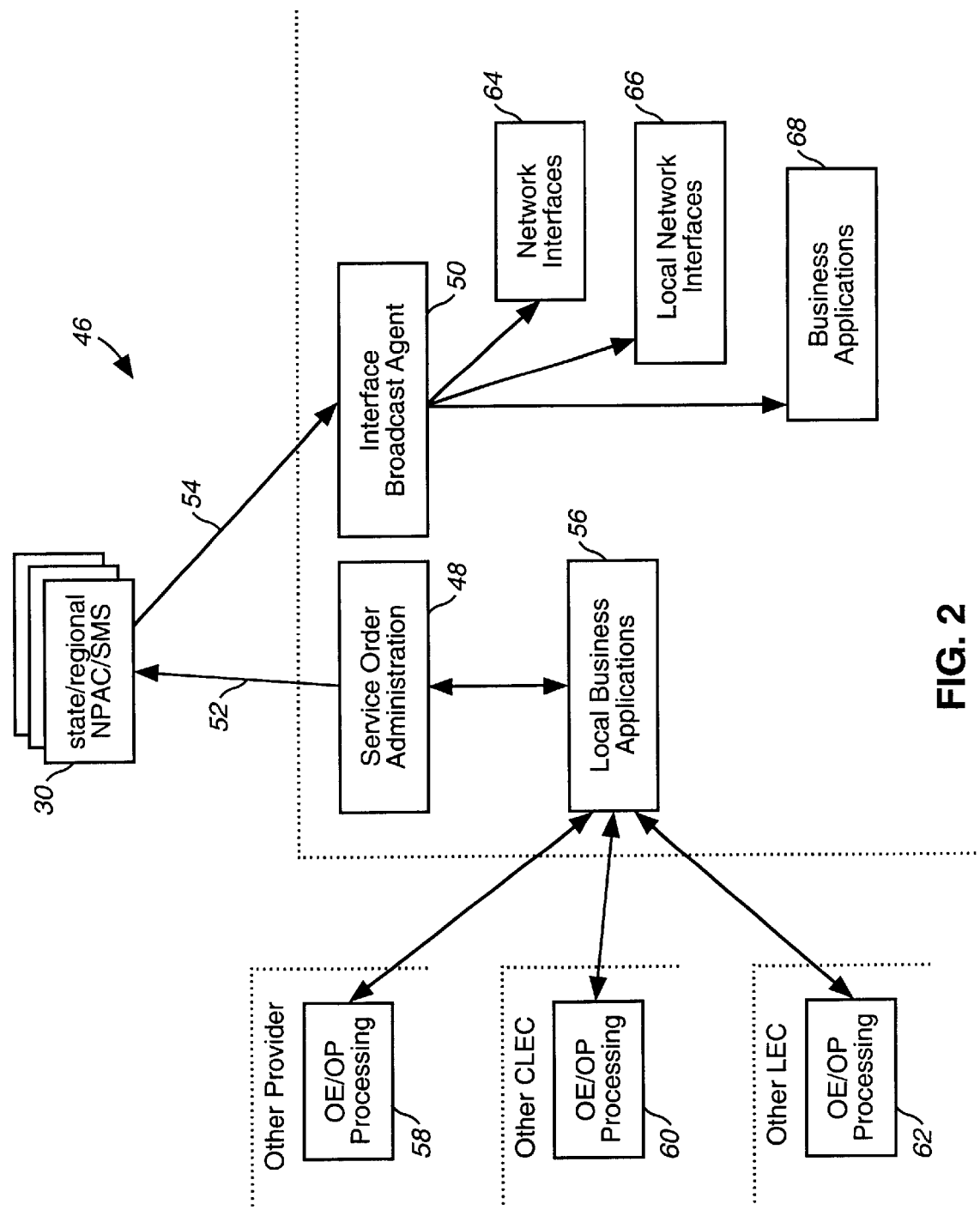
FIG. 2 is a high level block diagram for the interface between a Service Order Administration ("SOA"), an Interface Broadcast Agent ("IBA") and a regional number portability administration center according to one embodiment of the invention.

Turning now to FIG. 2, a block diagram of a system for achieving local number portability is shown and denoted generally as 46. The NPAC/SMS 30 is communicably linked to two functional subsystems, a Service Order Administration ("SOA") Subsystem 48 and an Interface Broadcast Agent ("IBA") Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing ("OE/OP") systems of other service providers 58, other Complex Local Exchange Carriers ("CLEC") 60, and other Local Exchange Carriers ("LEC") 62, depending on the existing network of service providers. The SOA Subsystem 48 acts as an intermediary between the local applications 56 and the NPAC/SMS 30, thus providing a smooth non-intrusive solution for local number portability.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distances networks and 800 services.

For example, business applications 68 can comprise a database of records for all provider systems needing access to the customer porting data, such as the Automatic Number Identifier ("ANI") reference information system. The local network interfaces 66 can be an intelligent network architecture that supports routing queries during call processing. The network interface 64 can include the Metro Intelligent Network Architecture that forms a tie-in into available communications services. Such services may include an 800 or 900 service or other similar offerings that may require access to the port data through a regional toll switch network from the NPAC/SMS 30 for correct call servicing and routing.

Figure 3:
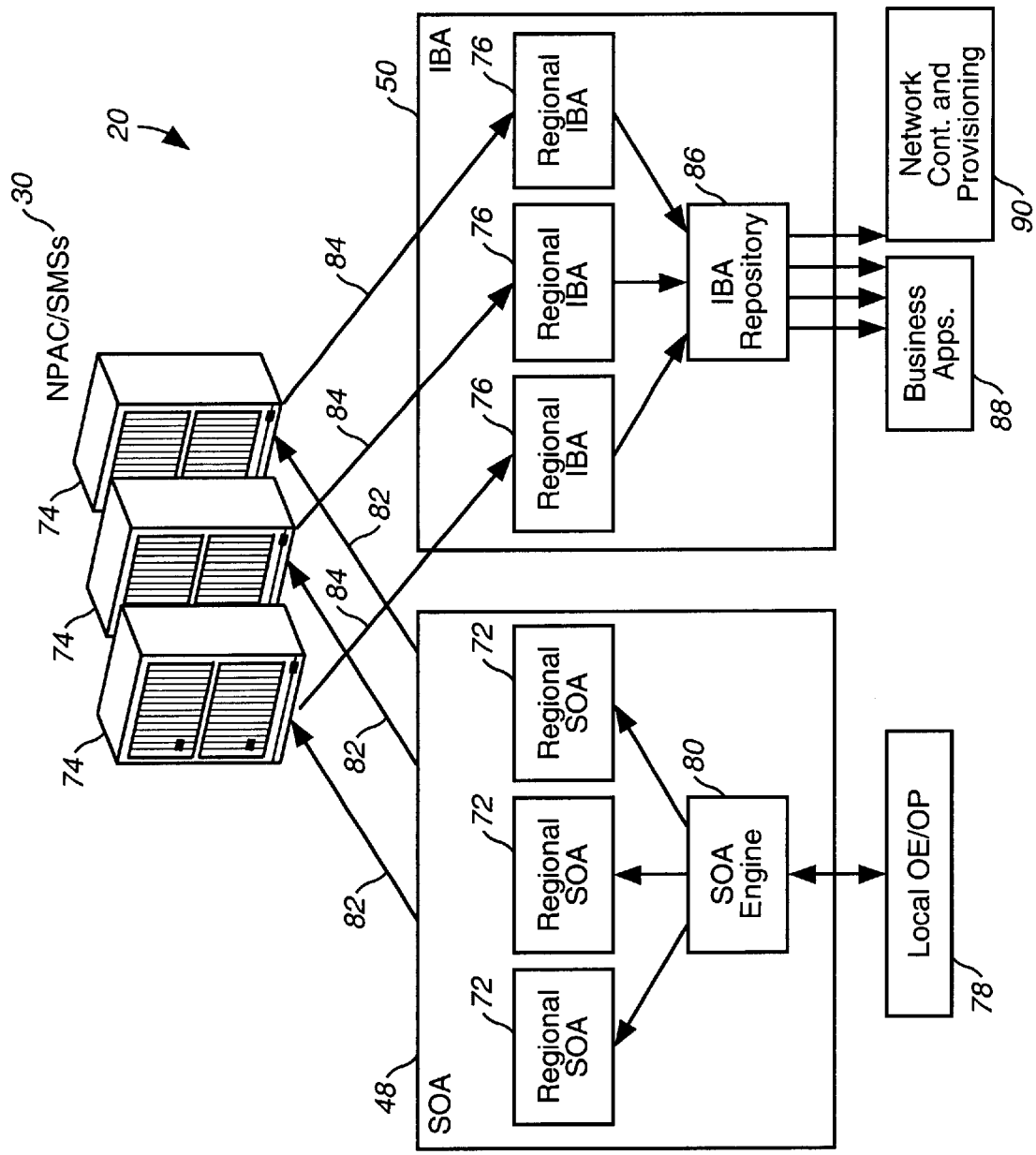
FIG. 3 is a block diagram of the SOA and IBA Subsystems and their interface to various business applications.
Figure 4:
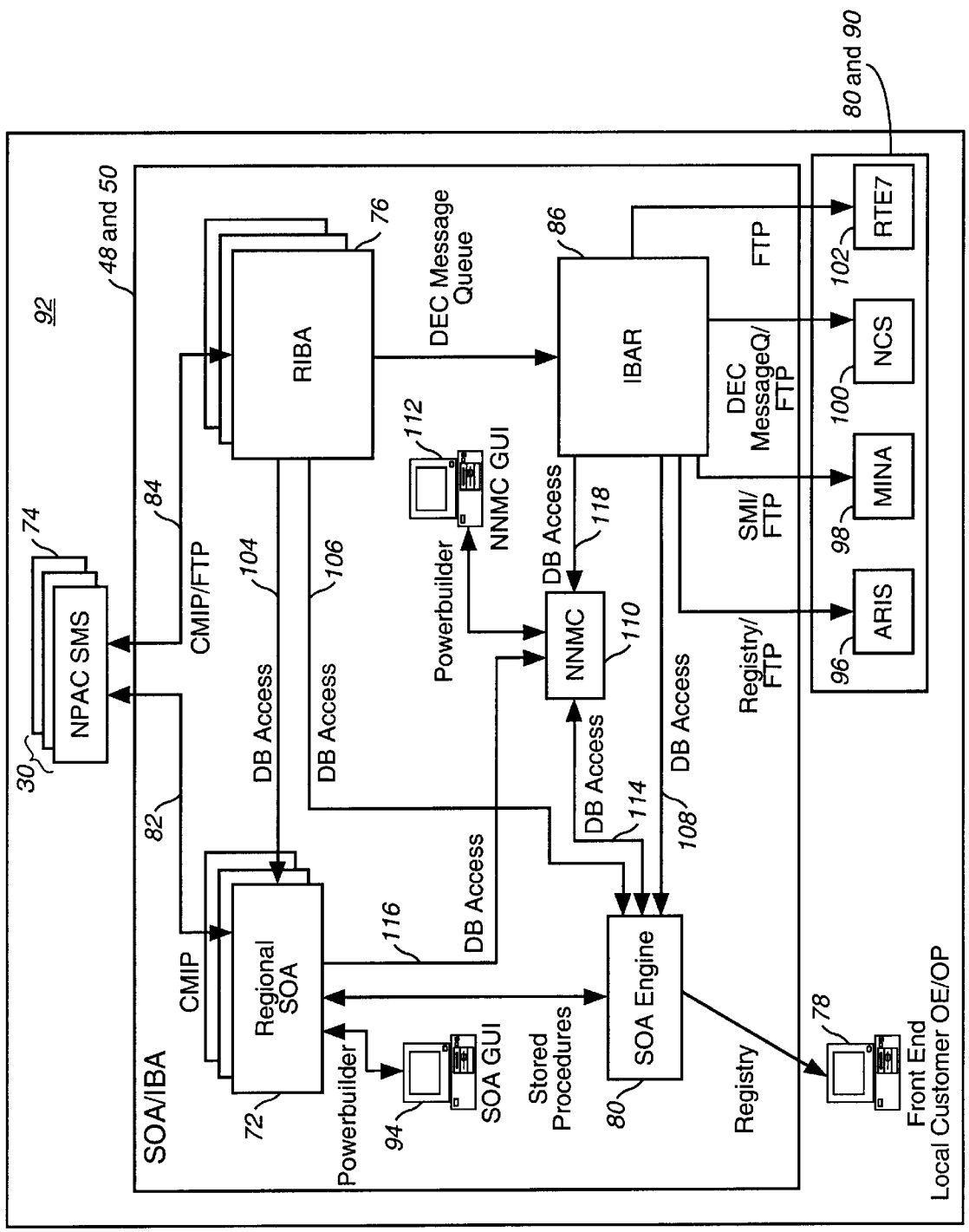
FIG. 4 is a block diagram of an alternative embodiment of the present invention with a National Network Management Center.

Turning now to FIGS. 3 and 4, the interaction between the NPAC/SMS 30, the SOA Subsystem 48 and the IBA Subsystem 50 will be described. The Local Number Portability System of FIG. 3 is denoted generally as 70, whereas the Local Number Portability System of FIG. 4 is denoted generally as 92. Local Customer Order Entry and Order Processing ("OE/OP") Systems (collectively referred to as the "Front End") 78 send and receive LNP transactions or messages to and from a local SOA Engine 80, which is an interface that routes the LNP transactions or messages to their appropriate destinations, such as the Regional SOA Subsystems 72 located in various parts of the country. In the case of FIG. 4, the SOA Engine 80 also receives and sends LNP transactions or messages from and to a SOA Graphical User Interface ("GUI") 94, and routes database queries to the RIBA 76 and IBAR 86 Subsystems. The Regional SOA 72 and SOA Engine 80 Subsystems form the SOA Subsystem 48, which provides the means for submitting customer service order changes to the Regional NPAC/SMSs 74.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the current version of the "NPAC/SMS Interoperable Interface Specification" by Lockheed Martin IMS Corporation. Communication interface 82 utilizes a Common Management Interface Protocol ("CMIP") and communication interface 84 utilizes both CMIP and File Transfer Protocols ("FTP").

Preferably some method of access control is provided to manage security issues that arise from communications between the SOA 32 and RIBA 34 Subsystems and the NPAC/SMS 74. In one embodiment, an access control field is included in messages flowing between the SOA 32 and RIBA 34 Subsystems and the NPAC/SMS 74 and carries a digital signature. As is known by those skilled in the art, a digital signature is used for authentication purposes to guarantee the identity of the message sender. For example, the access control field can include the following information:

System ID: An identifier for the system that is using the interface. This is a key element in the authentication process. While it is passed in each Protocol Data Unit, it is only really important in the association establishment.

System Type: Identifies the kind of system that is connecting: SOA, IBA, SOA and IBA or NPAC.

User Id: An optional field that passes a user Id used mostly for logging.

List Id: This is an integer that identifies the list from which a key was chosen to create the signature.

Key Id: This is an integer that identifies which key from the 1000 keys in a list was used to generate a signature.

CMIP Departure Time: This is the time at which a message was sent.

Sequence Number: This is 32 bit unsigned integer that starts at 0 and is incremented until wrapping at the maximum value.

Signature: The signature field contains the MD5 hashed and encrypted System Id, the System Type, the User Id, the CMIP Departure Time, and Sequence Number without separators between those fields or other additional characters. Encryption is done using RSA encryption using the key from the key list specified. Validation of this field ensures data integrity and non-repudiation of data.

Association Functions: These are set of flags that are set when an association is established.

Recovery Mode: The recovery mode flag is used to recover after downtime.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single IBAR Subsystem 86. As shown in FIG. 3, the IBAR Subsystem 86 is accessible by a plurality of downstream applications, such as business applications 88, and network provisioning and configuration systems 90. It should be understood, however, that any type of downstream system can be connected to the IBAR Subsystem 86 at the option of the service provider. In this way the porting data is distributed to existing network applications, such as long distance and local business, for proper call routing and processing. Similarly, FIG. 4 depicts the IBAR Subsystem 86 sending LNP data to four specific Request Processing Applications (88 and 90 of FIG. 3): an ANI Reference Information System ("ARIS") 96, Metro Intelligent Network Administration Service Management System ("MINA/SMS") 98, Network Control System ("NCS") 100 and Provisions Voice Network ("RTE7") 102.

Moreover, FIG. 4 depicts, several additional communication interfaces between the major subsystems of the LNP System 92: database access interface 104 between the Regional SOA 72 and RIBA 76 Subsystems; database access interface 106 between the RIBA 76 and SOA Engine 80 Subsystems; and database access interface 108 between the SOA Engine 80 and IBAR 86 Subsystem. A National Network Management Center ("NNMC") 110 is also shown.

The NNMC 110 is a stand-alone subsystem designed for basic querying of database information on the SOA 72 and IBAR 86 Subsystems. Accordingly, the NNMC 110 is connected through communication interfaces to the various databases in the LNP System 92: the SOA Engine Subsystem 80 through database access interface 114; the SOA Subsystem 72 through database access interface 116; and the IBAR Subsystem 86 through database access interface 118. An end-user can initiate a query using a NNMC GUI 112, which is connected to the NNMC 110. By entering a single telephone number and the database to query, either the SOA 126 (FIG. 5) or IBAR 172 (FIG. 7) Databases, an end-user can obtain such information as the LRN, effective date, service provider, action, status and telephone number range.

While FIGS. 3 and 4 depict the use of three (3) Regional SOA Subsystems 72, three (3) Regional NPAC/SMSs 74, and three (3) Regional IBA Subsystems 76, it is envisioned that each region providing local number portability, regardless of number, will have a corresponding SOA Subsystem 72, NPAC/SMS 74 and Regional IBA Subsystem 76. Moreover, while FIGS. 2, 3 and 4 illustrate various embodiments for achieving local number portability, it should be understood that other architectures may be similarly conceived and reduced to practice upon reference to this disclosure. It is anticipated therefore, that such other embodiments are well within the scope and spirit of the present invention. For example, FIGS. 5 through 8 disclose a detailed architectural design, in the form of block diagrams, for various subsystems that may be used to achieve local number portability in a preferred embodiment of the present invention.

Figure 5:
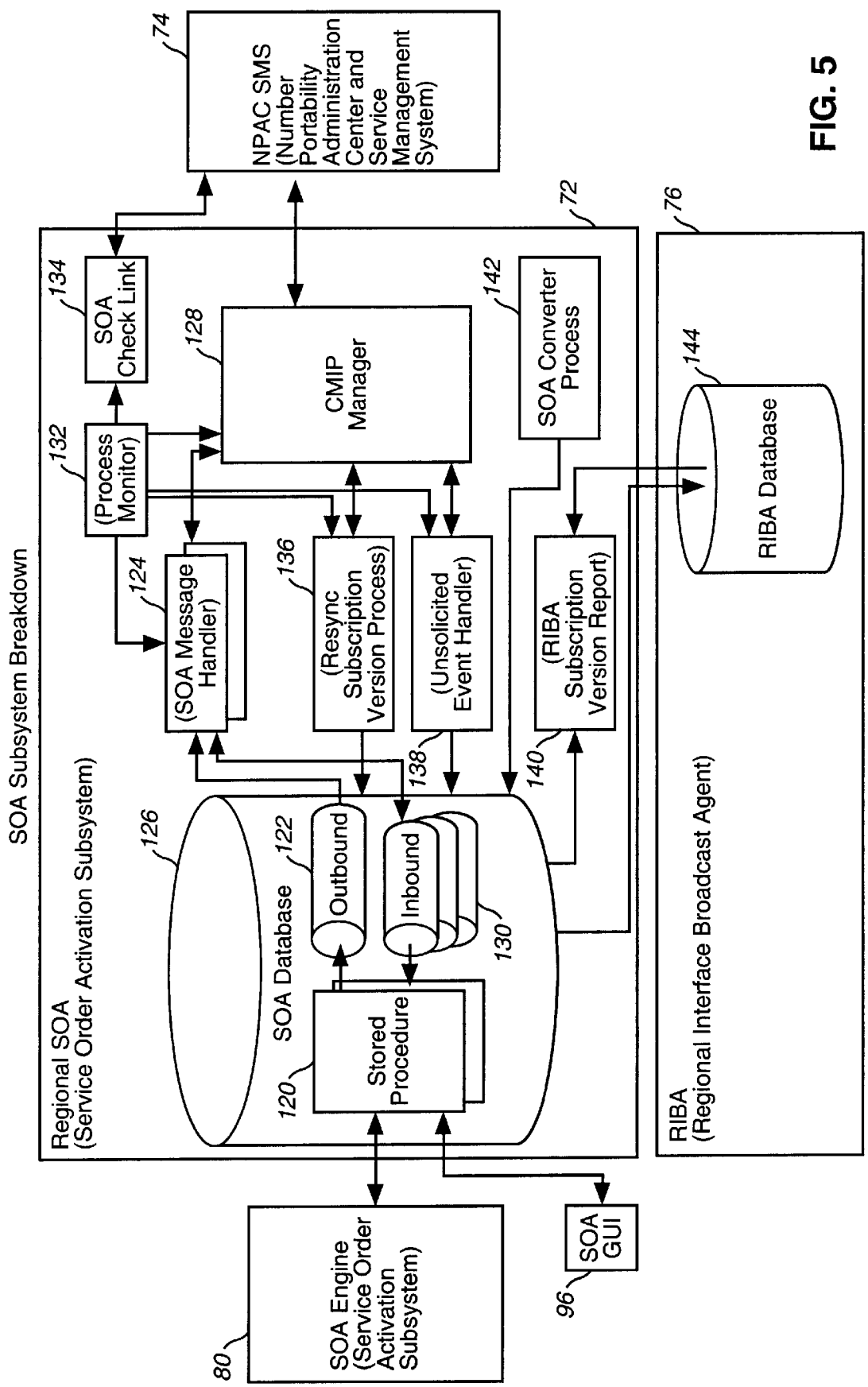
FIG. 5 is a block diagram of an SOA broken down into its component subsystems according to one embodiment.

Turning now to FIG. 5, the SOA Subsystem 72 is shown broken down into its functional components. LNP transactions, also referred to as messages or requests, originating either from the SOA Engine Subsystem 80 or an SOA GUI 94 are received through stored procedures 120, such as those used in an Oracle database structure. The stored procedures 120 send the message through a single outbound link 122 to a SOA Message Handler 124. Note that throughput can be increased by running multiple instances of the SOA Message Handler 124, each instance receiving messages from the single outbound link 122.

The SOA Message Handler 124 organizes and processes the messages by tasks that are preferably broken down at an object level, e.g., Subscription Version, Audit, Service Provider and Network. Based on a message identifier, the SOA Message Handler 124 queries the SOA Database 126 to collect and assemble any additional information required by the NPAC/SMS 74. The SOA Message Handler 124 then sends the message to the CMIP Manager 128, which is a distributed systems generator that implements the interface between the SOA Subsystem 72 and the NPAC/SMS 74, and waits for a response from the CMIP Manager 128, such as success, failure or timeout. The CMIP Manager 128 then logs and sends the message to the NPAC/SMS 74.

When the CMIP Manager 128 receives a response from the NPAC/SMS 74, the response is routed to the SOA Message Handler 124, which processes any information received with the response and updates the SOA Database 81 when required. The SOA Message Handler 124 then sends the response through an inbound link 130 to the stored procedures 120 and out to the originating SOA Engine Subsystem 80 or SOA GUI 94. All output to the stored procedures 120 is done through separate inbound links 130, one for each SOA GUI 96.

The SOA Database 126 is used to store and maintain the current telephone number information for a customer. Table 1 below is domain field listing for an SOA Database 126 according to one embodiment:

TABLE 1

Domain List for one Embodiment of the SOA Database 126.

| Name | Code | Label | Type |
|---|---|---|---|
| BillingIdentifier | BILLING_ID | Billing Identifier | VARCHA2(4) |
| BooleanIndicator | BOOL_IND | Boolean Indicator | NUMBER(1) |
| City | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(9) |
| CNAM SSN | CNAM_SSN | | NUMBER(3) |
| ContactType | CONTACT_TYP | Contact Type | VARCHAR2(2) |
| Country | COUNTRY | | VARCHAR2(20) |
| EndUserLocationType | END_USER_LOC_TYPE | | VARCHAR2(2) |

TABLE 1-continued

Domain List for one Embodiment of the SOA Database 126.

| Name | Code | Label | Type |
|---|---|---|---|
| EndUserLocationValue | END_USER_LOC_VALUE | | VARCHAR2(12) |
| Identifier | ID | | NUMBER(10) |
| Identifier | ID2 | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| NPA NXX | NPA_NXX2 | NPA-NXX | VARCHAR2(6) |
| OperationAction | OPER_ACT | Operation Action | NUMBER(3) |
| Postal Code | PC | Postal Code | VARCHAR2(40) |
| ServProvID | SP_ID | | VARCHAR2(4) |
| ServProvID | SP_ID2 | | VARCHAR2(4) |
| StateProvince | STATE_PROV | State/Province | VARCHAR2(2) |
| Status | STATUS | Status Flag | NUMBER(10) |
| SystemType | SYSTEM_TYPE | | NUMBER(1) |
| TelephoneNumber | TN | Telephone Number | VARCHAR2(10) |
| Timestamp | T2 | | DATE |
| Timestamp | T | | DATE |
| TunableName | TUNABLE_NAME | Tunable Name | VARCHAR2(40) |
| TunableValue | TUNABLE_VALUE | Tunable Value | VARCHAR2(40) |
| UserIdentifier | USER_ID | | VARCHAR2(30) |
| Zip | ZIP | | VARCHAR2(9) |

The Process Monitor creates separate instances, SOA Process Monitor 132 and RIBA Process Monitor 167, which are the parent processes for the SOA 72 and RIBA 76 Subsystems and watch over all of the standard applications or processes required to run the Subsystems 72, 76. The SOA Process Monitor 132 and RIBA Process Monitor 167 keep a table of all applications or processes spawned and operational information about each application, such as the exit status of each application. The SOA Process Monitor 132 does not, however, monitor the IBA Subscription Version Report 140 or the SOA Converter Process 142. The SOA Process Monitor 132 starts applications when they are required and is notified if an application terminates. If an application, which is intended to always be running terminates, such as the CMIP Manager 128 and Check Link 134, the The SOA Process Monitor 132 will automatically restart the terminated application.

A Resynch Subscription Version Process 136 is coupled to the SOA Database 126 and it is used to synchronize the SOA Subsystem 72 after a period of downtime. The Resynch Subscription Version Process 136 is started after the CMIP Manager 128 binds to the NPAC/SMS 74. In operation, the Resynch Subscription Version Process 136 requests from the NPAC/SMS 74, by way of the CMIP Manager 128, all subscription versions that have a modification time-stamp more recent than the last time the CMIP Manager 128 had an association with the NPAC/SMS 74. The Resynch Subscription Version Process 136 also sets a downtime flag in an audit database table to indicate that an audit was ongoing during a period of downtime.

The CMIP Manager 128 also receives notifications from the NPAC/SMS 74. These notification transactions are sent to an Unsolicited Event Handler 138 which, in turn, processes the transactions and updates the SOA Database 126 when necessary. The Unsolicited Events Message Handler 138 waits for a message to be sent from the CMIP Manager 128. When the Unsolicited Events Message Handler 138 receives a message from the CMIP Manager 128, the Unsolicited Events Message Handler 138 determines the type of message and performs the required actions for that message type. When the action is complete, the Unsolicited Events Message Handler 138 formats and sends a reply to the CMIP Manager 128, which translates the message into a CMIP event and sends the event to NPAC/SMS 74.

The IBA Subscription Version Report 140, which is monitored and controlled by the operator, is used to report discrepancies between the SOA Database 126 and the RIBA Database 144, which is located in the Regional Interface Broadcast Agent ("RIBA") Subsystem 76. The Check Link 134 monitors the physical connection between the SOA Subsystem 72 and NPAC/SMS 74 so that if the physical connection is broken, the Check Link 134 will reset the SOA Subsystem 72.

The SOA Converter Process 142 is a stand-alone process for NPA-NXX Split processing that performs a conversion of the telephone number value in the SOA Subscription Version table. Using tunable database links, the SOA Converter Process 142 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the SOA Converter Process 142 performs a telephone number conversion. Each Subscription Version is retrieved from the SOA Database 126 to determine if the telephone number contains the old NPA-NXX. If so, the telephone number is modified to the new NPA-NXX. Other processes within the SOA Subsystem 72 continue processing during the conversion.

Figure 6:
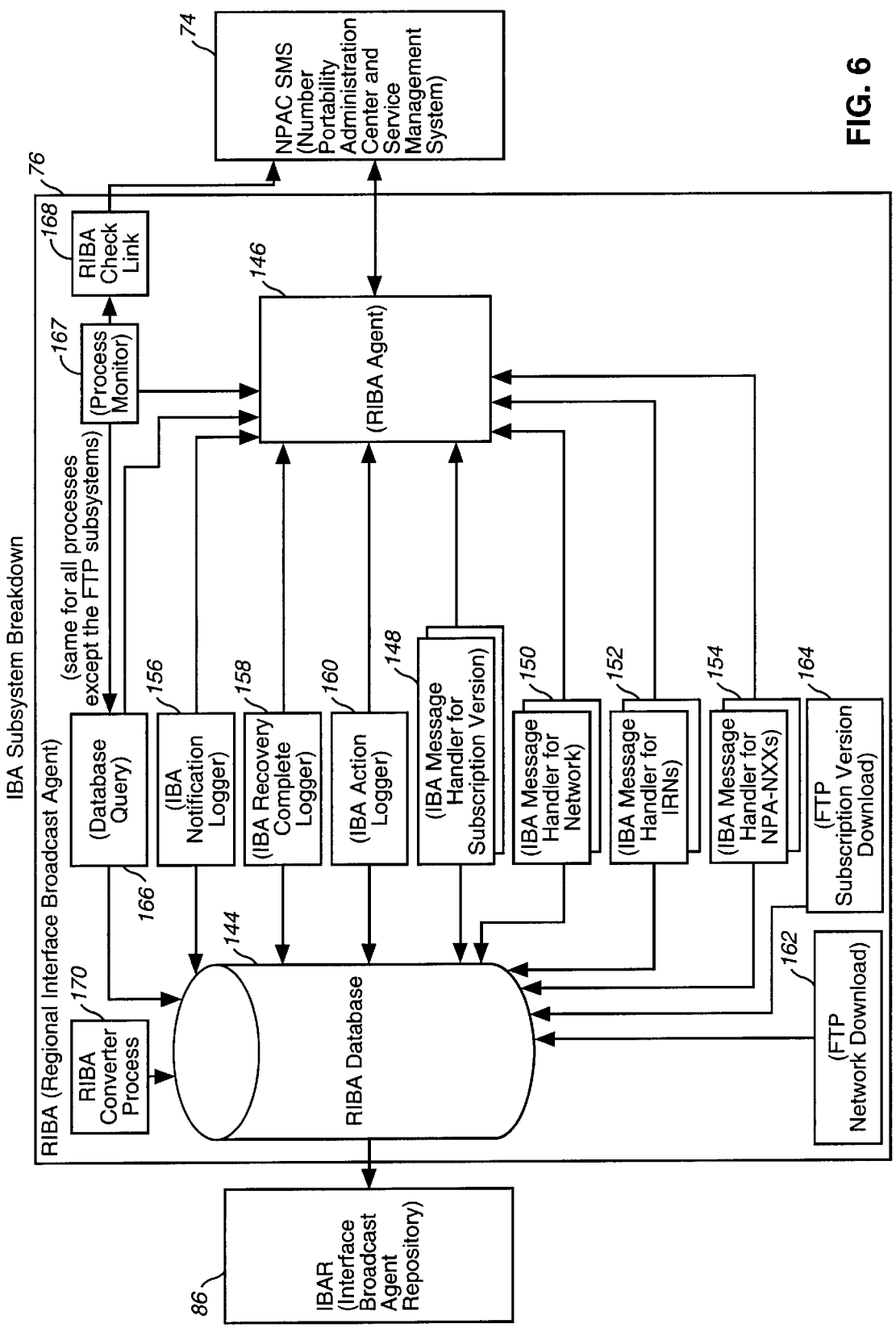
FIG. 6 is a block diagram of the IBA broken down into its component subsystems according to one embodiment.

Turning to FIG. 6, the Regional Interface Broadcast Agent ("RIBA") Subsystem 76 is broken down into its functional components. In general, the RIBA Subsystem 76 provides the interface between the NPAC/SMS 74 and the Interface Broadcast Agent Repository ("IBAR") Subsystem 86. When the NPAC/SMS 74 sends a message to the RIBA Subsystem 76, it is received by the RIBA Agent 146, which validates and strips the message of protocol related information. The RIBA Agent 146 then determines where the message is addressed to and sends the data to the appropriate application.

Messages from the NPAC/SMS 74 that request operations to be performed on tables within the RIBA Database 144, such as SET, CREATE and DELETE, are sent to RIBA Message Handlers. FIG. 6 illustrates the use of four (4) RIBA Message Handlers, each handling CMIP messages for a specific object type and performing updating operations on tables within the RIBA Database 144: a Subscription Version Message Handler 148; a Network Message Handler 150; a LRN Message Handler 152; and a NPA-NXX Message Handler 154. When the appropriate RIBA Message Handler, either 148, 150, 152 or 154, accepts the message, the data is then extracted from the message and the operation is determined. An SQL statement is built for the action using the data values extracted from the message. The SQL statement is then performed, which updates the RIBA Database 144.

The FTP Network Download 162 and FTP Subscription Version Download 164 applications can update or restore the RIBA Database 144 and IBAR Database 172 from the NPAC/SMS 74 via FTP/TCPIP. These FTP applications 162 and 164, which are controlled by an operator, read the subscription version and service provider network information from the NPAC/SMS 74 via FTP/TCPIP to form a flat file and update the appropriate database tables with the new information. These activities should be appropriately logged.

Upon startup, the IBA Agent 146 uses the Database Query process 166 to read each data item (subscription version, service provider network, LRN, and NPA-NXX information) from the RIBA Database 144 and loads them into memory. These data items form the Managed Instance Tree ("MIT"), which is used by the RIBA Subsystem 76 as reference points to the stored data during its operation. Once the load has been completed, the RIBA Agent 146 binds to the NPAC/SMS 74 and sends a download and recovery complete transaction to desynchronize the RIBA Subsystem 76. When the bind has been successfully established, the RIBA Agent 146 requests that the NPAC/SMS 74 download all of the subscription, NPA-NXX and LRN data which was accumulated during the time that the IBA Agent 146 was not bound to the NPAC/SMS 74. Upon successful completion of the download, the RIBA Agent 146 informs the NPAC/SMS 74 that the download has been completed and normal processing resumes.

The RIBA Agent 146 also receives notification, recovery complete and action transactions, which are forwarded to the appropriate logging utilities: a Notification Logger 156; a Recovery Complete Logger 158; and an Action Logger 160. These logging utilities, 156, 158 and 160, perform actions that are common to the RIBA log and notification programs. These procedures are contained in a separate program file and linked with the log and notification programs. When changes are required in the utility functions, these changes only need to be made in one place and the programs recompiled. These utilities process and handle the transactions and update the RIBA Database 144.

In use, the NPAC/SMS 74 sends variable length create requests to the RIBA Agent 146 consisting of subscription data and a list of one or more telephone numbers for each subscription data element. The RIBA Agent 146 extracts the create request from the CMIP message and formats it into a structure suitable for use by the Action Logger 146 which, in turn, extracts the subscription version data from the structure. The Action Logger 146, which communicates directly with the RIBA Agent 146, is started by the Process Monitor 132 at the request of the RIBA Agent 146.

The Notification Logger 156 is used to log notifications received by the RIBA Agent 146. In this way, the NPAC-SMS Operational Information and Version New NPA-NXX notifications are logged. The RIBA Agent 146 receives these notifications from the NPAC/SMS 74, formats the information into a usable structure and forwards the structure to the Notification Logger 156 over a UNIX socket. The Notification Logger 156 is started by the Process Monitor 132 at the request of the RIBA Agent 146.

The Recovery Complete Logger 158 is used to log Recovery Complete Replies and Download Replies sent by the NPAC/SMS 74 to the RIBA Agent 146. The RIBA Agent 146 receives these actions from the NPAC/SMS 74, formats the information into a usable structure and forwards the structure to the Recovery Complete Logger 156 over a UNIX socket. The Recovery Complete Logger 156 is started by the Process Monitor 132 at the request of the RIBA Agent 146.

Table 2 is a domain field listing for an the IBA Database 144 according to one embodiment:

TABLE 2

Domain field list for IBA Database.

| Name | Code | Label | Type |
|---|---|---|---|
| billingIdentifier | BILLING_ID | Billing Identifier | VARCHA2(4) |
| booleanIndicator | BOOL_IND | Boolean Indicator | NUMBER(1) |
| city | CITY | | VARCHAR2(20) |
| CLASS DPC | CLASS_DPC | | VARCHA2(9) |
| CLASS SSN | CLASS_SSN | | NUMBER(3) |
| CNAM DPC | CNAM_DPC | | VARCHA2(9) |
| CNAM SSN | CNAM_SSN | | NUMBER(3) |
| contactType | CONTACT_TYPE | Contact Type | VARCHAR2(2) |
| country | COUNTRY | | VARCHA2(20) |
| endUserLocationType | END_USER_LOC_TYPE | | VARCHA2(2) |
| endUserLocationValue | END_USER_LOC_VALUE | | VARCHA2(12) |
| identifier | ID | | NUMBER(10) |
| ISVM DPC | ISVM_DPC | | VARCHA2(9) |
| ISVM SSN | ISVM_SSN | | NUMBER(3) |
| LIDB DPC | LIDB_DPC | | VARCHA2(9) |
| LIDB SSN | LIDB_SSN | | NUMBER(3) |
| LNPtype | LNP_TYPE | | NUMBER(1) |
| LRN | LRN | | VARCHA2(10) |
| NPA NXX | NPA_NXX | NPA-NXX | VARCHAR2(6) |

TABLE 2-continued

Domain field list for IBA Database.

| Name | Code | Label | Type |
|---|---|---|---|
| operationAction | OPER_ACT | | NUMBER(3) |
| organizationId | ORGNZ_ID | ID number of an organization, client, NPAC, regional IBA. | VARCHAR(3) |
| Postal Code | PC | Postal Code | VARCHAR2(40) |
| servProvID | SP_ID | | VARCHA2(4) |
| stateProvince | STATE_PROV | State/Province | VARCHA2(2) |
| status | STATUS | Status Flag | NUMBER(10) |
| systemType | SYSTEM_TYPE | | N1 |
| telephoneNumber | TN | Telephone Number | VARCHAR2(10) |
| timestamp | T | | DATE |
| tunableName | TUNABLE_NAME | Tunable Name | VARCHAR2(40) |
| tunableValue | TUNABLE_VALUE | Tunable Value | VARCHAR2(40) |
| userIdentifier | USER_ID | | VARCHAR2(30) |
| zip | ZIP | | VARCHAR2(40) |

The RIBA Process Monitor 167, which was previously described in reference to the SOA Subsystem 72 (FIG. 5), watches over all of the standard applications or processes required to run the RIBA Subsystem 76. The RIBA Process Monitor 167 does not, however, monitor the FTP processes 162 and 164, or the RIBA Converter Process 170. The RIBA Process Monitor 167 starts applications when they are required and is notified if an application terminates. If an application, which is intended to always be running terminates, such as the RIBA Agent 146 and RIBA Check Link 168, the RIBA Process Monitor 167 will automatically restart the terminated application. The RIBA Check Link application 168 monitors the physical connection between the RIBA Subsystem 76 and NPAC/SMS 74. If the physical connection is broken, the RIBA Check Link 168 will reset the RIBA Subsystem 76.

The RIBA Converter Process 170 is a stand-alone process for NPA-NXX Split processing that performs a conversion of the telephone number value in the RIBA Subscription Version table. Using tunable database links, the RIBA Converter Process 170 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the RIBA Converter Process 170 performs a telephone number conversion. Each telephone number record is retrieved from the RIBA Database 144 to determine if the telephone number contains the old NPA-NXX. If so, the telephone number is modified to the new NPA-NXX. Other processes within the RIBA Subsystem 76 are suspended for the duration of the conversion process.

Figure 7:
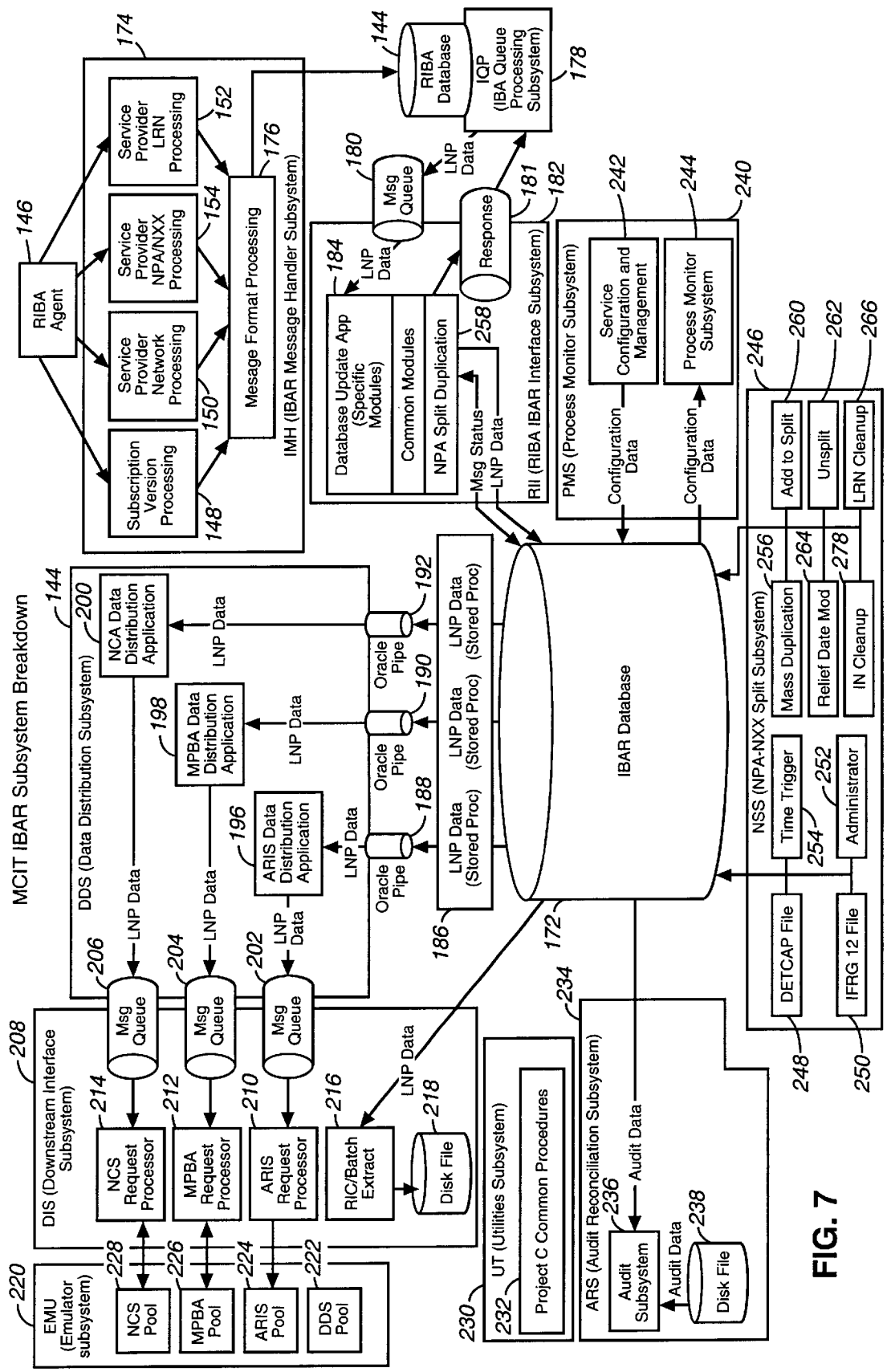
FIG. 7 is a block diagram of the IBAR broken down into its component subsystems according to one embodiment.

Turning to FIG. 7, the Interface Broadcast Agent Repository ("IBAR") Subsystem is shown and denoted generally as 86. A particularly advantageous aspect of the present invention is that it provides interfaces from the IBAR Subsystem 86 to internal systems operated by the individual service providers. FIG. 7 illustrates four (4) proprietary downstream systems have been coupled to the IBAR Subsystem 86 for receiving data. The NCS 100 and RTE7 102 systems manage local number portability information in the long distance environment while the MINA/SMS 98 is configured to manage local number portability information on the local service network level. Also, the ARIS 96 collects local number portability ("LNP") information for distribution to service provider business systems 68 (FIG. 2) and 88 (FIG. 3).

As such, and according to one embodiment of the invention, the IBAR Subsystem 86 supports the following features:

A facility to consolidate LNP data from the RIBA Database 144 into the IBAR Database 172.

A data distribution application that manages distribution of data to the ARIS 96, MINA/SMS 98, and NCS 100 systems. This application will track the status of transactions to each of these systems.

An on-line interface to the NCS long distance support system 100 preferably using the DECmessageQ product from Digital Equipment Corp.

An on-line interface to the MINA/SMS system 98 preferably using Service Builder System Management Interface product from Northern Telecom.

An on-line interface to the ARIS system 96 preferably using the Registry Messaging product from MCI.

A batch interface to the RTE7 long distance support system 102 using FTP.

NPA-NXX Split Processing.

The IBAR Message Handler Subsystem 174 comprises the message handlers in the RIBA Subsystem 76 (FIG. 6). As previously described, the RIBA Agent 146 receives messages containing data from the NPAC/SMS 74 (FIG. 6). These messages are then directed to the proper message handlers: Subscription Version Message Handler 148, Network Message Handler 150, LRN Message Handler 152, and NPA-NXX Message Handler 154. These message handlers process the messages and data in block 176 (not explicitly shown in FIG. 6) and stores the data in the RIBA Database 144. The IBAR Message Handler Subsystem 174 also inserts the data into a feeder table which will be read by the IBA Queue Processing Subsystem 178.

The IBA Queue Processing Subsystem 178, which is responsible for sending all changes received by the RIBA Database 144 to the RIBA/IBAR Interface Subsystem 182, reads the data from the feeder table and tags each message with a tracking number before it is put into the Message Queue 180. As will be described below, the tracking number ensures that the messages are delivered in sequential order.

The RIBA/IBAR Interface Subsystem 182 is responsible for keeping the IBAR Database 172 up to date with the changes that are made in the RIBA Database 144. The RIBA/IBAR Interface Subsystem 182 includes a database update application 184 that reads and processes the messages from the Message Queue 180. During processing, the underlying message data is acquired and organized by tasks, which are broken down at the "object" level (i.e. Telephone Number, Audit, Service Provider, and Network). The database update application 184 then updates the appropriate database fields in the IBAR Database 172 with the "object" data and calls stored procedures 186 to populate dedicated links 188, 190 and 192 with the information stored in the IBAR Database 172.

To ensure that duplicate messages are not processed, the RIBA/IBAR Interface Subsystem 182 verifies that each message read from the Message Queue 180 is the next consecutively numbered message. The RIBA/IBAR Interface Subsystem 182 also provides the ability to track messages from any RIBA Subsystem 76 by recording all tracking numbers associated with each RIBA Subsystem 76 and its associated record in the IBAR Database 172.

At the end of a successful transaction, the RIBA/IBAR Interface Subsystem 182 sends a response to the Response Queue 181 for each message received from Message Queue 180 as to whether it was successfully applied, rejected due to validation errors, or needs to be resent to the Message Queue 180. The IBA Queue Processing Subsystem 178 reads the responses from the Response Queue 181, processes them, and makes the appropriate updates to the table. For example, if the tracking number is out of sequence, the RIBA/IBAR Interface Subsystem 182 issues a "resend" of the specific message and any messages that have been put into the Message Queue 180 after the specific message. If, however, the specific message cannot be found in the table, the IBA Queue Processing Subsystem 178 sends a "lost" message notification and the resend process continues.

Multiple instances of the RIBA/IBAR Interface Subsystem 182 can be run to accommodate various types of NPAC/SMS 74. This allows each NPAC/SMS 74 to have different information that is to be sent to the RIBA Subsystem 76 and then to the IBAR Subsystem 86. As a result, a version ID is used to identify the type of NPAC/SMS 74 reviewing a given region so that all information can be sent to one Message Queue 180.

As mentioned above, stored procedures 186 extract data from the IBAR Database 172 and write the data to the appropriate dedicated links 188, 190 and 192. Each downstream on-line Data Distribution Application has its own dedicated link (e.g., link 188 for ARIS 96 messages, link 190 for MINA/SMS 98 messages and link 192 for NCS 100 messages). Data from each dedicated link is then read by the appropriate dedicated Data Distribution Application (e.g., application 196 for ARIS 96 messages, application 198 for MINA/SMS 98 messages, and application 200 for NCS 100 messages).

These dedicated Data Distribution Applications, which are part of the Data Distribution Subsystem 194, then send the transactions to a second set of Message Queues, each dedicated Data Distribution Application having its own dedicated Message Queue (e.g., Message Queue 202 for ARIS 96 messages, Message Queue 204 for MINA/SMS 98 messages, and Message Queue 206 for NCS 100 messages). The Message Queues 202, 204 and 208 then send the transactions to the Downstream Interface Subsystem 208, which contains an interface for each application format (e.g., ARIS Request Processing Interface 210 for ARIS 96 messages, MINA/SMS Request Processing Interface 212 for MINA/SMS 98 messages, and NCS Request Processing Interface 214 for NCS 100 messages).

Once the message has been sent to the appropriate interface in the Downstream Interface Subsystem 208, the status of the record in the IBAR Database 172 will be changed to "Sending." In addition, the Message Queues 202, 204 and 206 are continuously monitored as transactions are added to them so that any errors can be found and an alarmed can be triggered. In the event of a message failure, or a process or system failure, or during system startup, a recovery process is started and the status of the records in the IBAR Database 172 are checked. During this recovery process, all records in the IBAR Database 172 having a status of "Sending" will be resent to the Downstream Interface Subsystem 208 in the same manner as previously described. Regular processing of messages from the IBAR Database 172 to the Downstream Interface Subsystem 208 will be held up until the recovery process is complete.

In the Downstream Interface Subsystem 208, a custom request processing application for each on-line interface to a network provider's external system will read the requests from a message and facilitate the transfer over the specific interface. They will format the data as required by the interface (e.g., Northern Telecom's Service Management Interface protocol requirements) and ensure that the data is delivered across the interface. Typically, the data is sent in a synchronous manner to the network provider's external system via an ASCII based TCP/IP socket interface. The network provider's external system is responsible for queuing the data to a serial communication port. The responses received from the network provider's external system can be sent in an asynchronous manner. Although the Downstream Interface Subsystem 208 as illustrated in FIG. 7 supports four proprietary interfaces, it should be understood that any interface can be supported depending on the external system used by the service provider.

The Downstream Interface Subsystem 208 uses various mechanisms that allow the IBAR Subsystem 86 to communicate with external systems. For example, the MINA/SMS Request Processing Interface 212 is implemented as a stream of data sent via a TCP/IP socket interface using SMI protocol. The NCS Request Processing Interface 214 is implemented using the ported telephone number and request Service Provider NPA-NXX data and is set up as a two-way dialog, i.e. data is sent to the NCS 100 and the NCS 100 replies after processing the data. The ARIS Request Processing Interface 210 is implemented using the ported telephone number data and uses MCI Registry or a similar communications protocol, which is a one-way dialog, i.e. data is sent to ARIS 96, but ARIS 96 does not return confirmation after processing the data. Unlike the other Request Processing Interfaces 210, 212 and 214, the RTE7 Batch Extract 216 consists of a regularly scheduled batch job that extracts the required transactions directly from the IBAR Database 172 and writes them to a disk file 218. The resulting disk file 218 is transmitted to RTE7 102 via TCP/IP using FTP.

Using the above described Request Processing Interfaces 210, 212 and 214, a user is able to access a menu from which the user can: connect or disconnect from the NCS Message Queue; logon or logoff the MINA/SMS session; or register or deregister from the ARIS registry. In response to the user's selection, the Service Configuration and Management Application 242 sends a signal to one of three Request Processing Interfaces 210, 212 or 214. For example, in the UNIX operating environment, two signals are used: SIGUSR1 and SIGUSR2. The SIGUSR1 signal is used for "connect", "logon" and "register" commands; whereas the SIGUSR2 signal is used for "disconnect", "logoff" and "deregister" commands.

An Emulator Subsystem 220 is communicably linked to the Downstream Interface Subsystem 208 and is used for testing and validating the Downstream Interface Subsystem 208. Communication between the Downstream Interface Subsystem 208 and Emulator Subsystem 220 is accomplished using different protocols for each individual program, such as: a DEC Message Queue for the DDS Emulator 222 and the NCS Emulator 228; a UNIX TCP/IP socket library for the MINA/SMS Emulator 226; and Registry for the ARIS Emulator 224.

The Utilities Subsystem 230 contains a set of utility functions and common procedures 232 that are used to speed up the development of UNIX and SQL programs. These functions have been developed specifically for use in the IBAR Subsystem 86 application environment and provide solutions to common problem requirements such as Oracle stored procedures 184, Message Queue access, FTP access, error handling, process signal control and any other software functions that may be best implemented as a utility.

An Audit Reconciliation Subsystem 234 provides service providers interfacing with the IBAR Subsystem 86 the ability to audit their databases against the IBAR Database 172. Some service providers may consider the IBAR Database 172 to be the database of record for LNP data. The Audit Reconciliation Subsystem 234 supports both regularly scheduled and on demand audit requests. The Audit Reconciliation Subsystem 234 will support requests for subsets of the data in the IBAR database 162 as well as complete database dumps. A system administrator can schedule these requests and will manually clean out any audit files that are no longer required. Specifically, the Audit Subsystem 236 extracts the audit data from the IBAR Database 172 and writes it to a disk file 238 that can be distributed using FTP.

The Process Monitor Subsystem 240 provides the means to start and stop the IBAR applications and includes the Service Configuration and Management Application 242, which was previously described, and a Process Manager 244. The Service Configuration and Management Application 242 provides the means to stop and restart communications between each of the real time on-line interfaces found in the Distribution Interface Subsystem 208 and its downstream server counterpart operated by the service provider. The Process Manager 244 provides the means to stop and restart the RIBA/IBAR Interface Subsystem 182, the Data Distribution Subsystem 194 and the Downstream Interface Subsystem 208. Accordingly, the Process Monitor Subsystem 244 is started at system start-up and spawns the initial IBAR applications. The Process Monitor 244 also monitors each application process and will re-start any process that terminates abnormally. In other embodiments, the Process Monitor 244 can spawn more copies of the same systems upon request. The initial information is stored in a file and loaded by the Process Monitor 244 when it is started.

The NPA-NXX Split Subsystem 246 is responsible for processing NPA splits and includes several processes: NETCAP File Access Process 248; LERG 12 File Access Process 250; Administrator Process 252; Time Trigger Process 254; Mass Duplication Process 256; Add-to-Split Process 260; Unsplit Process 262; Relief Date Modification Process 264; LRN Cleanup Process 266; and Telephone Number Cleanup Process 268. These processes are described below.

The NETCAP File Access Process 248 determines when an NPA is going to split, what the new NPA-NXX is going to be, and at what date the split will occur. The NETCAP File Access Process 248 reads the NETCAP file and updates the NPA Split table in the IBAR Database 172 as appropriate. The NPA Split table in the IBAR Database 172 is where the status of each split is tracked and is used to provide the key input for driving NPA Split processing. The NETCAP file is the primary external data source of NPA Split information and is in a mainframe dataset format that must first be retrieved via FTP or some other mainframe-to-Unix utility. Although the NETCAP File Access Process 248 is preferably a regularly scheduled daily batch job, it can also be started manually by the system operator.

More specifically, the NETCAP File Access Process 248 first determines whether the NPA-NXX in the NETCAP file is portable by looking for the NPA-NXX in the IBAR Database 172. If the NPA-NXX does not exist in the IBAR Database 172, the NPA-NXX is bypassed. If on the other hand, the NPA-NXX does exist, the NPA-NXX is deemed to be portable and the RIBA Subsystem 76 associated the NPA-NXX is determined using the Action ID in the IBAR Database 172.

The NETCAP File Access Process 248 then determines the type of record to insert, modify or delete in the NPA Split table for the portable NPA-NXX. Existing NPA Split records having a status of "Completed" are deleted. A NPA Split record having an action of "Unsplit" may also be deleted prior to the Duplication Trigger Point. If the Relief Date for a NPA split record changes before the Mass Duplication Process 256 has been run, then only the NPA Split record's Relief Date is modified and the Relief Date Modification Process is not required.

The LERG12 File Access Process 250 reads the LERG 12 file and updates the LERG 12 table in the IBAR Database 172 as appropriate. The LERG 12 file is a mainframe dataset that is downloaded as a flat file for processing and is used as a secondary external data source of NPA Split information as it pertains to LRNs. The NPA-NXXs defined in the NETCAP data serve to identify both telephone numbers and LRNs affected by a split, as it is understood that LRNs contain valid NPA-NXXs. The LERG 12 data is used for confirmation that the LRNs identified as split-affected by the NETCAP data are valid split-affected LRNs according to the LERG. The LERG 12 File Access Process 250 is preferably a regularly scheduled monthly batch job.

The LERG12 File Access Process 250 checks for the existence of a LERG 12 flat-file. If one exists, the LERG 12 table, which is used for exception reporting, is purged so that the LERG 12 flat-file data can be re-inserted in the IBAR Database 172. This effectively replaces the old data in the LERG 12 table with the new data from the LERG 12 flat-file. The LERG 12 File Access Process 250 also has the ability to designate the LERG 12 flat-file via a command-line specified filename (optional), instead of using the default provided within the program.

The Administrator Process 252 produces exception reports based on information retrieved from the IBAR Database 172, the NETCAP file and the LERG 12 file. This process is executed on demand by a systems administrator or operator.

The Time Trigger Process 254 reads the NPA Split table in the IBAR Database 172 and processes each active record according to the Action and Status attributes and other tunable parameters, such as the Duplication Trigger Point. The Duplication Trigger Point is a tunable period of time prior to the start of Permissive Dialing Period. The Time Trigger Process 254 updates the NPA Split table as appropriate and starts the following processes: the Mass Duplication Process 256, the Add-to-Split Process 260, the Unsplit Process 262, the Relief Date Modification Process 264, the LRN Cleanup Process 266, and the Telephone Number Cleanup Process 268.

The Time Trigger Process 254 is also responsible for setting a suspend flag in the IBAR Database 172 that, as will be described below, suspends the RIBA/IBAR transaction flow prior to the running of the Mass Duplication Process 256, the Add-to-Split Process 260 and the Unsplit Process 262. This ensures that all existing IBAR transactions will be processed without interruption of the incoming flow and that none of the new incoming transactions will be inadvertently bypassed during split processing. Once the Mass Duplication Process 256, Add-to-Split Process 260 and Unsplit Process 262 are complete, the Time Trigger Process 254 resets the suspend flag.

The Time Trigger Process 254 runs continuously under the control of the Process Monitor 244. At a tunable period of time and after each pass through the NPA Split table, the Time Trigger Process 254 sleeps for a short time. There will be one instance of the Time Trigger Process 254 for each RIBA Subsystem 76 to facilitate processing of the NPA Split table. Each RIBA Subsystem 76 will process only the NPA-NXXs particular to the region serviced by the RIBA Subsystem 76 and the Regional NPAC/SMS 74. Each NPA Split record is processed in a synchronous mode such that, for each NPA Split record read, a process may or may not be executed depending on its conditions, and the process will be completed before the next NPA Split record is retrieved.

The Mass Duplication Process 256 reads the IBAR Database 172 and determines which records need to be duplicated for NPA Splits. Each current record that contains the affected NPA-NXX and an action of "Activate" or "Modify" is duplicated. The duplicated records are written to the IBAR Database 172 and then sent to MINA/SMS 98 by batch file and to the NCS 100 via Oracle pipes. The duplicated records are not sent to ARIS 96. The Mass Duplication Process 256 is started by the Time Trigger Process 254 when the Duplication Trigger Point is reached for a given NPA-NXX.

The NPA Split Duplication Process 258 within the RIBA/IBAR Interface Subsystem 182 is responsible for notifying the IBA Queue Processing Subsystem 178 to suspend the RIBA to IBAR transaction flow and for duplicating incoming transactions at the appropriate time. For NPA Split processing, the NPA Split Duplication Process 258 regularly examines the suspend flag in the IBAR Database 172 that is set by the Time Trigger Process 254. When the suspend flag is set, the NPA Split Duplication Process 258 notifies the IBA Queue Processing Subsystem 178 via the Response Queue 181, which then stops sending messages from the RIBA Database 144 to the Message Queue 180. The IBA Queue Processing Subsystem 178 periodically sends a message to the RIBA/IBAR Interface Subsystem 182 prompting the NPA Split Duplication Process 258 to check on the status of the suspend flag. Once the suspend flag has been reset by the Time Trigger Process 254, the NPA Split Duplication Process 258 notifies the IBA Queue Processing Subsystem 178 via the Response Queue 181 to resume sending messages.

For duplicating incoming transactions, the NPA Split Duplication Process 258 first completes regular processing of each transaction, including committing the record to the IBAR Database 172. The NPA Split Duplication Process 258 then compares each transaction against the NPA Split table in the IBAR Database 172 to determine whether the transaction is to be duplicated or not. A transaction is duplicated if the telephone number contains an affected NPA-NXX, the action is "Activate," "Modify" or "Disconnect" and the current processing time is between the Duplication Trigger Point and the Mandatory Dialing Date. Duplicated transactions are assigned an Action ID indicating that it is a duplicate and not an original transaction.

Transactions that are duplicated during the period from the Duplication Trigger Point to the Relief Date are sent only to MINA/SMS 98 and NCS 100 via existing mechanisms. Transactions that are duplicated during the period from the Relief Date to the Mandatory Dialing Date are sent to ARIS 96, MINA/SMS 98 and NCS 100 via existing mechanisms.

The Add-to-Split Process 260 performs the same role as the Mass Duplication Process 256 in reading the IBAR Database 172 and determining which records need to be duplicated for NPA Splits. This process, however, can be triggered by the Time Trigger Process 254 at any time that the Time Trigger Process 254 retrieves an NPA Split record indicating that an NPA-NXX requires Add-to-Split processing. An Add-to-Split can occur before and during the Permissive Dialing Period, with the same, or with different, start and end Permissive Dialing Period dates.

The records duplicated by the Add-to-Split Process 260 are written to the IBAR Database 172 and then sent to MINA/SMS 98 via the regular mechanism and not by batch file, as in the case of the Mass Duplication Process 256. These duplicated records are also sent to NCS 100, but are not sent to ARIS 96.

The Unsplit Process 262 reads the IBAR Database 172 and determines which telephone numbers require a "Duplicated Disconnect" transaction, due to a NPA-NXX Unsplit. A "Duplicate Disconnect" transaction is created for each telephone number that contains an NPA-NXX that has been unsplit, and any action other than "Disconnect" or "duplicate-Disconnect." The "Duplicate Disconnect" transactions are sent to NCS 100 via the regular method, but are not sent to the ARIS 96 or the MINA/SMS 98. ARIS 96 performs Unsplit processing of its own and MINA/SMS 98 is informed of "Disconnect" telephone numbers via E-mail.

The Unsplit Process 262 can be triggered by the Time Trigger Process 254 at any time between the Duplication Trigger Point and the Mandatory Dialing Date, if the Mass Duplication Process 256 has been run. The Time Trigger Process 254 ensures that the RIBA/IBAR incoming transaction feed is suspended prior to the running of the Unsplit Process 262.

The Relief Date Modification Process 264 reads the IBAR Database 172 and determines which records need to be updated with a new Relief Date. Each record that contains an affected NPA-NXX is updated with the new Relief Date. These modifications are not sent to ARIS 96, MINA/SMS 98 or NCS 100. The Relief Date Modification Process 264 is triggered by the Time Trigger Process 254 at any time prior to Permissive Dialing Period if the Mass Duplication Process 256 has been run.

The LRN Cleanup Process 266 reads the IBAR Database 172 and determines which records require a modification to the LRN attribute. A "Modify" transaction is created for each record that contains an LRN with an old NPA-NXX, a telephone number not containing an old NPA-NXX, and any action other than "Disconnect" or "Duplicate Disconnect." The "Modify" transactions are sent to ARIS 96, MINA/SMS 98 and NCS 100 using the regular methods. The LRN Cleanup Process 266 is triggered by the Time Trigger Process 254 to run at the LRN Clean-up Trigger Point, which is a tunable number of hours prior to the Mandatory Dialing Date.

The Telephone Number Cleanup Process 268 reads the IBAR Database 172 and determines which records require a "Disconnect" transaction. A "Disconnect" transaction is created for each record that contains an old NPA-NXX and any action other than "Disconnect" or "Duplicate-Disconnect." The "Disconnect" transactions are sent to NCS 100 using the regular methods, but are not sent to ARIS 96 or MINA/SMS 98. The MINA/SMS 98 is informed of "Disconnect" telephone numbers via E-mail. The Telephone Number Cleanup Process 268 is triggered by the Time Trigger Process 254 at the telephone number Clean-up Trigger Point which is a tunable number of hours after the Mandatory Dialing Date.

Briefly referring back to FIGS. 3 and 4, the SOA Engine Subsystem 80 uses a message-based protocol to provide an interface between the Local Customer Order Entry/Order Processing ("OE/OP") Systems (collectively referred to as the "Front End") 78 and the SOA 32 and RIBA 34 Subsystems. Thus, the SOA Engine Subsystem 80 allows the Front End 78 to upload data, audit, query and otherwise communicate with the NPAC/SMS 74.

Figure 8:
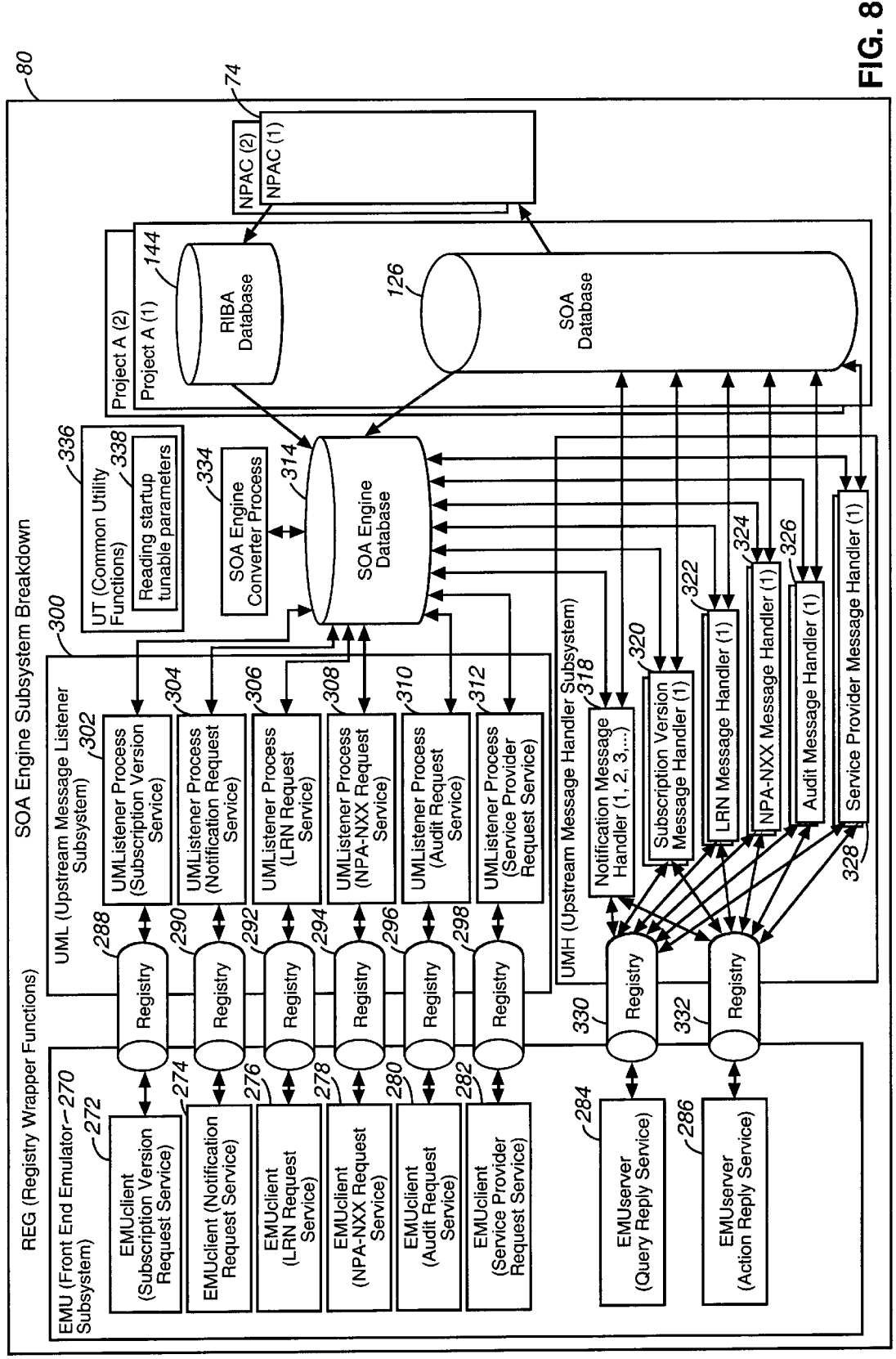
FIG. 8 is a block diagram of the SOA Engine broken down into its component subsystems according to one embodiment.

Now referring to FIG. 8, the SOA Engine Subsystem 80 will be described in detail. The Front End Emulator Subsystem 270 includes both client and server applications, which provide the interface between the SOA Engine Subsystem 80 and the Front End 78. The client applications handle requests from the Front End 78, whereas the server applications handle reply or responses to the Front End 78. More specifically and as illustrated in FIG. 8, the client applications may include a Subscription Version Request Service 272, a Notification Request Service 274, a LRN Request Service 276, a NPA-NXX Request Service 278, an Audit Request Service 280 and a Service Provider Request Service 282. The server applications may include a Query Reply Service 284 and an Action Reply Service 286.

Each client application 272, 274, 276, 278, 280 and 282 sends request messages from the Front End 78 to an Upstream Message Listener Subsystem 300 using the appropriate Registry protocols 288, 290, 292, 294, 296 and 298. Once a client application 272, 274, 276, 278, 280 or 282 sends a request message, that client application will wait for a reply message before sending another request message.

For each request message, the Upstream Message Listener Subsystem 300 determines the particular NPAC/SMS 74 to which the request message is to be delivered to and writes the request message to the SOA Engine Database 314 using a Subscription Version Request Listener 302, a Notification Request Listener 304, a LRN Request Listener 306, a NPA-NXX Request Listener 308, an Audit Request Listener 310 and a Service Provider Request Listener 312. The appropriate Listener 302, 304, 306, 308, 310 or 312 also sends a reply message back to Front End 78 through the appropriate client application 272, 274, 276, 278, 280 or 282. The reply message indicates only that the request message has been received and queued for transmission to the appropriate NPAC/SMS 74, and does not indicate that the request message has been sent to or processed by the NPAC/SMS 74.

The SOA Engine Database 314 contains a queuing table for each type of request message. The Upstream Message Handler Subsystem 316 polls these queuing tables using a Notification Message Handler 318, a Subscription Version Message Handler 320, a LRN Message Handler 322, a NPA-NXX Message Handler 324, an Audit Message Handler 326 and a Service Provider Message Handler 328 to retrieve the appropriate records and processes them accordingly. These Message Handlers will now be described in more detail.

The Notification Message Handler 318 polls the Notification table in the SOA Engine Database 314 to retrieve all records and determines the action to be performed on each retrieved record based on the record message type and status. If the record is a new request, the information needed to create the response message will be fetched from the SOA Database 126 or the corresponding database table will be updated. As was previously described in regard to FIG. 5, the new request message is processed by the SOA Subsystem 72, sent to and processed by the NPAC/SMS 74 and a response message is created and returned containing the result of the new request message. If the record is not a new request, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Notification table in the SOA Engine Database 314. Otherwise, the result status of Notification table will be updated for the request. The Notification Message Handler 318 keeps running until all the records in the Notification table are processed. If there are no more records in the Notification table, the Notification Message Handler 318 sleeps for a certain time before it wakes up and begins to poll the Notification table again.

The Subscription Version Message Handler 320 polls the Subscription Version queuing table in the SOA Engine Database 314 to retrieve all records based on a telephone number range. The Subscription Version Message Handler 320 analyzes each retrieved record and determines the action to be performed based on the record message type and status. If the record is a new message the Subscription Version Message Handler 320 calls the appropriate stored procedure 120 (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the Subscription Version queuing table and a response message is created containing the message data and header. If the record is not a new message, a "resend" message will be reissued containing only the error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Subscription Version queuing table in the SOA Engine Database 314.

The LRN Message Handler 322 polls the LRN queuing table in the SOA Engine Database 314 to retrieve all LRN Message records. The LRN Message Handler 322 analyzes each retrieved record and determines the action to be performed based on the record message type, status and received date. If the record is a new message, the LRN Message Handler 322 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120

(FIG. 5), it is evaluated and a response message will be created. If the record is not a new message, the date of the record is examined. If it is expired, it will be deleted from LRN queuing table. Otherwise, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the LRN Message Handler 322. If the LRN Message Handler 322 receives the confirmation message, the LRN Message Handler 322 deletes the record from the LRN Message queuing table in the SOA Engine Database 314. Otherwise, the result status of the LRN Message queuing table will be updated for the request.

The NPA-NXX Message Handler 324 polls the NPA-NXX queuing table in the SOA Engine Database 314 to retrieve all NPA-NXX Message records. The NPA-NXX Message Handler 324 analyzes each record retrieved and determines the action to be performed based on the message type, status, and received date. If the record is a new message, the NPA-NXX Message Handler 324 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message created. If the record is not a new message, the date of the record is examined and if it is expired, it will be deleted from NPA-NXX queuing table. Otherwise, an error response message is created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the NPA-NXX Message Handler 324. If the NPA-NXX Message Handler 324 receives the confirmation message, the NPA-NXX Message Handler 324 deletes the record from the NPA-NXX queuing table in the SOA Engine Database 314. Otherwise, the result status of the NPA-NXX queuing table will be updated for the request.

The Audit Message Handler 326 polls the Audit queuing table in the SOA Engine Database 314 to retrieve all request records for processing. The Audit Message Handler 326 analyzes each record retrieved and determines the action to be performed based on the message type and status. If the record is a new message, the Audit Message Handler 326 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Audit Message Handler 326. The Audit Message Handler 326 waits until the confirmation message is received in order to delete the record from the message queuing table in the SOA Engine Database 314.

The Service Provider Message Handler 328 polls the Service Provider queuing table in the SOA Engine Database 314 to retrieve all request records. The Service Provider Message Handler 328 analyzes each record retrieved and determines the action to be performed based on the message type and status. If the record is a new message, the Service Provider Message Handler 328 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Service Provider Message Handler 328. The Service Provider Message Handler 328 waits until the confirmation message is received in order to delete the record from the message queuing table in the SOA Engine Database 314.

The SOA Engine Converter Process 334 is a stand-alone process that is started up as is needed. It accesses the NPA Split table in the IBAR Database 172, using tunable Oracle database links to determine the NPA-NXXs that are splitting and their Permissive Dialing Periods. At the start of a Permissive Dialing Period for a given NPA-NXX, the SOA Engine Converter Process 334 performs a telephone number conversion. Each telephone number record is retrieved from the SOA Engine Database 314 to determine if the telephone number contains the old NPA-NXX. If so, the telephone number is modified to the new NPA-NXX. Other processes within the SOA Engine Subsystem 80 continue processing during the conversion.

A Common Utility Function Subsystem 336 provides a set of utility functions that are available to speed development of UNIX and SQL programs. These utility functions, which include reading startup tunable parameters 338, are developed specifically for use in the SOA Engine Subsystem 80 application environment to provide solutions to common programming requirements, such as Oracle stored procedures.

Figure 9:
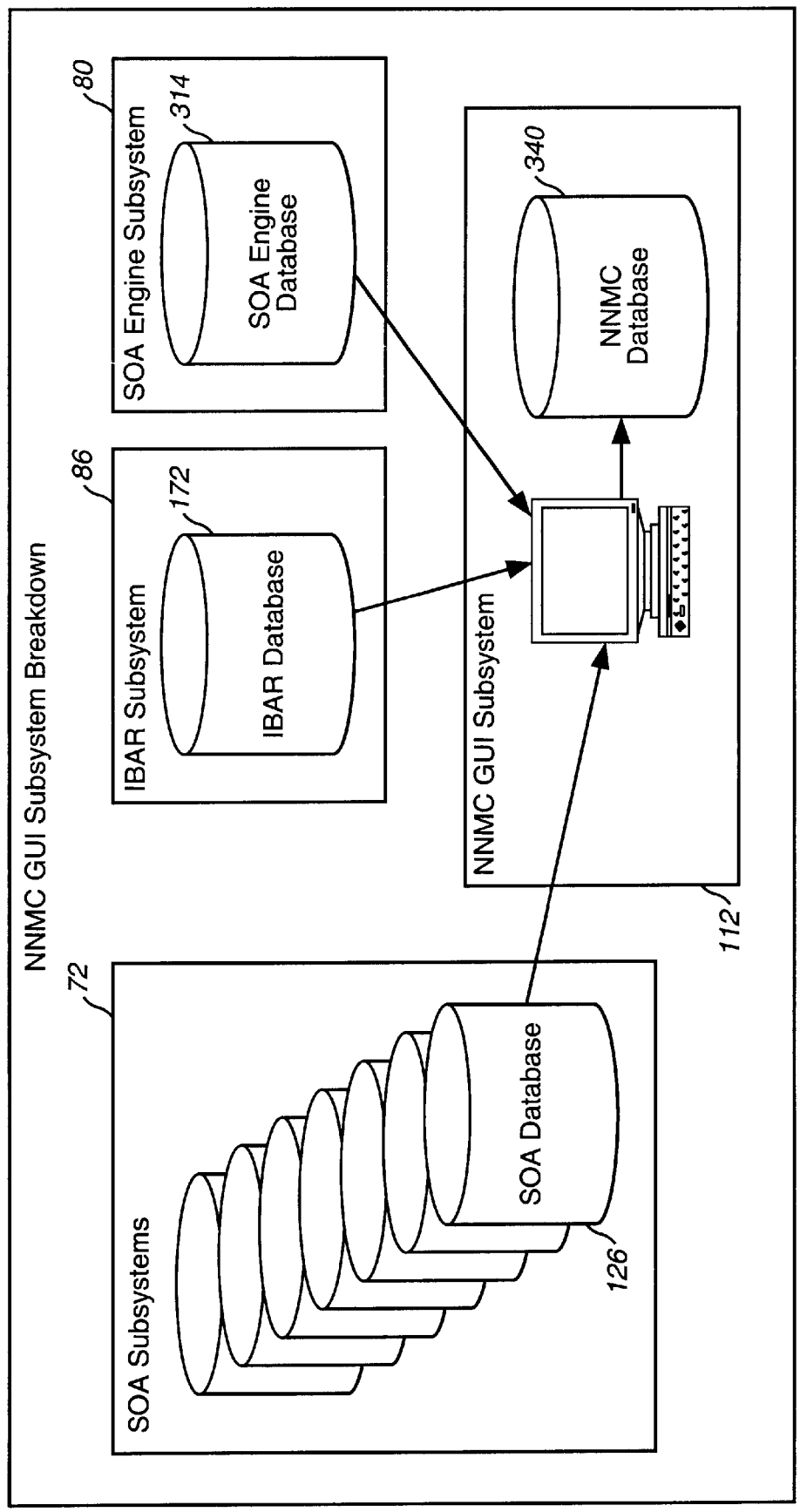
FIG. 9 is a block diagram of the NNMC GUI Subsystem according to one embodiment.

Now referring to FIG. 9, the NNMC GUI Subsystem 112 will be described. The GUI Subsystem 112 connects to the SOA Databases 126 in the SOA Subsystems 72, the IBAR Database 172 in the IBAR Subsystem 86, the SOA Engine Database 314 in the SOA Engine Subsystem 80. Access to the SOA 126, IBAR 172 and SOA Engine 314 Databases is performed via database links, which are stored in the NNMC Database 340. A table within the NNMC Database 340 tracks the number of queries performed per day, per SOA Subsystem 72 and IBAR Subsystem 86. The number of queries is limited to a tunable daily maximum before the end-user is denied access. Based on the telephone number queried, the NNMC GUI 112 uses a telephone number to NPAC cross-reference table within the SOA Engine Database 314 to determine the correct SOA Database 126 to access.

Figure 10:
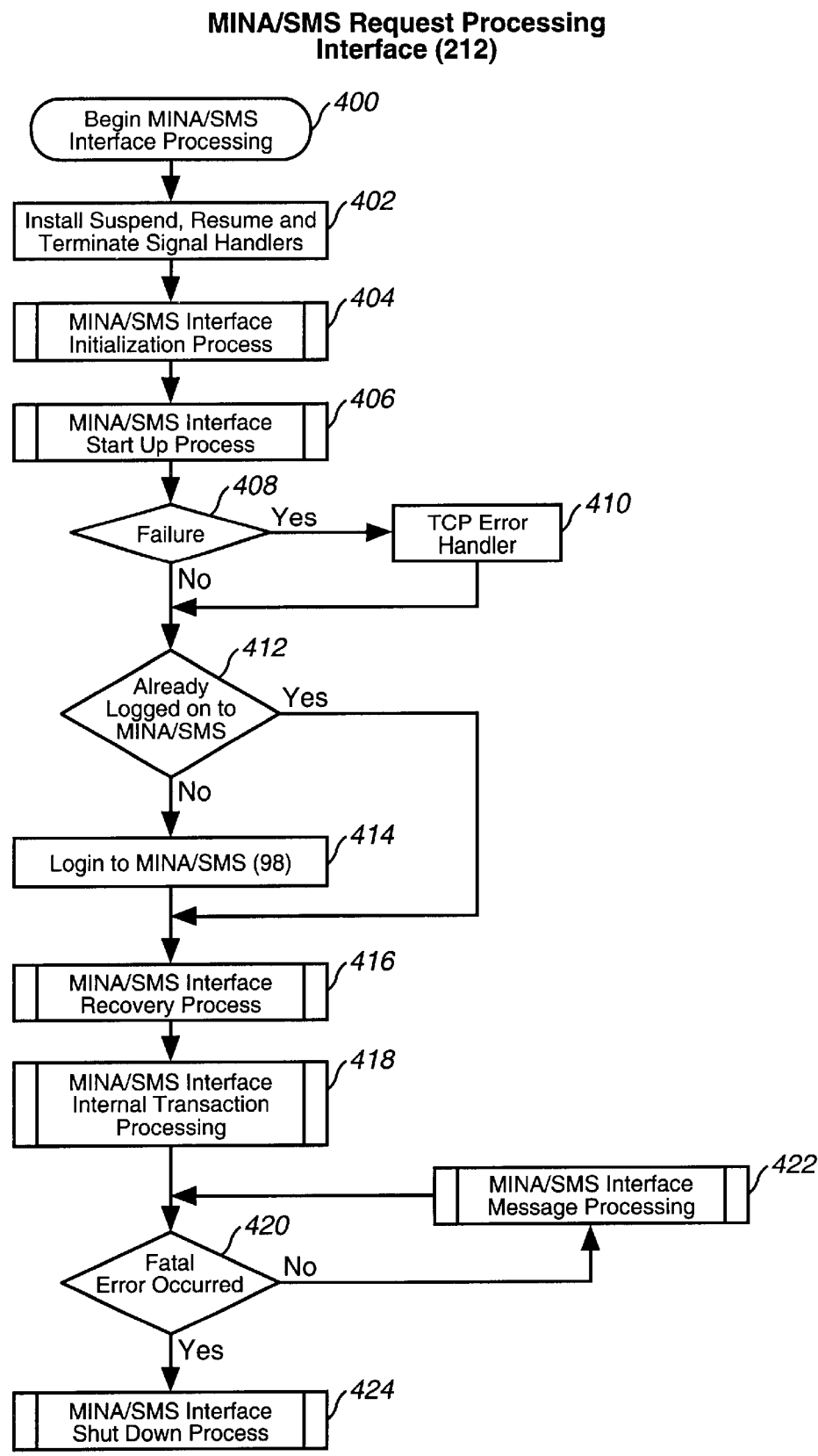
FIG. 10 is a flow chart for a Downstream Interface Subsystem for providing a MINA/SMS Request Processing Interface according to one embodiment.

Turning now to FIG. 10, the processing flow of the MINA/SMS Request Processing Interface (hereinafter referred to as "MINA/SMS Interface") 212 (FIG. 7) is depicted and will be described. MINA/SMS Interface processing begins in block 400 and the terminate, suspend and resume signal handlers are installed in block 402. The MINA/SMS Interface initialization process begins in block 404 and will be described below in reference to FIG. 10D. After the MINA/SMS Interface initialization process 404 is complete, the MINA/SMS Interface start up process begins in block 406. The MINA/SMS Interface start up process 406 will be described below in reference to FIG. 10E. If the MINA/SMS Interface start up process 406 returns with a failure notification, as determined in decision block 408, a TCP error handler is called in block 410. If, however, a failure notification was not returned or the TCP error handler of block 410 is complete, the MINA/SMS Interface 212 (FIG. 7) determines whether it is currently logged on to the MINA/SMS 98 (FIG. 4) in decision block 412. If the MINA/SMS Interface 212 (FIG. 7) is not currently logged on to the MINA/SMS 98 (FIG. 4), the MINA/SMS Interface 212 (FIG. 7) logs on to the MINA/SMS 98 (FIG. 4) in block 414. If the MINA/SMS Interface 212 (FIG. 7) is currently logged on to the MINA/SMS 98 (FIG. 4), as determined in block 412, or the MINA/SMS Interface 212 (FIG. 7) has logged on via block 414, the MINA/SMS Interface recovery process begins in block 416. The MINA/SMS Interface recovery process 416 will be described below in reference to FIG. 10F.

Once the MINA/SMS Interface recovery process 416 is complete, MINA/SMS Interface internal transaction processing begins in block 418. MINA/SMS Interface internal transaction processing 418 will be described below in reference to FIG. 10G. If a fatal error has not occurred, as determined in decision block 420, MINA/SMS Interface message processing begins in block 422. MINA/SMS Interface message processing 422 will be described below in reference to FIG. 10J. If, however, a fatal error has occurred, as determined in block 420, the MINA/SMS Interface shut down process begins in block 424. The MINA/SMS Interface shut down process 424 will be described below in reference to FIG. 10K.

Unless otherwise stated, the MINA/SMS Interface 212 (FIG. 7) may be interrupted by various signals (terminate, suspend and resume). As previously mentioned, the MINA/SMS Interface 212 (FIG. 7) installed handlers to respond to these signals in block 402. Accordingly, the MINA/SMS Interface's 212 response to these signals will be described in reference to FIGS. 10A, 10B, and 10C.

Figure 10A:
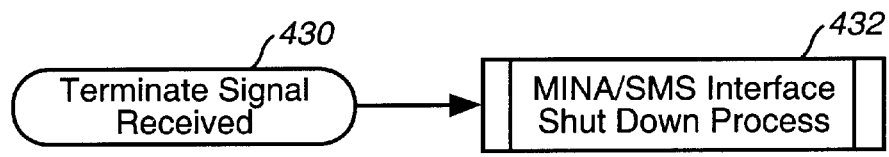
FIGS. 10A, 10B, 10C, 10D, 10E, 10F, 10G, 10H, 10I, 10J and 10K are flow charts for various processes in the Downstream Interface Subsystem for providing a MINA/SMS Request Processing Interface according to one embodiment.
Figure 10B:
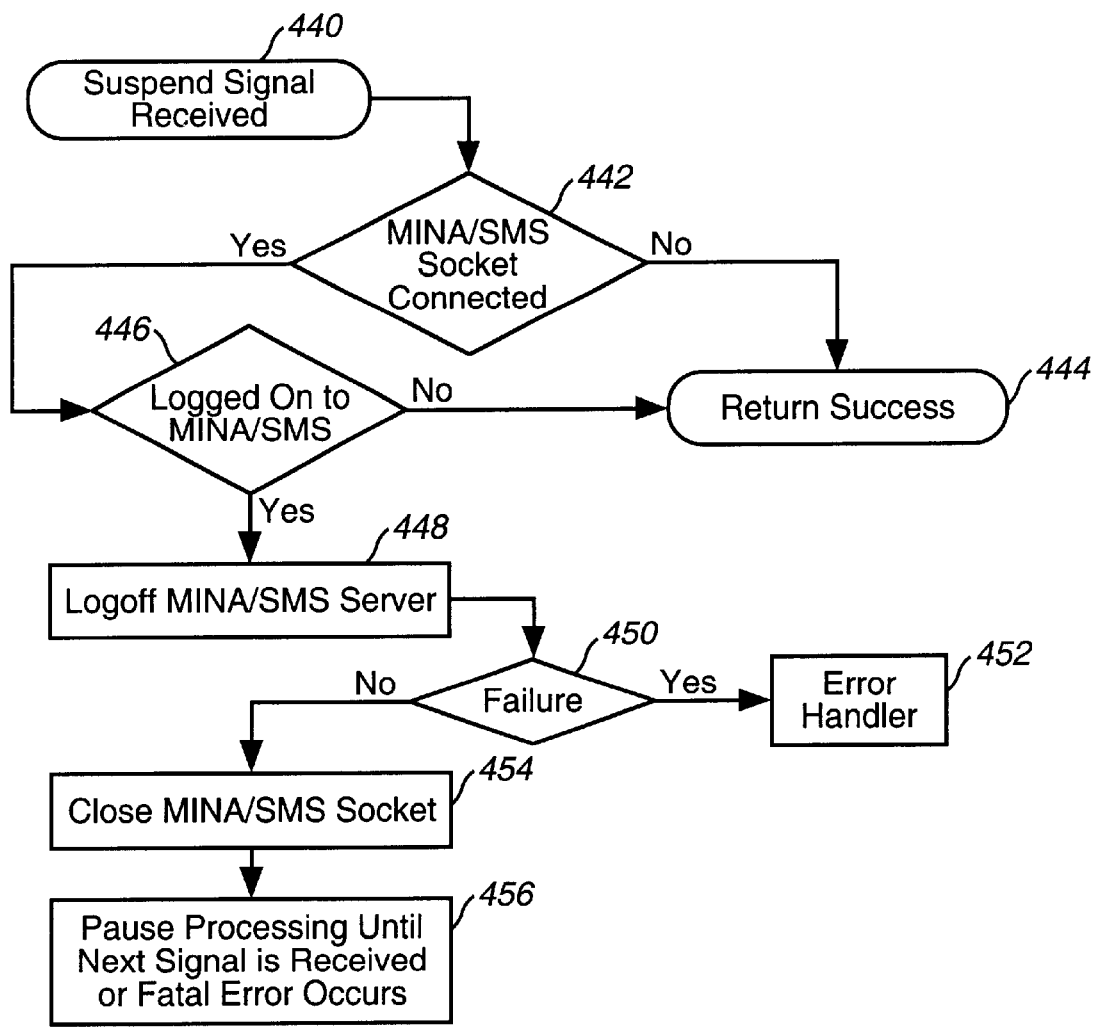

Turning now to FIG. 10A, when a terminate signal is received in block 430, the MINA/SMS Interface shut down process begins in block 432. Turning now to FIG. 10B, when a suspend signal is received in block 440, the MINA/SMS Interface 212 (FIG. 7) determines whether the MINA/SMS socket is connected in decision block 442. If the MINA/SMS socket is not connected, a success notification is returned in block 444. If, however, the MINA/SMS socket is connected, as determined in decision block 442, the MINA/SMS Interface 212 (FIG. 7) determines whether it is logged on to the MINA/SMS 98 (FIG. 4) in decision block 446. If the MINA/SMS Interface 212 (FIG. 7) is not logged on, a success notification is returned in block 444. If, however, the MINA/SMS Interface 212 (FIG. 7) is logged on, as determined in decision block 446, the MINA/SMS Interface 212 (FIG. 7) logs off the MINA/SMS in block 448. If the logoff failed, as determined in decision block 450, an error handler is called in block 452. If, however, the logoff did not fail, as determined in decision block 450, the MINA/SMS socket is closed in block 454 and processing is paused until the next signal is received or a fatal error occurs in block 456.

Figure 10C:
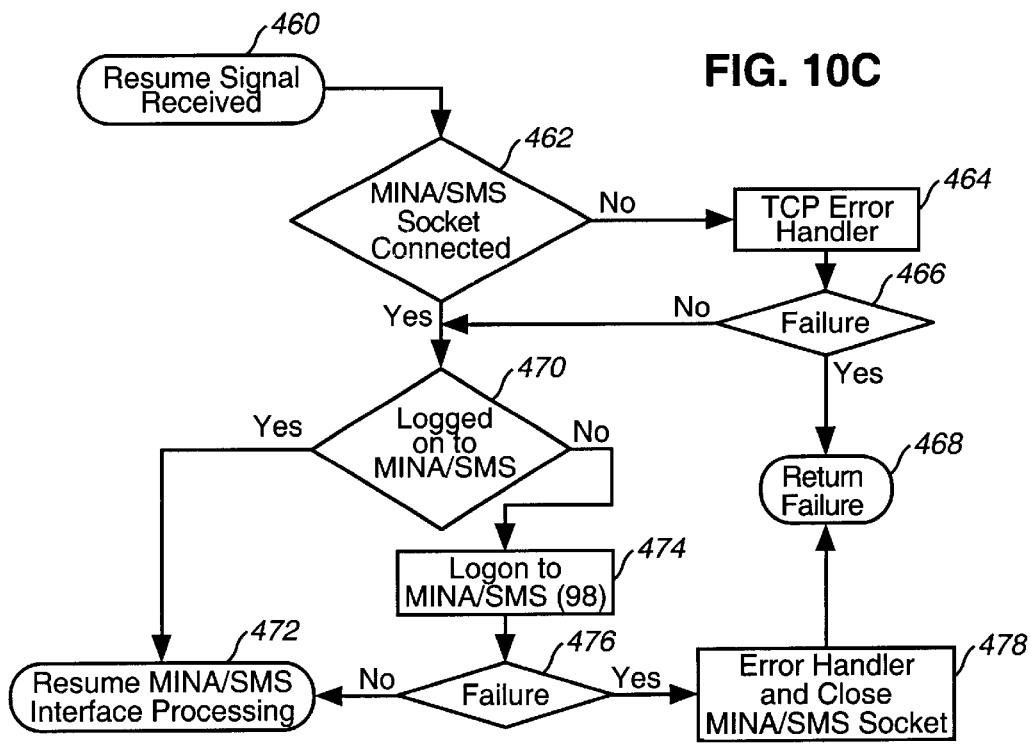

Turning now to FIG. 10C, when a resume signal is received in block 460, the MINA/SMS Interface 212 (FIG. 7) determines whether the MINA/SMS socket is connected in decision block 462. If the MINA/SMS socket is not connected, a TCP error handler is called in block 464. If the error handler fails to resolve the problem, as determined in decision block 466, a failure notification is returned in block 468. If, however, the MINA/SMS socket is connected, as determined in decision block 462, or the error handler resolved the problem, as determined in decision block 466, the MINA/SMS Interface 212 (FIG. 7) determines whether it is logged on the MINA/SMS 98 (FIG. 4) in decision block 470. If the MINA/SMS Interface 212 (FIG. 7) is logged on, MINA/SMS Interface processing resumes in block 472. If, however, the MINA/SMS Interface 212 (FIG. 7) is not logged on to the MINA/SMS 98 (FIG. 4), as determined in decision block 470, the MINA/SMS Interface 212 (FIG. 7) logs on to the MINA/SMS 98 (FIG. 4) in block 474. If the log on attempt does not fail, as determined in decision block 476, MINA/SMS Interface processing resumes in block 472. If, however, the log on attempt fails, as determined in decision block 476, an error handler routine is called and the MINA/SMS socket is closed in block 478, and a failure notification is returned in block 468.

Figure 10D:
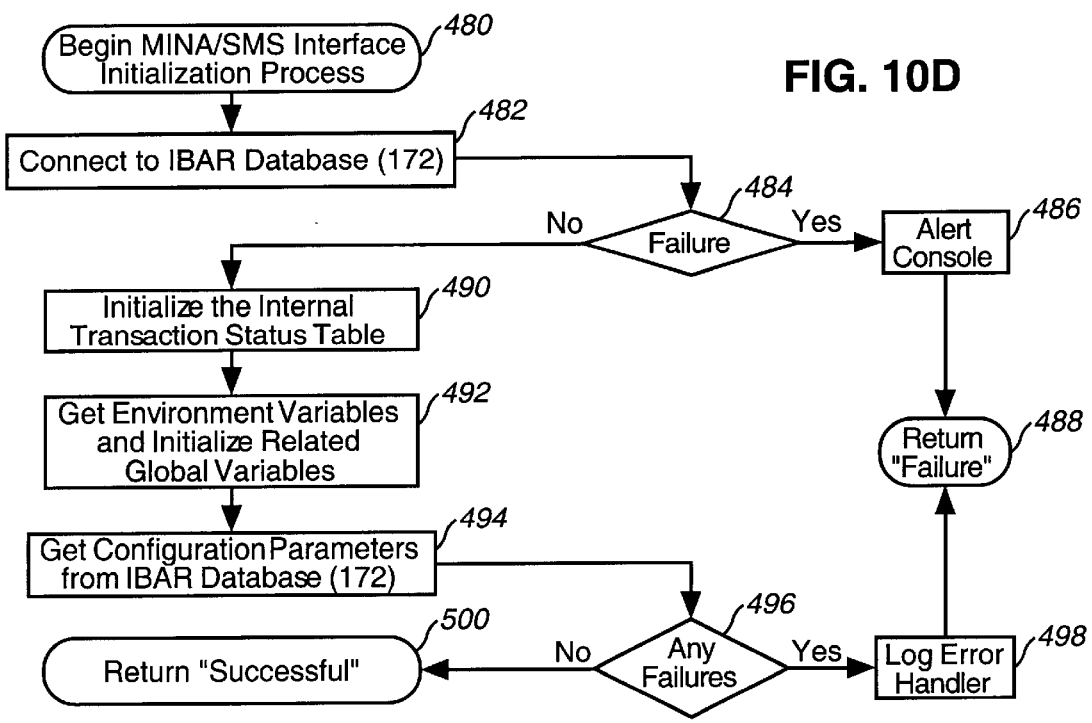

Turning now to FIG. 10D, the MINA/SMS Interface initialization process 404 will be described. The MINA/SMS Interface initialization process begins in block 480 and the MINA/SMS Request Processing Interface 212 connects to the IBAR Database 172 in block 482. If a failure occurred, as determined in block 484, the system console is alerted in block 486, and a failure notification is returned in block 488. If, however, the connection to the IBAR Database 172 was successful, as determined in decision block 484, the internal transaction status table is initialized in block 490. The environment variables are then retrieved and the related global variables are initialized in block 492. Next, the configuration parameters from the IBAR Database 172 are retrieved in block 494. If there are any failures in blocks 490, 492 or 494, as determined in decision block 496, a log error handler is called in block 498 and a failure notification is returned in block 488. If, however, no failures occurred, as determined in decision block 496, a success notification is returned in block 500.

Figure 10E:
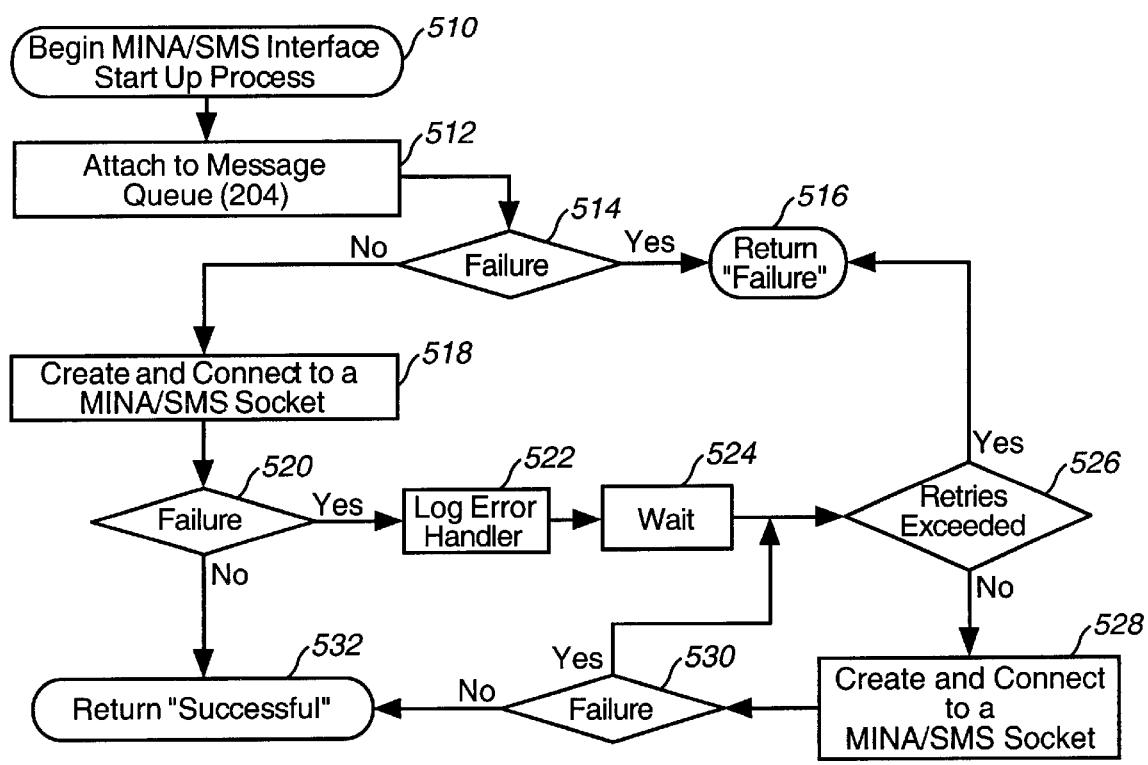

Turning now to FIG. 10E, the MINA/SMS Interface start up process 406 will be described. The MINA/SMS Interface start up process begins in block 510. The MINA/SMS Interface 212 (FIG. 7) attaches to the Message Queue 204 (FIG. 7) in block 512. If a failure occurred while attaching to the Message Queue 204 (FIG. 7), as determined in decision block 514, a failure notification is returned in block 516. If, however, a failure did not occur, as determined in decision block 514, a MINA/SMS socket is created and connected to in block 518. If a failure has occurred, as determined in block 520, a log error handler is called in block 522 and processing is suspended for a predetermined amount of time in a block 524. Thereafter, decision block 526 determines whether the number of retries has been exceeded. If the number of retries has been exceeded, a failure notification is returned in block 516. If, however, the number of retries has not been exceeded, as determined in decision block 526, the MINA/SMS socket is created and connected to in block 528. If a failure occurred, as determined in decision block 530, a loop is created to attempt to create and connect to the MINA/SMS socket. The loop terminates when either the maximum number of retries is exceeded, as determined in decision block 526, or the create and connect to the MINA/SMS socket is successful as determined in decision block 530. If the MINA/SMS socket is successfully created and connected to, as determined by either block 520 or block 530, a success notification is returned in block 532.

Figure 10F:
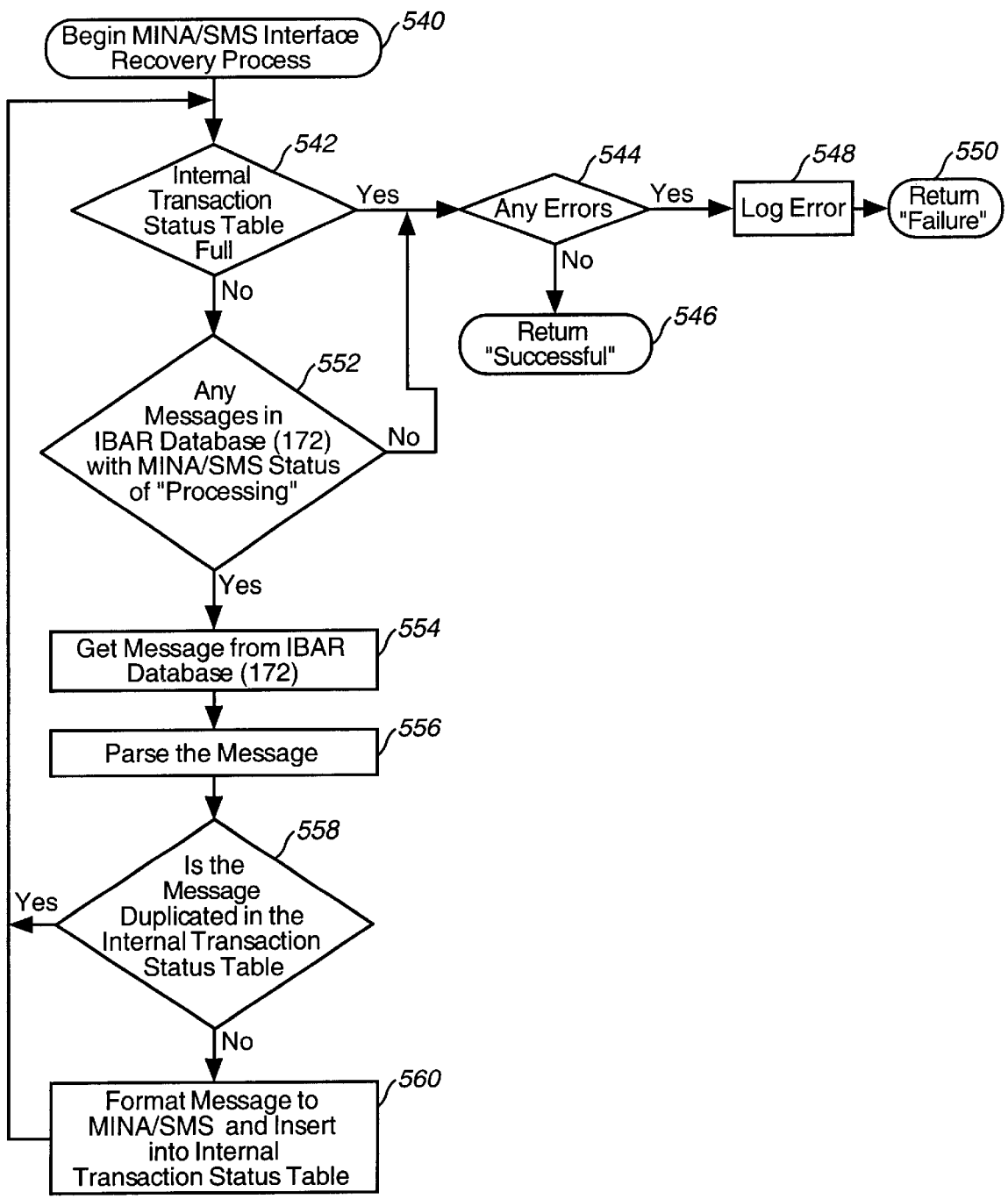

Turning now to FIG. 10F, the MINA/SMS Interface recovery process 416 will be described. The MINA/SMS Interface recovery process begins at block 540. Decision block 542 determines whether the internal transaction status table is full. If the internal transaction status table is fall, the internal transaction status table is checked for errors in block 544. If no errors were found, a success notification is returned in block 546. If, however, the internal transaction table does contain errors, as determined in decision block 544, the error is logged in block 548 and a failure notification is returned in block 550. If the internal transaction status table is not full, as determined in decision block 542, the IBAR Database 172 (FIG. 7) is checked for any messages having a MINA/SMS status of "Processing" in decision block 552. If there are no messages in the IBAR Database 172 (FIG. 7) that have a MINA/SMS status of "Processing", the internal transaction table is checked for errors in block 544 and processing continues as previously described. If, however, there are messages in the IBAR Database 172 (FIG. 7) with a MINA/SMS status of "Processing", the first of those messages are retrieved from the IBAR Database 172 (FIG. 7) in block 554. The retrieved message is parsed in block 556. Decision block 558 determines if the message is duplicated in the internal transaction status table. If the message is duplicated, processing returns to decision block 542 and the process repeats. If, however, the message is not duplicated in the internal transaction status table, as determined in decision block 558, the message is formatted to the MINA/SMS format and is inserted into the internal transaction status table in block 560, and processing returns to decision block 542. This process continues until either the internal transaction status table is full, as determined in decision block 542, or there are no more messages in the IBAR Database 172 (FIG. 7) that have a MINA/SMS status of "Processing", as determined in decision block 552.

Figure 10G:
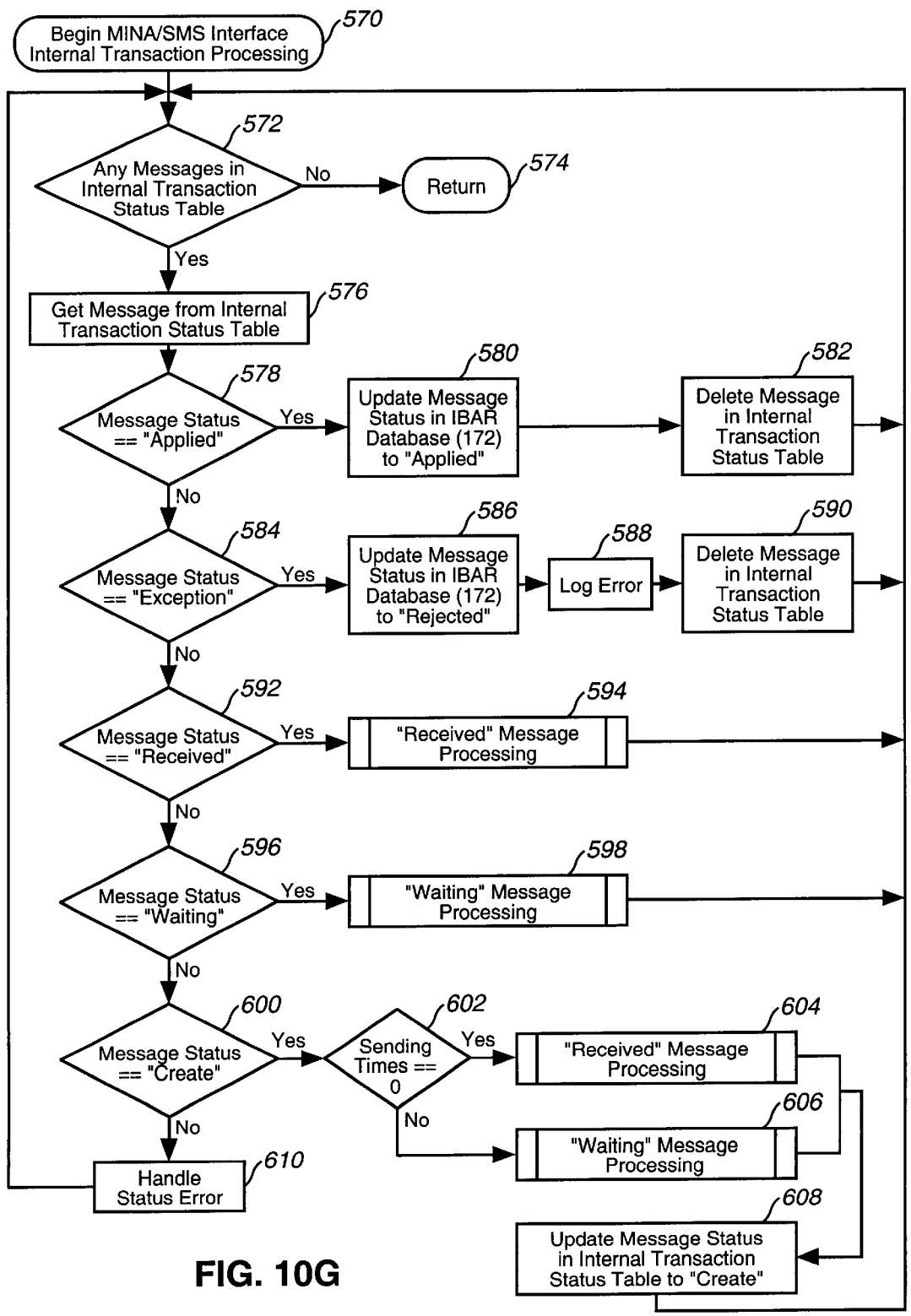

Turning now to FIG. 10G, the MINA/SMS Interface internal transaction 418 processing begins in block 570. Decision block 572 determines if there are any messages in the internal transaction status table. If there are no messages in the internal transaction status table, the system returns in block 574. The next message is retrieved from the internal transaction status table in block 576. Decision block 578 determines if the retrieved message has a MINA/SMS status of "Applied" in the internal transaction status table. If the MINA/SMS status is "Applied", the MINA/SMS status of the message in the IBAR Database 172 (FIG. 7) is updated to "Applied" in block 580. Next, the message is deleted from the internal transaction status table in block 582. Thereafter processing returns to block 572 and the previously described process repeats.

If the message does not have a status of "Applied" in the internal transaction states table, as determined in decision block 578 the process continues to decision block 584 where it is determined if the status of the message in the internal transaction status table is checked for an "Exception" status. If the message status is "Exception", the MINA/SMS status of the message in the IBAR Database 172 (FIG. 7) is updated to "Rejected" in block 586. Next, an error is logged in block 588 and the message is deleted from the internal transaction status table in block 590. Thereafter, processing returns to block 572 and the previously described process repeats.

If the message does not have a status of "Exception" in the internal transaction status table, as determined in decision block 584, the process continues to decision block 592 where it is determined if the MINA/SMS status of the message in the internal transaction table is "Received". If the message status is "Received", "Received" message processing begins in block 594. The "Received" message process 594 will be described below in reference to FIG. 10H. Thereafter, processing returns to block 572 and the previously described process repeats. If the message does not have a status of "Received" in the internal transaction status table, as determined in decision block 592, the process continues to decision block 596 where it is determined if the MINA/SMS status of the message in the internal transaction table is "waiting". If the message status is "Waiting", "Waiting" message processing begins in block 598. The "Waiting" message process 598 will be described below in reference to FIG. 10I. Thereafter, processing returns to block 572 and the previously described process repeats.

If the message does not have a status of "Waiting" in the internal transaction status table, as determined in decision block 596, the process continues to decision block 600 where it is determined if the MINA/SMS status of the message in the internal transaction status table is "Create". If the message status is "Create", decision block 602 determines if the number of sending times equals zero. If the sending times does equal zero, "Received" message processing begins in block 604. If, however, the sending times does not equal zero, as determined in decision block 602, "Waiting" message processing begins in block 606. After the "Received" message processing is complete or the "Waiting" message processing is complete, the MINA/SMS status of the message in the internal transaction status table is updated to "Create" in block 608. Thereafter, processing returns to block 572 and the previously described process repeats. If the message does not have a status of "Create" in the internal transaction table, as determined in decision block 600, the status error is handled in block 610. Thereafter, processing returns to block 572 and the previously described process repeats.

Figure 10H:
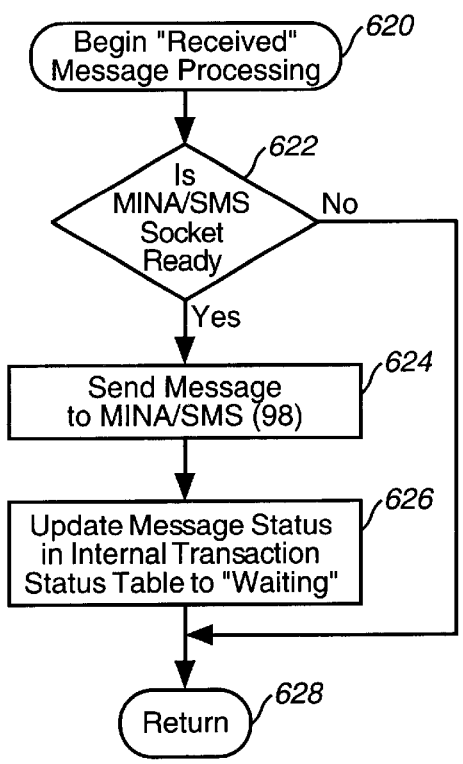

Turning now to FIG. 10H, the "Received" message processing of blocks 594, 604 and 640 will be described. The processing of "Received" messages begins in block 620. Next, decision block 622 determines if the MINA/SMS socket is ready. If the MINA/SMS socket is ready, the message is sent to the MINA/SMS 98 (FIG. 4) in block 624. Next, the message status in the internal transaction status table is updated to "Waiting" in block 626. If, however, the MINA/SMS socket is not ready, as determined in decision block 622, or the status update of block 626 is complete, processing returns to the calling application in block 628.

Figure 10I:
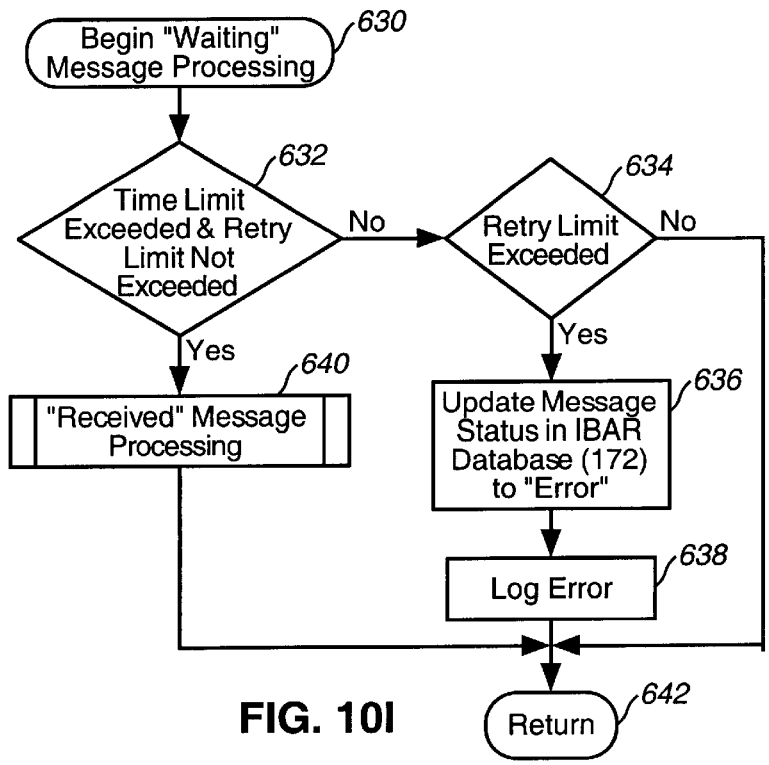

Turning now to FIG. 10I, the "Waiting" message processing of blocks 598 and 606 will we described and begins in block 630. Next, decision block 632 determines if the time limit has been exceeded and if the retry limit has not exceeded. If neither case occurs or only one of the cases occurs, decision block 634 determines if the retry limit has been exceeded. If the retry limit has been exceeded, the message MINA/SMS status in the IBAR Database 172 (FIG. 7) is updated to "Error" in block 636 and the error is logged in block 638 and the process proceeds to block 642 to return to the calling application. If the time limit has been exceeded and the retry limit has not been exceeded, as determined in decision block 632, "Received" message processing begins in block 640. After the "Received" message processing is complete, the process returns to the calling application in block 642.

Figure 10J:
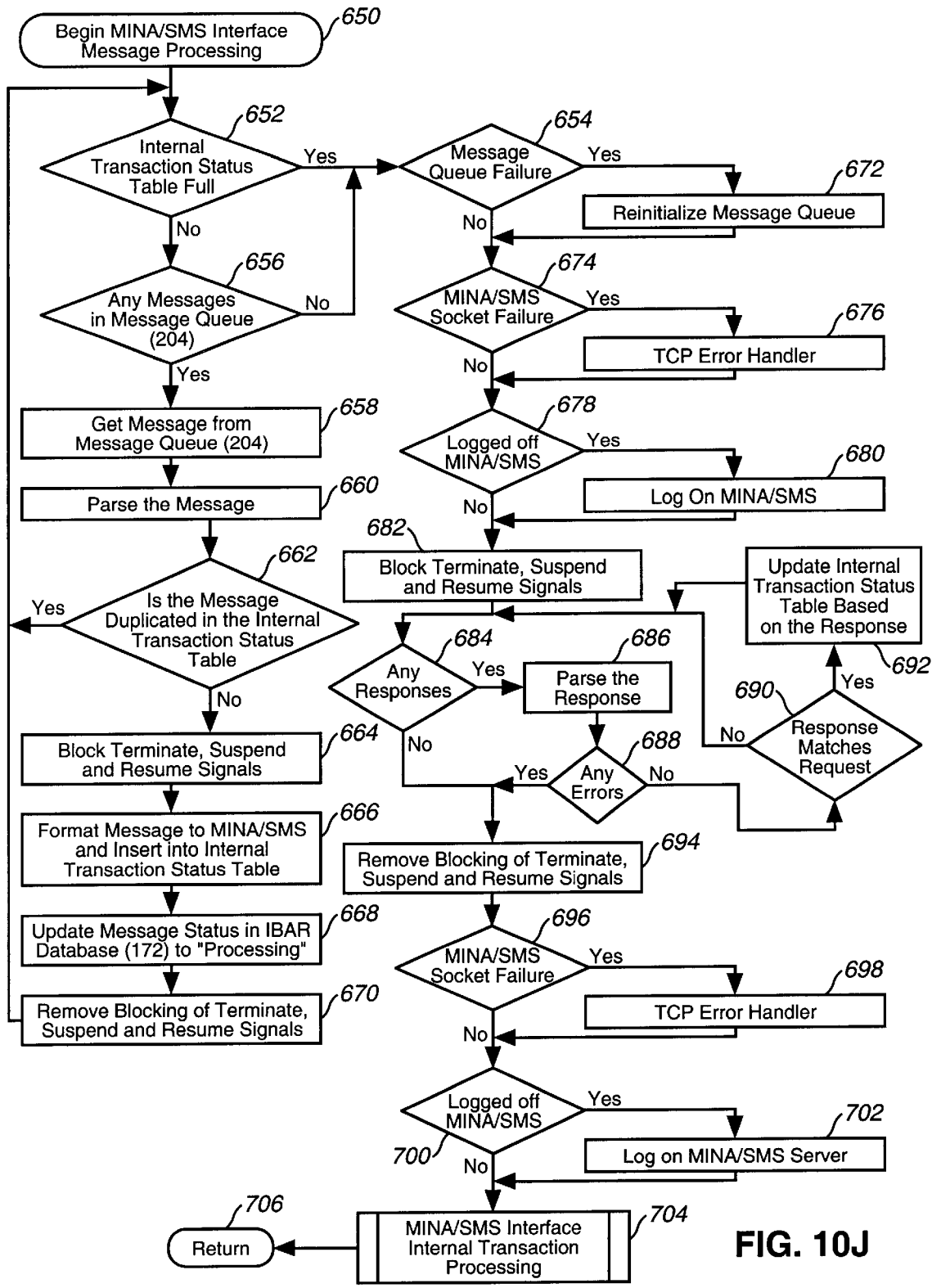

Turning now to FIG. 10J, the MINA/SMS Interface message processing 422 will be described and begins processing at block 650. Next, decision block 652 determines if the internal transaction status table is full. If the transaction status table is full, decision block 654 determines if the message queue 204 (FIG. 7) has failed. If, however, the internal transaction status table is not full, as determined in decision block 652, decision block 656 determines if there are any messages in message queue 204 (FIG. 7). If no messages are queued, decision block 654 determines if the message queue 204 (FIG. 7) has failed. If, however, there are messages in message queue 204 (FIG. 7), as determined in decision block 656, a message is retrieved from message queue 204 (FIG. 7) in block 658 and the message is parsed in block 660. Next, block 662 determines if the retrieved message is duplicated in the internal transaction status table. If the message is duplicated, the process returns to block 652 to determine if the internal transaction status table is full and continues as described. If, however, the message is not duplicated in the internal transaction status table, as determined in decision block 662, the terminate, suspend and resume signals are blocked in block 664. Next, the message is formatted to the MINA/SMS format and is inserted into the internal transaction status table in block 666. The MINA/SMS status of the message in the IBAR Database 172 (FIG. 7) is then updated to "Processing" in block 668 and the terminate, suspend and resume signal blocking is removed in block 670. Thereafter, processing loops back to block 652 wherein the internal transaction status table is checked to see if it is full.

As previously mentioned, decision block 654 determines if the message queue 204 (FIG. 7) has failed. If the message queue 204 (FIG. 7) has failed, the message queue 204 (FIG. 7) is reinitialized in block 672. If, however, the message queue 204 (FIG. 4) did not fail, as determined in decision block 654, or the message queue has been reinitialized in block 672, decision block 674 determines if the MINA/SMS socket has failed. If a failure occurs, a TCP error handler is called in block 676. If, however, the MINA/SMS socket did not fail, as determined in decision block 674, or the TCP error handler 676 is complete, decision block 678 determines if the MINA/SMS Interface 212 (FIG. 7) is logged off the MINA-SMS 98 (FIG. 4). If the MINA/SMS Interface 212 (FIG. 7) is logged off the MINA/SMS 98 (FIG. 4) the MINA/SMS Interface 212 (FIG. 7) attempts to log onto the MINA/SMS 98 (FIG. 4) in block 680. If the MINA/SMS Interface 212 (FIG. 7) is not logged off the MINA/SMS 98 (FIG. 4), as determined in decision block 678, or the MINA/SMS Interface 212 (FIG. 7) was logged on in block 680, the terminate, suspend and resume signals are blocked in block 682. Next, decision block 684 checks for any responses from the MINA/SMS 98 (FIG. 4). If there are any responses, they are parsed in block 686 and they are checked for errors in block 688. If no errors were found, decision block 690 determines if the response matches a request. If the response matches a request, the internal transaction status table is updated to reflect the response in block 692. If the transaction status table update in block 692 is complete, or the response does not match a request, as determined in decision block 690, the process loops back to decision block 684 and checks for any responses. If there are no responses, as determined in decision block 684, or there are no errors in the response, as determined in decision block 688, the terminate, suspend and resume signal blocking is removed in block 694. Next, decision block 696 determines if the MINA/SMS socket has failed. If the MINA/SMS socket has failed, a TCP error handler is called in block 698. If, however, the MINA/SMS socket has not failed, as determined in decision block 696, or the TCP error handler is complete in block 698, decision block 700 determines if the MINA/SMS Interface 212 (FIG. 7) is logged off the MINA/SMS 98 (FIG. 4). If the MINA/SMS Interface 212 (FIG. 7) is logged off the MINA/SMS 98 (FIG. 4) the MINA/SMS Interface 212 (FIG. 7) attempts to log onto the MINA/SMS 98 (FIG. 4) in block 702. If the MINA/SMS Interface 212 (FIG. 7) was not logged off the MINA/SMS 98 (FIG. 4), as determined in decision block 700, or the MINA/SMS Interface 212 (FIG. 7) logged on in block 702, MINA/SMS Interface internal transaction processing begins in block 704 and returns in block 706.

Figure 10K:
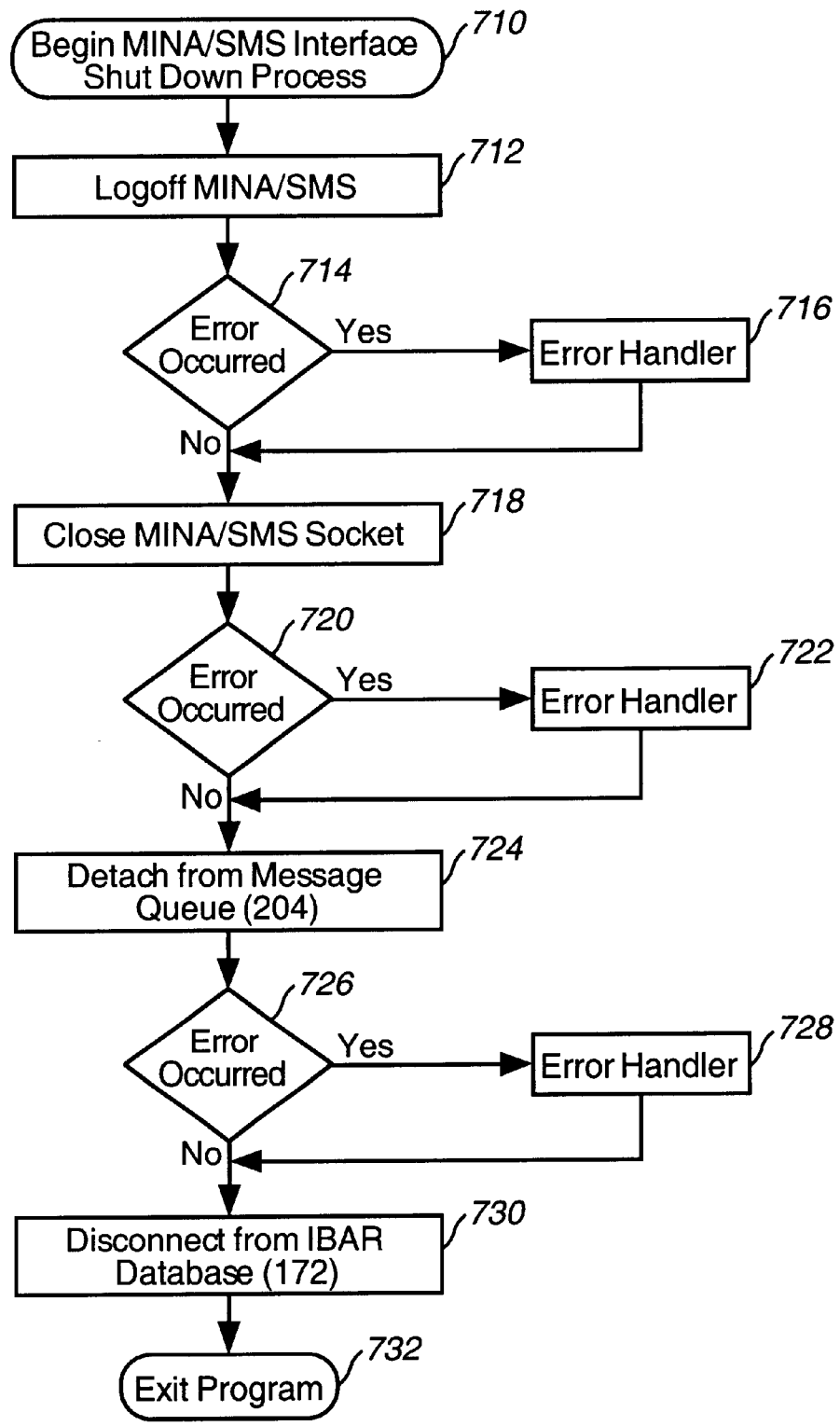

Turning now to FIG. 10K, the MINA/SMS Interface shut down process 424 will be described. The MINA/SMS Interface shut down process begins in block 710 and the MINA/SMS Interface 212 (FIG. 7) logs off of the MINA/SMS 98 (FIG. 4) in block 712. Decision block 714 determines if an error has occurred. If an error has occurred, an error handler is called in block 716. If an error has not occurred, as determined in decision block 714, or the error handler in block 716 is complete, the MINA/SMS socket is closed in block 718. If an error has occurred while closing the MINA/SMS socket, as determined in decision block 720, an error handler is called block 722. If an error has not occurred, as determined in decision block 720 or the error handler in block 722 is complete, the Message Queue 204 (FIG. 7) is detached in block 724. If an error has occurred while detaching from the Message Queue 204 (FIG. 7), as determined in decision block 726, an error handler is called in block 728. If an error has not occurred while detaching from the Message Queue 204 (FIG. 7), as determined in decision block 726, or the error handler in block 728 is complete, the IBAR Database 172 (FIG. 7) is disconnected in block 730 and MINA/SMS Interface 212 processing ends in block 732.

Figure 11:
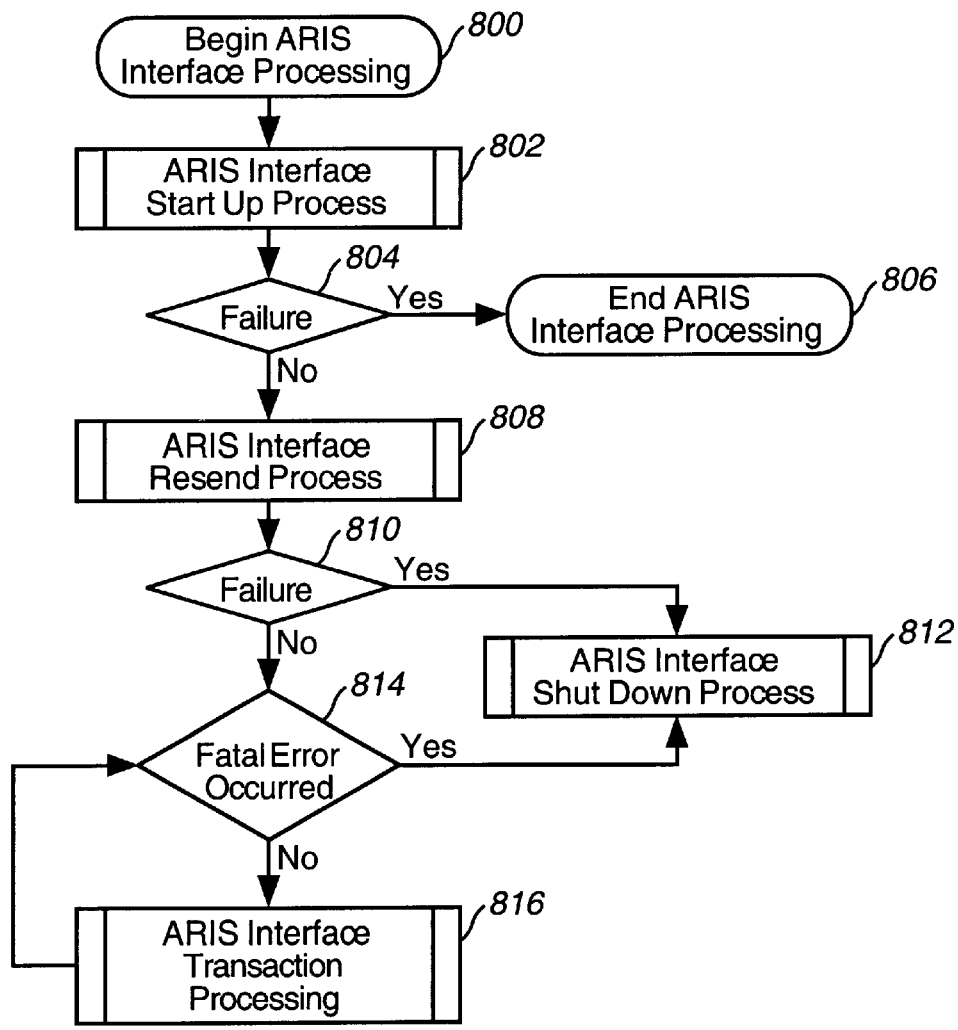
FIG. 11 is a flow chart for a Downstream Interface Subsystem for providing an ARIS Request Processing Interface according to one embodiment.

Turning now to FIG. 11, the ARIS request processing interface (hereinafter referred to as "ARIS Interface") 210 (FIG. 7) will be described. ARIS Interface processing begins at block 800. Next, the ARIS Interface start up process begins in block 802 and will be described below in reference to FIG. 11D. Next, decision block 804 determines if a failure has occurred during start up. If a failure has occurred, the ARIS Interface processing ends in block 806. If, however, no failure occurred, as determined in decision block 804, the ARIS Interface resend process begins in block 808. The ARIS Interface resent process 808 will be described below in reference to FIG. 11E. Next, decision block 810 determines if a failure has occurred. If a failure has occurred, the ARIS Interface shut down process begins in block 812. The ARIS Interface shut down process 812 will be described below in reference to FIG. 11G. If, however, a failure has not occurred, as determined in decision block 810, the process checks to see if a fatal error has occurred in block 814. If a fatal error has occurred, the ARIS Interface shut down process begins in block 812. If, however, no fatal error has occurred, the ARIS Interface transaction processing begins in block 816, and thereafter loops back to block 814 until a fatal error occurs. The ARIS Interface transaction process 816 will be described below in reference to FIG. 11F.

Figure 11A:
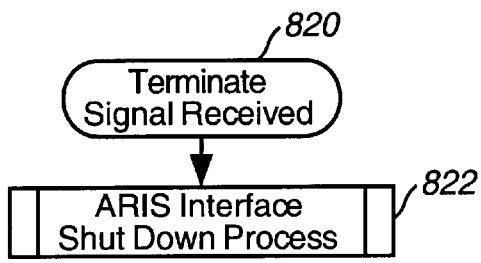
FIGS. 11A, 11B, 11C, 11D, 11E and 11G are flow charts for various processes in the Downstream Interface Subsystem for providing an ARIS Request Processing Interface according to one embodiment.

Turning now to FIG. 11A, the ARIS Interface response to a terminate signal will be described and begins at block 820. Next, the ARIS Interface shut down process begins in block 822.

Figure 11B:
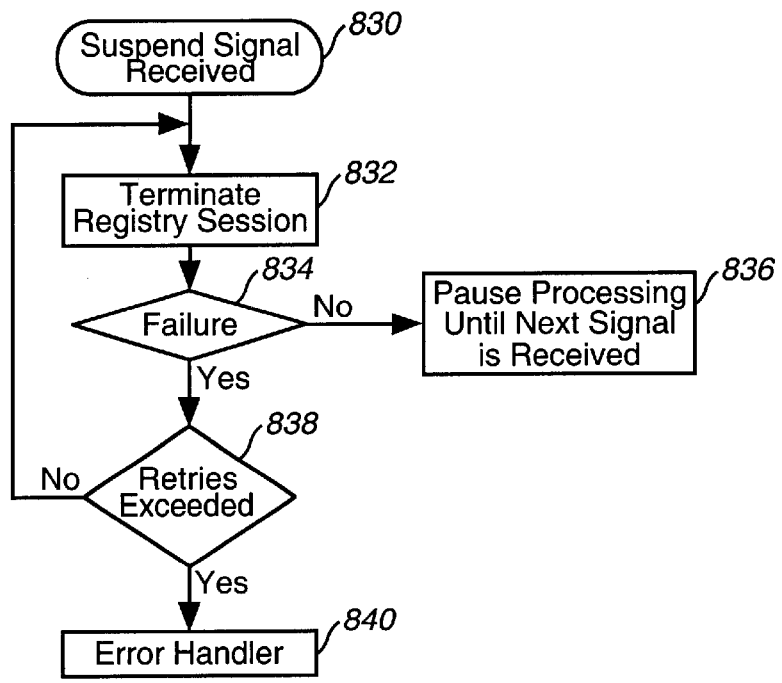

Turning now to FIG. 11B, the ARIS Interface response to a suspend signal will be described and begins at block 830. The Registry session is terminated in block 832 and decision block 834 determines if a failure has occurred. If a failure has not occurred, processing is paused until the next signal is received in block 836. If a failure has occurred, as described in decision block 834, decision block 838 determines if the number of retries has been exceeded. If the number of retries has not been exceeded, processing loops back to block 832. If, however, the number of retries has been exceeded, as determined in decision block 838, an error handler is called in block 840.

Figure 11C:
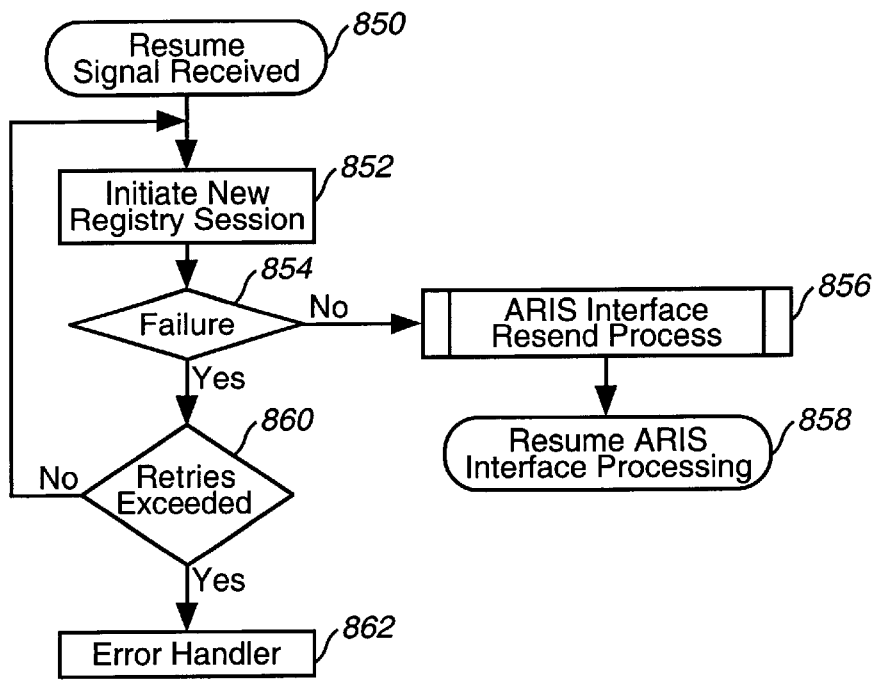

Turning now to FIG. 11C, the ARIS Interface response to a resume signal will be described and begins at block 850. A new Registry session is initiated in block 852 and decision block 854 determines if a failure has occurred. If a failure has not occurred, the ARIS Interface resend process begins in block 856 and ARIS Interface processing is resumed 858. If a failure has occurred, as determined in decision block 854, decision block 860 determines if the number of retries has been exceeded. If the number of retries has not been exceeded, processing loops back to block 852. If, however, the number of retries has been exceeded, an error handler is called in block 862.

Figure 11D:
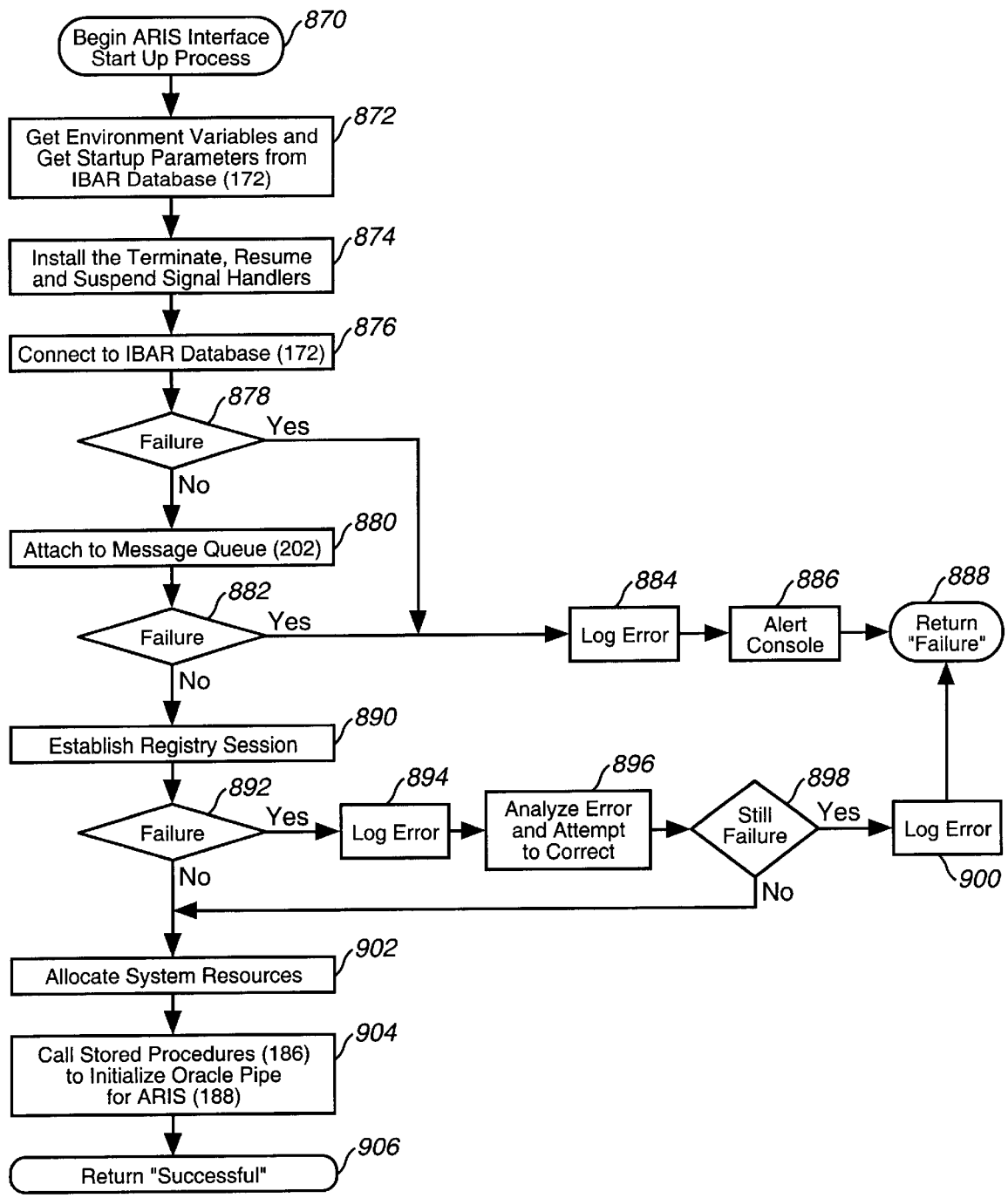

Turning now to FIG. 11D, the ARIS Interface startup process 802 will be described and begins at block 870. Next, the environment variables and startup parameters from the IBAR Database 172 (FIG. 7) are retrieved in block 872 and the terminate, resume and suspend signal handlers are installed in block 874. Next, the connection to the IBAR Database 172 (FIG. 7) is established in block 876 and decision block 878 determines if a failure has occurred. If a failure has occurred, the error is logged in block 884, the console is alerted in block 886, and a failure is notification is returned in block 888. If a failure has not occurred, as determined in decision block 878, the ARIS Interface 210 (FIG. 7) attaches to Message Queue 202 (FIG. 7) in block 880. Next, decision block 882 determines if a failure has occurred while attaching to the Message Queue 202 (FIG. 7). If a failure has occurred, the error is logged in block 884, the console is alerted in block 886, and failure notification is returned in block 888. If a failure has not occurred while attaching to the Message Queue 202 (FIG. 7), as determined in decision block 882, the Registry session is established in block 890 and decision block 892 determines if a failure has occurred. If a failure has occurred, an error is logged in block 894, and the error is analyzed and an attempt to correct the error is made in block 896. Next, decision block 898 determines if a failure still exists. If the failure still exists, the error is logged in block 900, and a failure notification is returned in block 888. If, however, a failure does not still exist, as determined in decision block 898, or there was no failure in the first place, as determined in decision block 892, system resources are allocated in block 902. Next, stored procedures 186 (FIG. 7) are called to initialize the oracle pipe for ARIS 188 (FIG. 7) in block 904 and a success notification is returned in block 906.

Figure 11E:
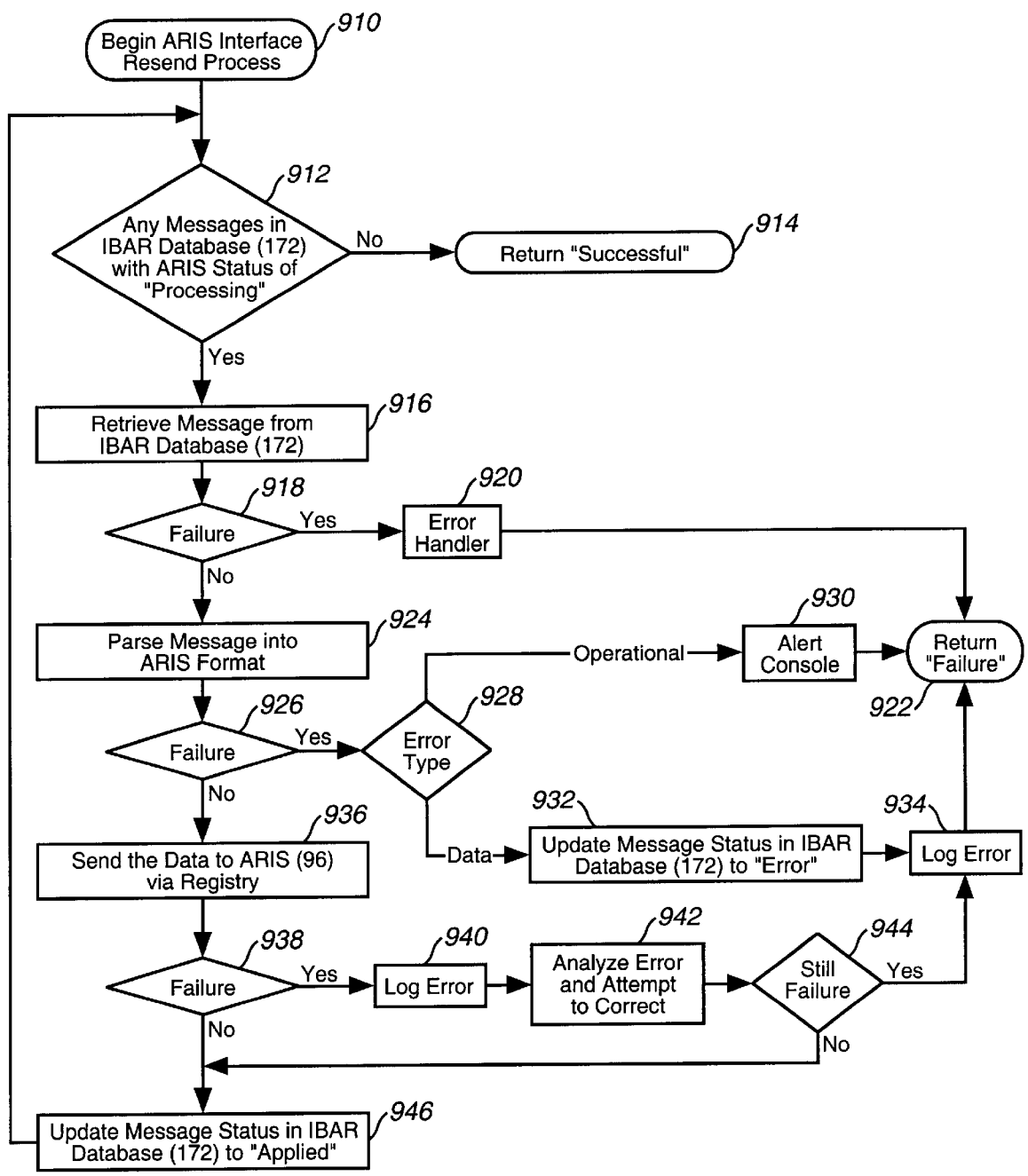

Turning now to FIG. 11E, the ARIS Interface resend process 808 and 856 will be described and begins at block 910. Decision block 912 determines if any messages in IBAR Database 172 (FIG. 7) have an ARIS status of "Processing". If no messages are found, a success notification is returned in block 914. If, however, a message is found, as determined in decision block 912, the message is retrieved from the IBAR Database 172 (FIG. 7) in block 916. Decision block 918 determines if a failure has occurred. If a failure has occurred, an error handler is called in block 920 and a failure notification is returned in block 922. If a failure has occurred, as determined in block 918, the message is parsed into an ARIS format in block 924. Decision block 926 determines if a failure has occurred while parsing the message. If a failure has occurred, decision block 928 determines the error type. If the error type is operational, the console is alerted in block 930 and a failure notification is returned in block 922. If, however, the error type is data, as determined in decision block 928, the message status in IBAR Database 172 (FIG. 7) is updated to "Error" in block 932, the error is logged in block 934, and a failure notification is returned in block 922. If a failure has not occurred, as determined in decision 926, the data is sent to the ARIS 96 (FIG. 4) via Registry in block 936. Decision block 938 determines if a failure has occurred while sending the data. If a failure has occurred, the error is logged in block 940 and an attempt is made to analyze and correct the error in block 942. Decision block 944 determines if there is still a failure. If a failure still has occurred, the error is logged in block 934 and a failure notification is returned in block 922. If the failure does not still occur, as determined in decision block 944 or there was no failure in the first place, as determined in decision block 938, the message status in the IBAR Database 172 (FIG. 7) is updated to "Applied" in block 946. Thereafter the process loops back to decision block 912 and continues the above described until all the messages having status of "Processing" in the IBAR Database 172 (FIG. 7) are sent or an error occurs.

Figure 11F:
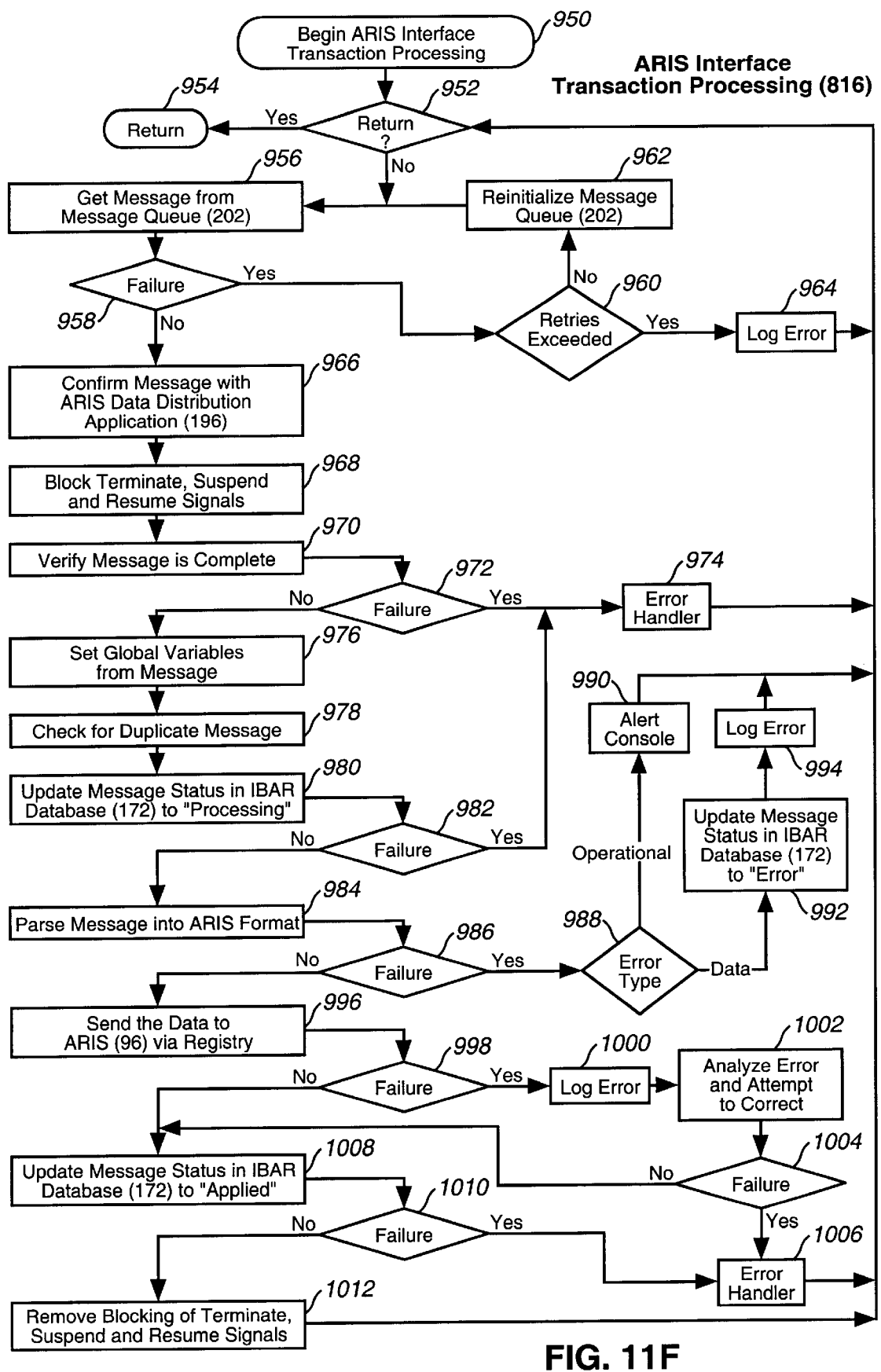

Turning now to FIG. 11F the ARIS Interface transaction processing 816 will be described and begins in block 950. Next, decision block 952 determines whether processing should return to the calling application. If processing should return, processing is returned in block 954. If, however, processing should not return, as determined in decision block 952, a message is retrieved from Message Queue 202 (FIG. 7) in block 956. Decision block 958 determines if a failure has occurred while retrieving a message from Message Queue 202 (FIG. 7). If a failure has occurred, decision block 960 determines if the number of retries has been exceeded. If the number of retries has been exceeded, an error is logged in block 964 and the process loops back to decision block 952. If, however, the number of retries has not been exceeded, as determined in decision block 960, the Message Queue 202 (FIG. 7) is reinitialized in block 962. A loop is then created back to block 956 to retrieve a message from Message Queue 202 (FIG. 7). If a failure has not occurred, as determined in decision block 958, the message is confirmed with the ARIS Data Distribution Application 196 (FIG. 7) in block 966. Next, the terminate, suspend and resume signals are blocked in block 968. The message is then verified as complete in block 970. Decision block 972 determines if the message verification has failed. If a failure has occurred, an error handler is call in block 974 and the process loops back to decision block 952. If, however, a failure has not occurred during message verification, as determined in decision block 972, the global variables from the message are set in block 976. Next, duplicate messages are checked in block 978 and the message status in the IBAR Database 172 (FIG. 7) is updated to "Processing" in block 980. Decision block 982 determines if a failure has occurred during processing. If a failure has occurred, an error handler is called in block 974 and processing loops back to decision block 952. If, however, a failure has not occurred, as determined in decision block 982, the message is parsed into an ARIS format in block 984. Decision block 986 determines if a failure has occurred while parsing the message. If a failure has occurred, decision block 988 determines the error type. If the error type is operational, the console is alerted in block 990, and processing loops back to decision block 952. If the error type is data, as determined in decision block 988, the message status in the IBAR Database 172 (FIG. 7) is updated to "Error" in block 992, the error is logged in block 994 and processing loops back to decision block 952. If a failure has not occurred, as determined in decision block 984, the data is sent to the ARIS 96 (FIG. 4) via Registry in block 996. Decision block 998 determines if a failure has occurred while sending the data. If a failure occurred, the error is logged in block 1000, and the error is analyzed and a correction is attempted in block 1002. Decision block 1004 determines if a failure still exists. If the failure still exists, an error handler is called in block 1006 and processing loops back to decision block 952. If a failure did not occur in the first place, as determined in decision block 998, or the failure was corrected, as determined in decision block 1004, the message status in the IBAR Database 172 (FIG. 7) is updated to "Applied" in block 1008. Decision block 1010 determines if a failure occurred while updating the IBAR Database 172 (FIG. 7). If a failure occurred, an error handler is called in block 1006 and processing loops back to decision block 952. If a failure has not occurred, as determined in decision block 1010, the terminate, suspend and resume signal blocking is removed in block 1012 and processing loops back to decision block 952.

Figure 11G:
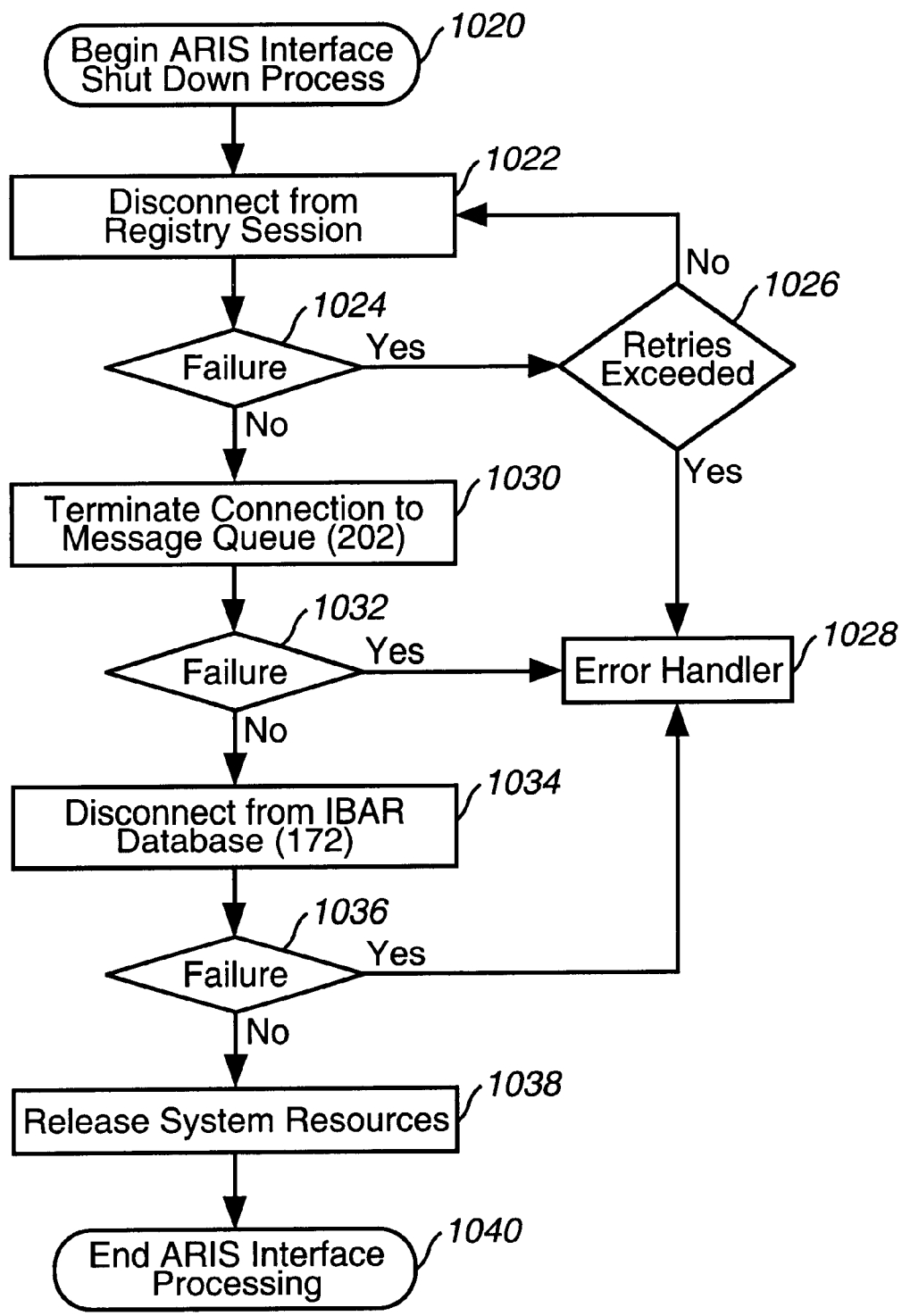

Turning now to FIG. 11G, the ARIS Interface shut down process 812 will be discussed and begins in block 1020. The Registry session is disconnected in block 1022. Decision block 1024 determines if a failure has occurred while disconnecting. If a failure has occurred, decision block 1026 determines if the number of retries has been exceeded. If the number of retries has been exceeded, an error handler is called in block 1028. If, however, the number of retries has not been exceeded, as determined in decision block 1026, the process loops back to block 1022 where the Registry session is disconnected. If, however, a failure has occurred while disconnecting from the Registry session, as determined in decision block 1024, the connection to Message Queue 202 (FIG. 7) is terminated in block 1030. Decision block 1032 determines if a failure occurred while terminating the Message Queue 202 (FIG. 7) connection. If a failure has occurred, an error handler is called in block 1028. If, however, a failure has not occurred while terminating the connection, as determined in decision block 1032, the system disconnects from the IBAR Database 172 (FIG. 7) in block 1034. Decision block 1036 determines if a failure has occurred while disconnecting from the IBAR Database 172 (FIG. 7). If a failure has occurred, an error handler is called in block 1028. If, however, a failure has not occurred, as determined in decision block 1036, the system resources are released in block 1038 and the ARIS Interface processing ends in block 1040.

Figure 12:
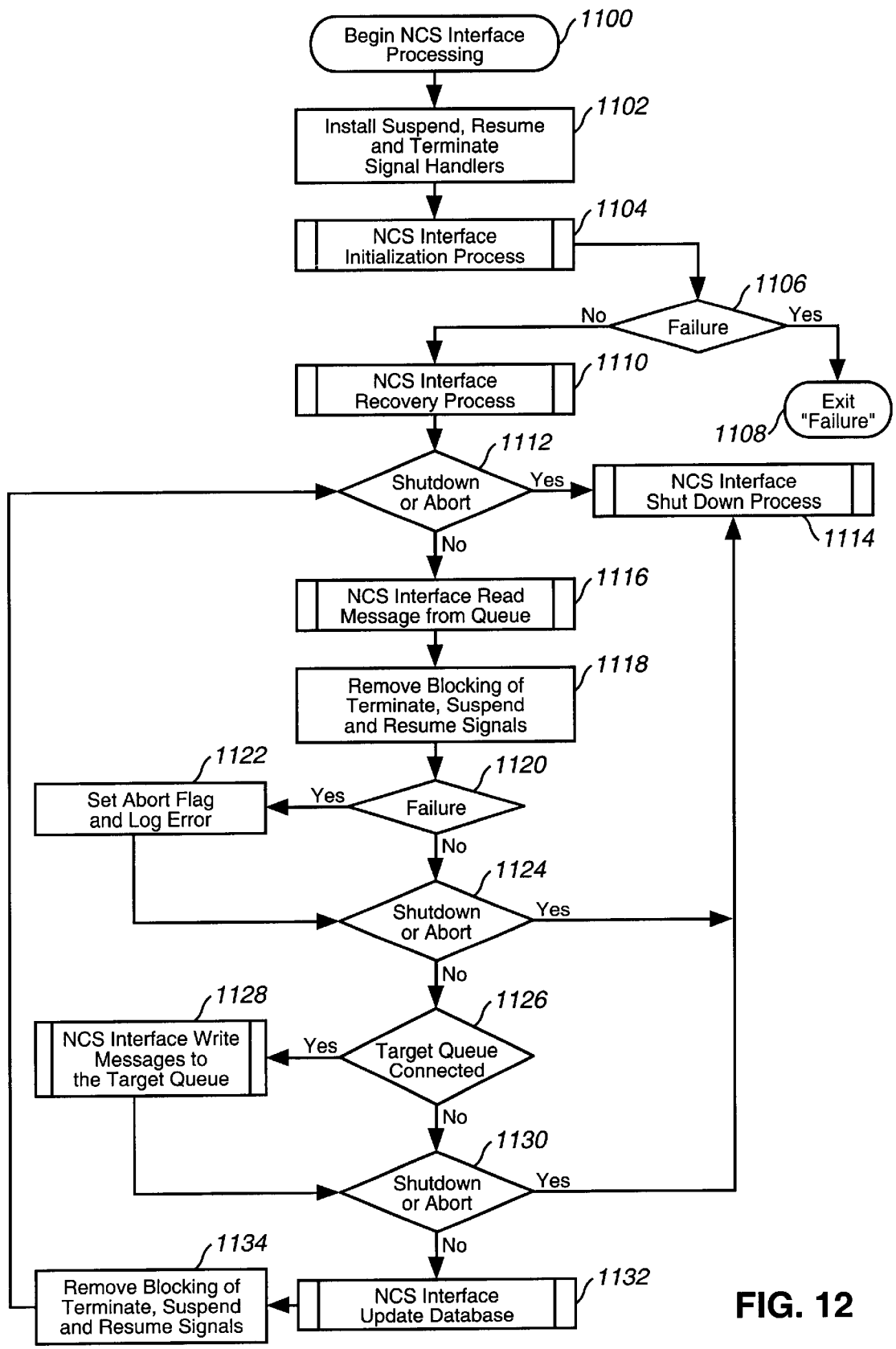
FIG. 12 is a flow chart for a Downstream Interface Subsystem for providing a NCS Request Processing Interface according to one embodiment.

Turning now to FIG. 12, the NCS request processing interface (hereinafter referred to as "NCS Interface") 214 (FIG. 7) will be described and begins processing in block 1100. The suspend, resume and terminate signal handlers are installed in block 1102 and the NCS Interface initialization process begins in block 1104. The NCS Interface initialization process 1104 will be described below in reference to FIG. 12D. Decision block 1106 determines if a failure has occurred during initialization. If a failure has occurred, the process exits and returns with a failure notification in block 1108. If a failure has not occurred, as determined in decision block 1106, the NCS Interface recovery process begins in block 1110. The NCS Interface recovery process 1110 will be described below in reference to FIG. 12E. Decision block 1112 determines whether the shutdown or abort flags are set. If the shutdown or abort flags are set, the NCS Interface shut down process begins in block 1114. The NCS Interface shut down process 1114 will be described below in reference to FIG. 12J. If the shutdown or abort flags are not set, the NCS Interface read a message from the queue begins in block 1116. The NCS Interface read a message from the queue 1116 will be described below in reference to FIG. 12F. The resume, suspend and terminate signal blocking is removed in block 1118. Decision block 1120 determines if a failure has occurred. If a failure has occurred the abort flag is set and an error is logged in block 1122. If, however, a failure has not occurred, as determined in block 1120, or the abort flag and error has been logged in block 1122, decision block 1124 determines whether the shut down or abort flags are set. If the shut down or abort flags are set, the NCS Interface shut down process begins in block 1114. If, however, the shutdown or abort flags are not set, as determined in decision block 1124, decision block 1126 determines if the target queue is connected. If the target queue is connected, the NCS Interface write messages to the target queue begins in block 1128. The NCS Interface write messages to the target queue process 1128 will be described below in reference to FIG. 12G. If, however, the target queue is not connected, as determined in decision block 1126, decision block 1130 determines whether the shutdown or abort flags are set. If the shut down or abort flag is set, the NCS Interface shut down process begins in block 1114. If, however, the shut down or abort flags are not set, as determined in decision block 1130, the NCS Interface update database process begins in block 1132. The NCS Interface update database process 1132 will be described below in reference to FIG. 12H. The terminate, suspend and resume signal blocking is removed in block 1134 and the process loops back to decision block 1112.

Figure 12A:
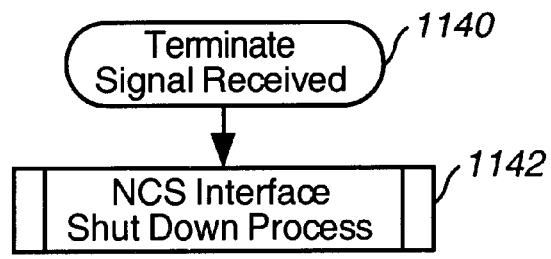
FIGS. 12B, 12C, 12D, 12E, 12F, 12G, 12H, 12I and 12J are flow charts for various processes in the Downstream Interface Subsystem for providing a NCS Request Processing Interface according to one embodiment.

Turning now to FIG. 12A, the NCS Interface response to a terminate signal will be described and begins in block 1140 when the terminate signal is received. Next, the NCS Interface shut down process is begun in block 1142.

Figure 12B:
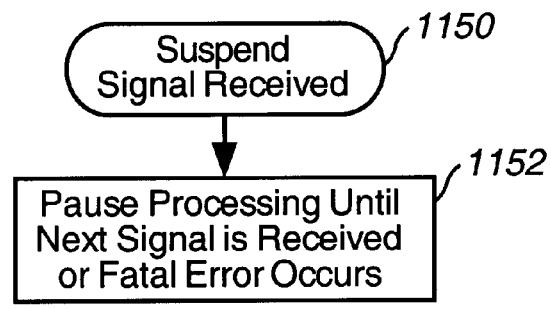

Turning now to FIG. 12B, the NCS Interface response to a suspend signal will be described and begins in block 1150 when the suspend signal is received. Next, the process pauses until the next signal is received or a fatal error occurs in block 1152.

Figure 12C:
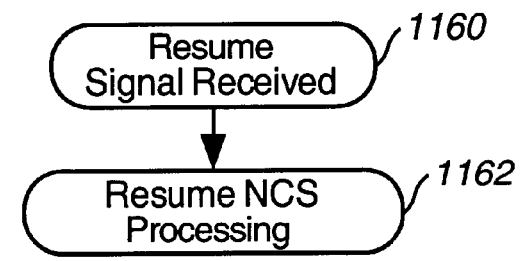

Turning now to FIG. 12C, the NCS Interface response to a resume signal will be described and begins in block 1160 when the resume signal is received. NCS Interface processing is then resumed in block 1162.

Figure 12D:
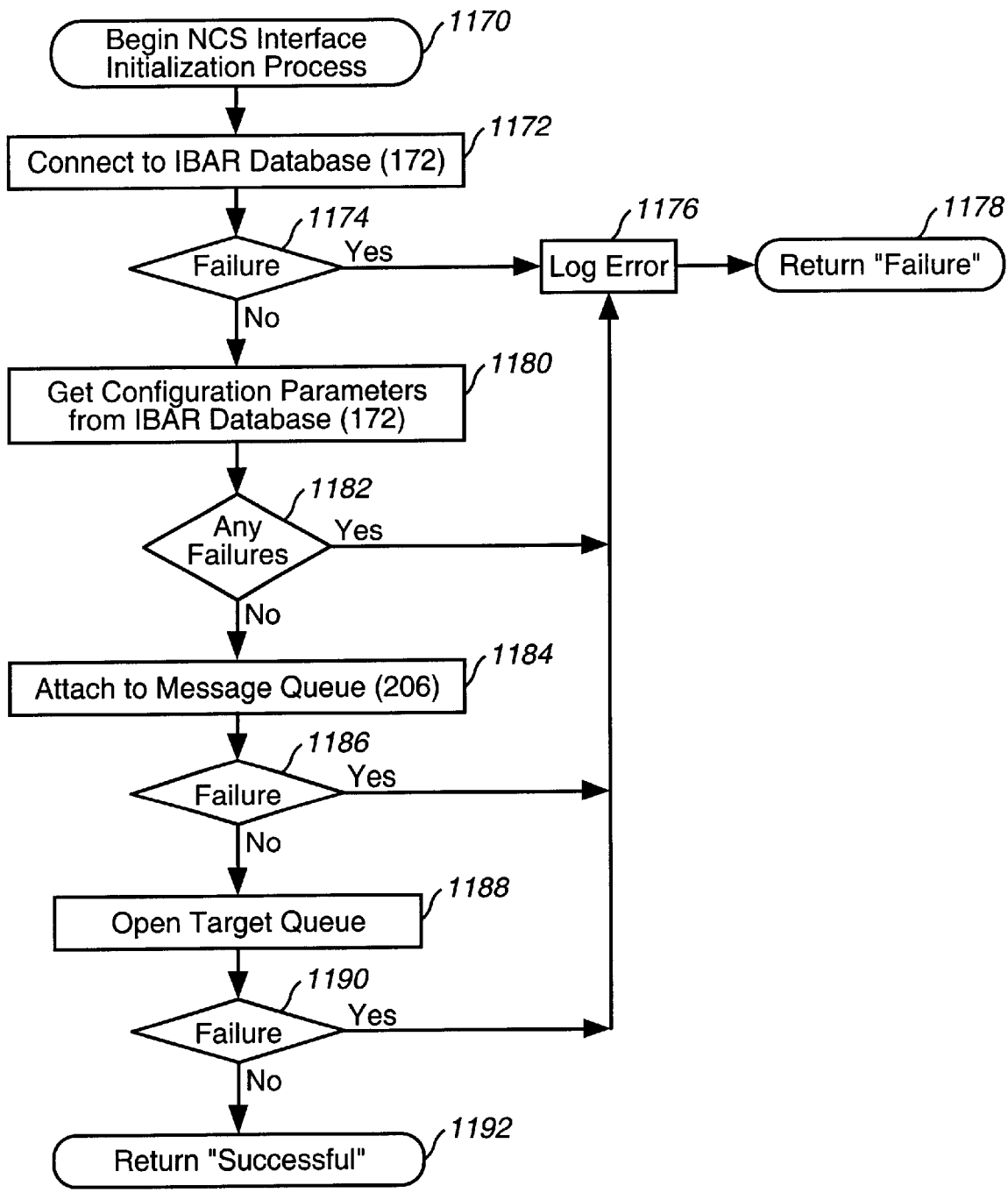

Turning now to FIG. 12D, the NCS Interface initialization process 1104 will be described and begins in block 1170. Next, a connection to the IBAR Database 172 (FIG. 7) is made in block 1172. Decision block 1174 determines if a failure has occurred while connecting to the IBAR Database 172 (FIG. 7). If a failure has occurred, the error is logged in block 1176 and a failure notification is returned in block 1178. If, however, a failure has not occurred, as determined in decision block 1174, the configuration parameters are retrieved from the IBAR Database 172 (FIG. 7) in block 1180. Decision block 1182 determines if a failure has occurred. If a failure has occurred, the error is logged in block 1176 and a failure notification is returned in block 1178. If, however, a failure has not occurred, as determined in decision block 1182, the NCS Interface 214 (FIG. 7) attaches to Message Queue 206 (FIG. 7) in block 1184. Decision block 1186 determines if a failure has occurred while attaching to Message Queue 206 (FIG. 7). If a failure has occurred, the error is logged in block 1176 and a failure notification is returned in block 1178. If, however, a failure has not occurred, as determined in decision block 1186, the target queue is opened in block 1188. Decision block 1190 determines if a failure has occurred while opening the target queue. If a failure has occurred, the error is logged in block 1176 and a failure notification is returned in block 1178. If, however, a failure has not occurred, as determined in decision block 1190, a success notification is returned in block 1192.

Figure 12E:
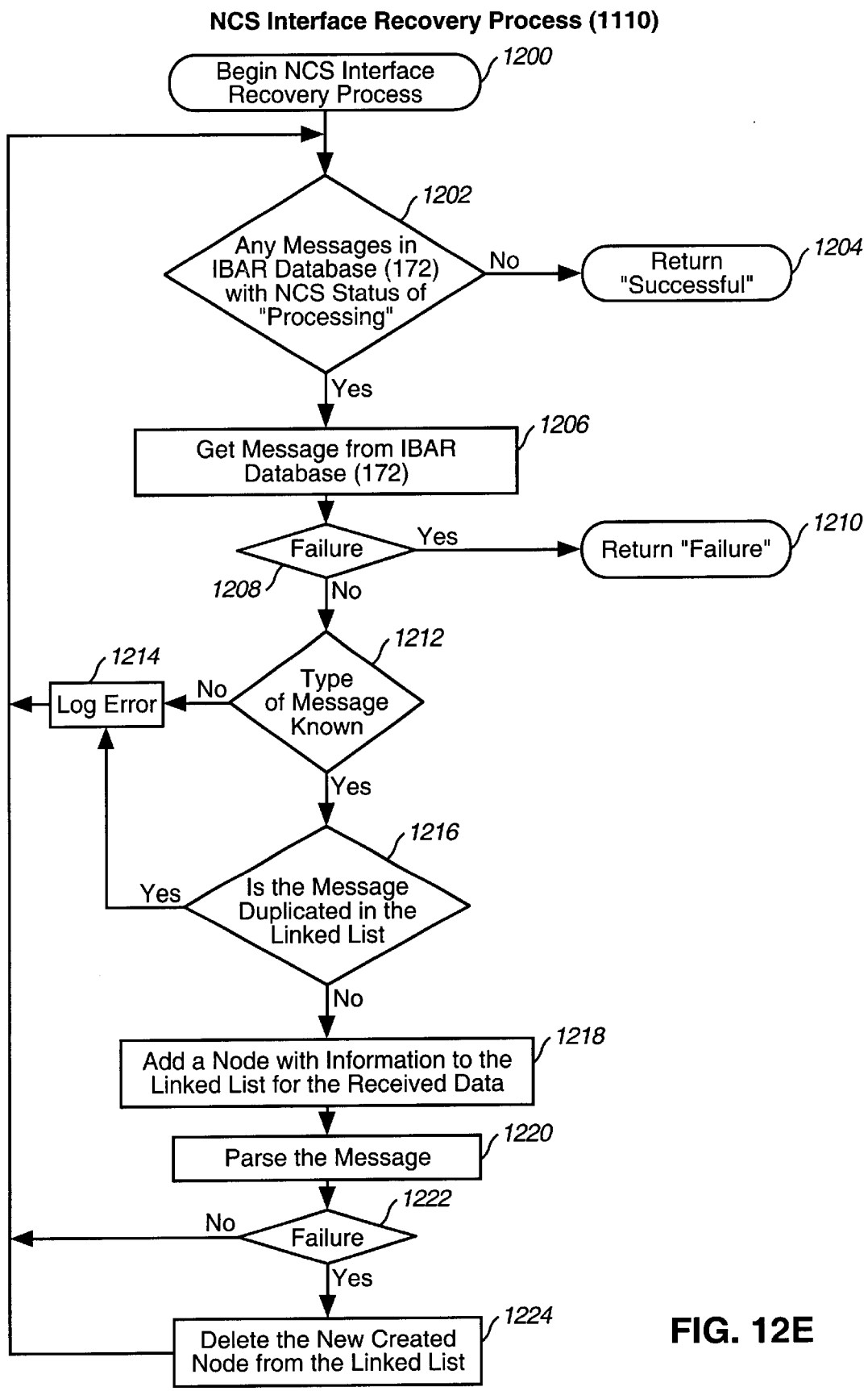

Turning now to FIG. 12E, the NCS Interface recovery process 1110 will be described and begins at block 1200. Decision block 1202 determines if any messages are in the IBAR Database 172 (FIG. 7) with a NCS status of "Processing". If no messages exist, a success notification is returned in block 1204. If, however, messages with a status of "Processing" do exist, as determined in decision block 1202, the first message is retrieved from the IBAR Database 172 (FIG. 7) in block 1206. Decision block 1208 determines if a failure has occurred during message retrieval. If a failure has occurred, a failure notification is returned in block 1210. If a failure has not occurred, as determined in decision block 1208, decision block 1212 determines whether the type of message is known. If the type of message is not known, an error is logged in block 1214. If, however, the type of message is known, decision block 1216 determines if the message is duplicated in the linked list. If the message is duplicated, an error is logged in block 1214. If, however, the message is not duplicated, as determined in decision block 1216, a node with information to the linked list for the received data is added in block 1218. Next, the message is parsed in block 1220. Decision block 1222 determines if a has occurred. If a failure has not occurred, the process returns to decision block 1202. If, however, a failure did occur, as determined in decision block 1222, the new node is deleted from the linked list in block 1224 and the process loops back to decision block 1202.

Figure 12F:
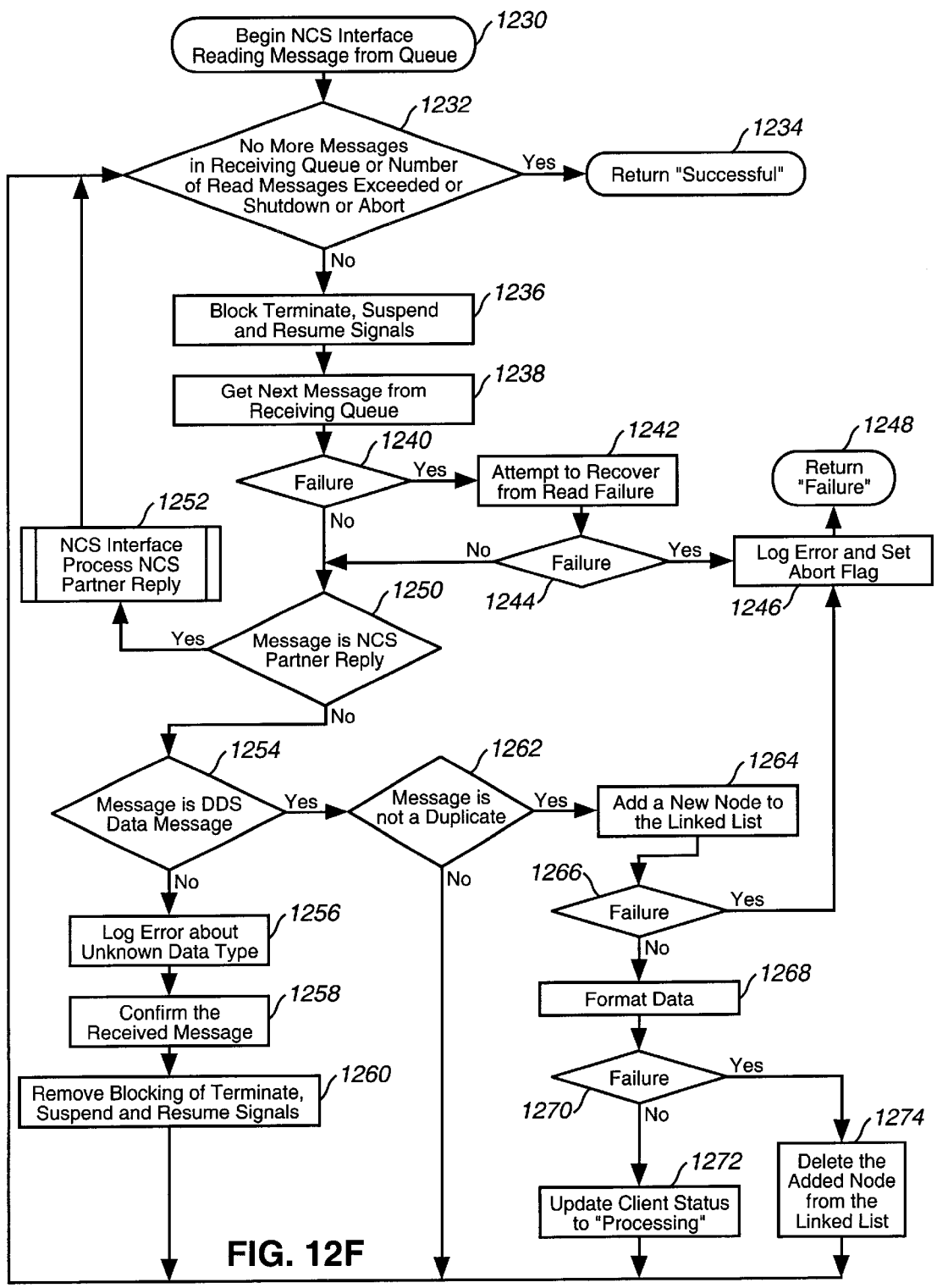

Turning now to FIG. 12F, the NCS Interface reading a message from the queue will be described and begins in block 1230. Decision block 1232 determines if there are no more messages in the receiving queue, or the number of read messages has been exceeded, or the process has been shutdown or aborted. If any of the above have occurred, a success notification is returned in block 1234. If, however, none of the above have occurred, the terminate, suspend and resume signals are blocked in block 1236. The next message is then retrieved from the receiving queue in block 1238. Decision block 1240 determines if a failure has occurred while reading the message. If a failure has occurred, an attempt to recover from the read failure is made in block 1242. Decision block 1244 determines if the recovery was successful. If the failure still exists, the error is logged and the abort flag is set in block 1246, and a failure notification is returned in block 1248. If, however, there was never a failure while retrieving the message, as determined in decision block 1240, or the recovery attempt was successful, as determined in decision block 1244, decision block 1250 determines if the message is a NCS partner reply. If the message is a NCS partner reply, the NCS Interface process NCS partner reply begins in block 1252, and the process loops back to decision block 1232. The NCS Interface process NCS partner reply 1252 will be described below in reference to FIG. 12G. If, however, the message is not a NCS partner reply, as determined in decision block 1250, Decision block 1254 determines if a data message is a DDS data message. If the message is not a DDS data message, an error is logged indicating that an unknown data type has been encountered in block 1256. Next, the received message is confirmed in block 1258. The blocking of the terminate, suspend and resume signals are removed in block 1260 and the process loops back to decision block 1232. If, however, the message is a DDS data message, as determined in decision block 1254, decision block 1262 determines if the message is not a duplicate. If the message is a duplicate, the process loops back to decision block 1232. If, however, the message is not a duplicate, as determined in decision block 1262, a new node is added to the linked list in block 1264. Decision block 1266 determines if a failure occurred while adding the new node to the linked list. If a failure has occurred, the error is logged and the abort flag is set in block 1246, and a failure notification is returned in block 1248. If a failure has not occurred, as determined in decision block 1266, the data is formatted in block 1268. Decision block 1270 determines if a failure occurred while formatting data. If a failure has not occurred, the client status is updated to "Processing" in block 1272, and the process loops back to decision block 1232. If, however, a failure has occurred, as determined in decision block 1270, the added node is deleted from the linked list in block 1274, and the process loops back to decision block 1232.

Figure 12G:
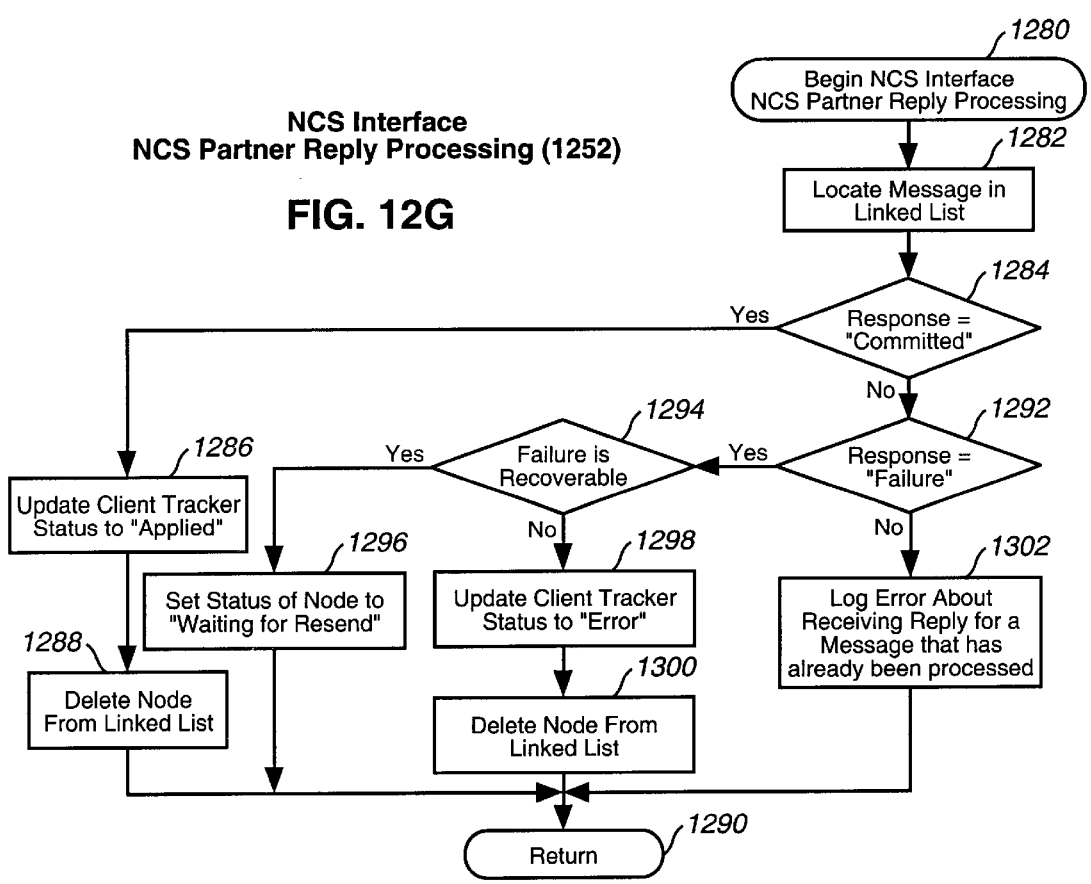

Turning now to FIG. 12G, the NCS Interface NCS partner reply process 1252 will be described and begins in block 1280. Next, the message is located in the linked list in block 1282. Decision block 1284 determines if the response equals "Committed." If the response does equal "Committed", the client tracker status is updated to "Applied" in block 1286. Next, the node is deleted from the linked list in block 1288 and the process returns to the calling application in block 1290. If, however, the response does not equal "Committed", as determined in decision block 1284, decision block 1292 determines if the response equals "Failure." If the response does equal "Failure", decision block 1294 determines if the failure is recoverable. If the failure is recoverable, the node status is set to "Waiting for resend" in block 1296. If, however, the failure is not recoverable, as determined in decision block 1294, the client tracker status is updated to "Error" in block 1298 and the node is deleted from the linked list in block 1300. The process then returns to the calling application in block 1290. If, however, the response does not equal "Failure", as determined in decision block 1292, the error about receiving the reply for a message that has already been processed is logged in block 1302, and the process returns to the calling application in block 1290.

Figure 12H:
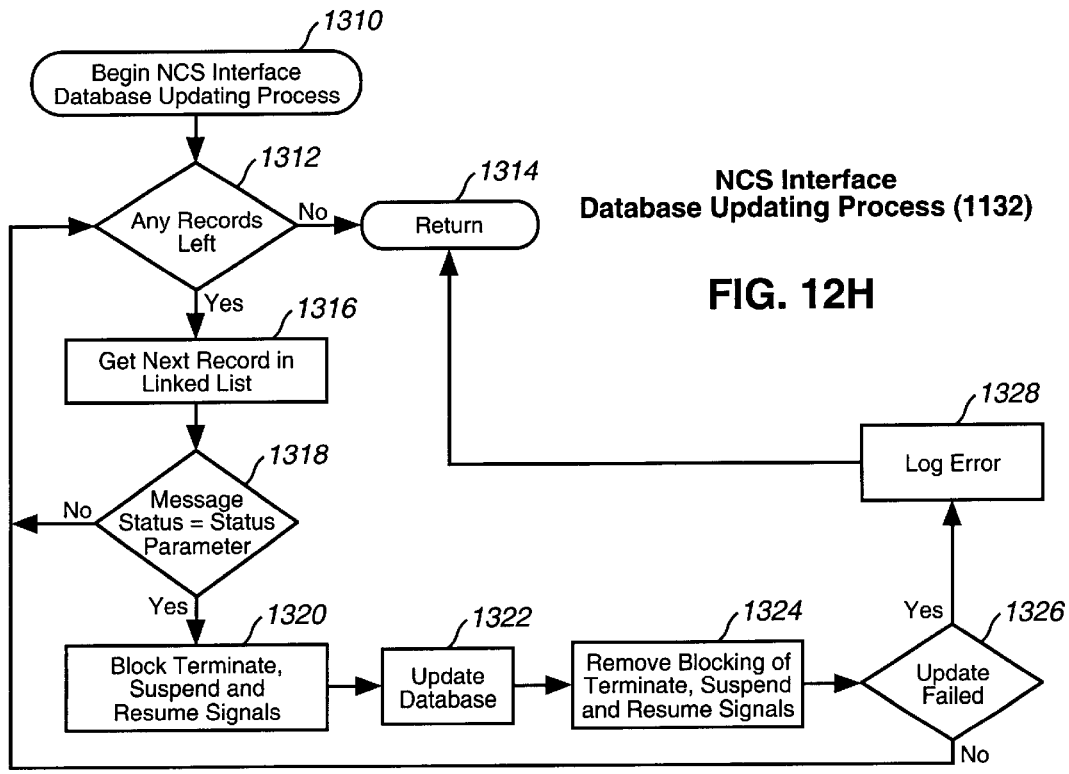

Turning now to FIG. 12H, the NCS Interface database updating process 1132 will be described and begins in block 1310. Decision block 1312 determines if any records are left. If no records are left, the process returns to the calling application in block 1314. If, however, there are records left, as determined in decision block 1312, the next record in the linked list is retrieved in block 1316. Decision block 1318 determines if the message status equals the defined status parameter. If the message status does not equal the status parameter, the process loops back to decision block 1312. If, however, the message status does equal the status parameter, as determined in decision block 1318, the terminate, suspend and resume signals are blocked in block 1320. Next, the database is updated in block 1322 and the terminate, suspend and resume signals are unblocked in block 1324. Decision block 1326 determines if the update failed. If the update failed, the error is logged in block 1328 and the process returns to calling application in block 1314. If, however, the update did not fail, as determined in decision block 1326, the process loops back to decision block 1312.

Figure 12I:
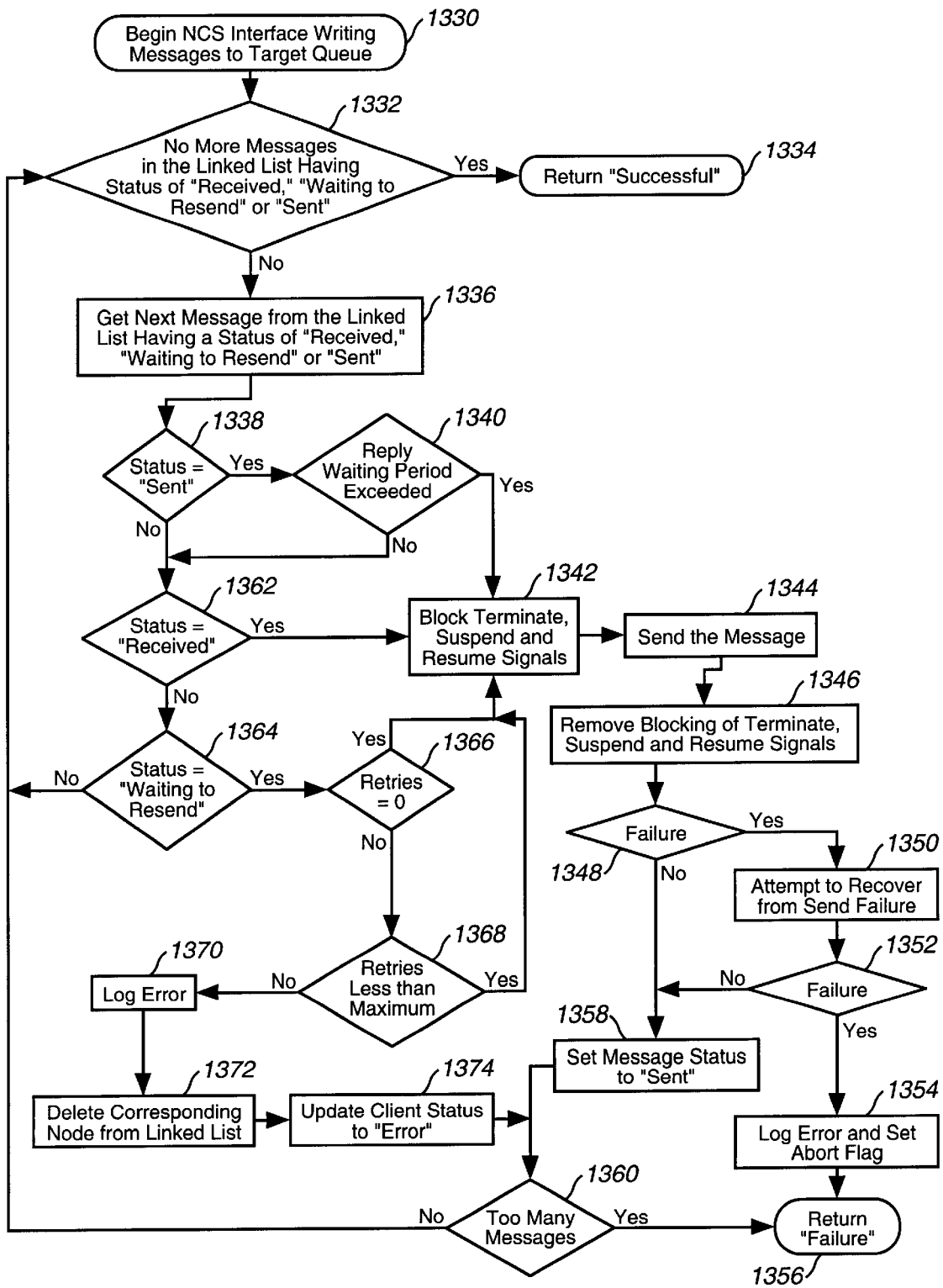

Turning now to FIG. 12I, the NCS Interface writing messages to the target queue 1128 will be described and begins in block 1330. Decision block 1332 determines if there are no more messages in the linked list that have a status of "Received", "Waiting to Resend" or "Sent." If there are no more messages in the linked list having the status values checked for in decision block 1332, a successful notification is returned in block 1334. If, however, there are more messages in the linked list, as determined in decision block 1332, the messages are retrieved from the linked list in block 1336. Decision block 1338 determines if the status of the message retrieved from the linked list equals "Sent." If the message status equals "Sent", decision block 1340 determines if the reply waiting period has been exceeded. If the reply waiting period has been exceeded the terminate, suspend and resume signals are blocked in block 1342. Next, the message is sent in block 1344, and the terminate, suspend and resume signals are unblocked in block 1346. Decision block 1348 determines if a failure has occurred while sending the message. If a failure has occurred, an attempt to recover from the failure is made in block 1350. Decision 1352 determines if the recovery attempt failed. If the recovery attempt failed, the error is logged and the abort flag is set in block 1354 and a failure notification is returned to the calling application in block 1356. If, however, the message was sent successfully, as determined in decision block 1348, or the send failure was recovered, as determined in decision block 1352, the message status is set to "Sent" in block 1358. Decision block 1360 determines if there are too many messages. If there are too many messages, a failure notification is returned to the calling application in block 1356. If, however, there are not too many messages, as determined in decision block 1360, the process loops back to decision block 1332.

If, however, the message status does not equal "Sent", as determined in decision block 1338, or the reply waiting period was not exceeded, as determined in decision block 1340, decision block 1362 determines if the message status equals "Received." If the message status equals "Received", the terminate, suspend and resume signals are blocked in block 1342 and sends the message as previously described. If, however, the message status does not equal "Received", decision block 1364 determines if the message status equals "Waiting to Resend." If the message status does not equal "Waiting to Resend," the process loops back to decision block 1332. If, however, the message status does equal "Waiting to Resend", decision block 1368 determines if the number of retries has been exceeded. If the maximum number of retries has been exceeded, the terminate, suspend and resume signals are blocked in block 1342 and the message is sent as previously described. If, however, the maximum number of retries has not been exceeded, as determined in decision block 1368, an error is logged in block 1370, the corresponding node is deleted from the linked list in block 1372, and the client status is updated to "Error" in block 1374. Next, decision block 1360 determines if there are too many messages. If too many messages exist, a failure notification is returned to the calling application in block 1356. If there are not too many messages, as determined in decision block 1360, the process loops back to decision block 1332.

Figure 12J:
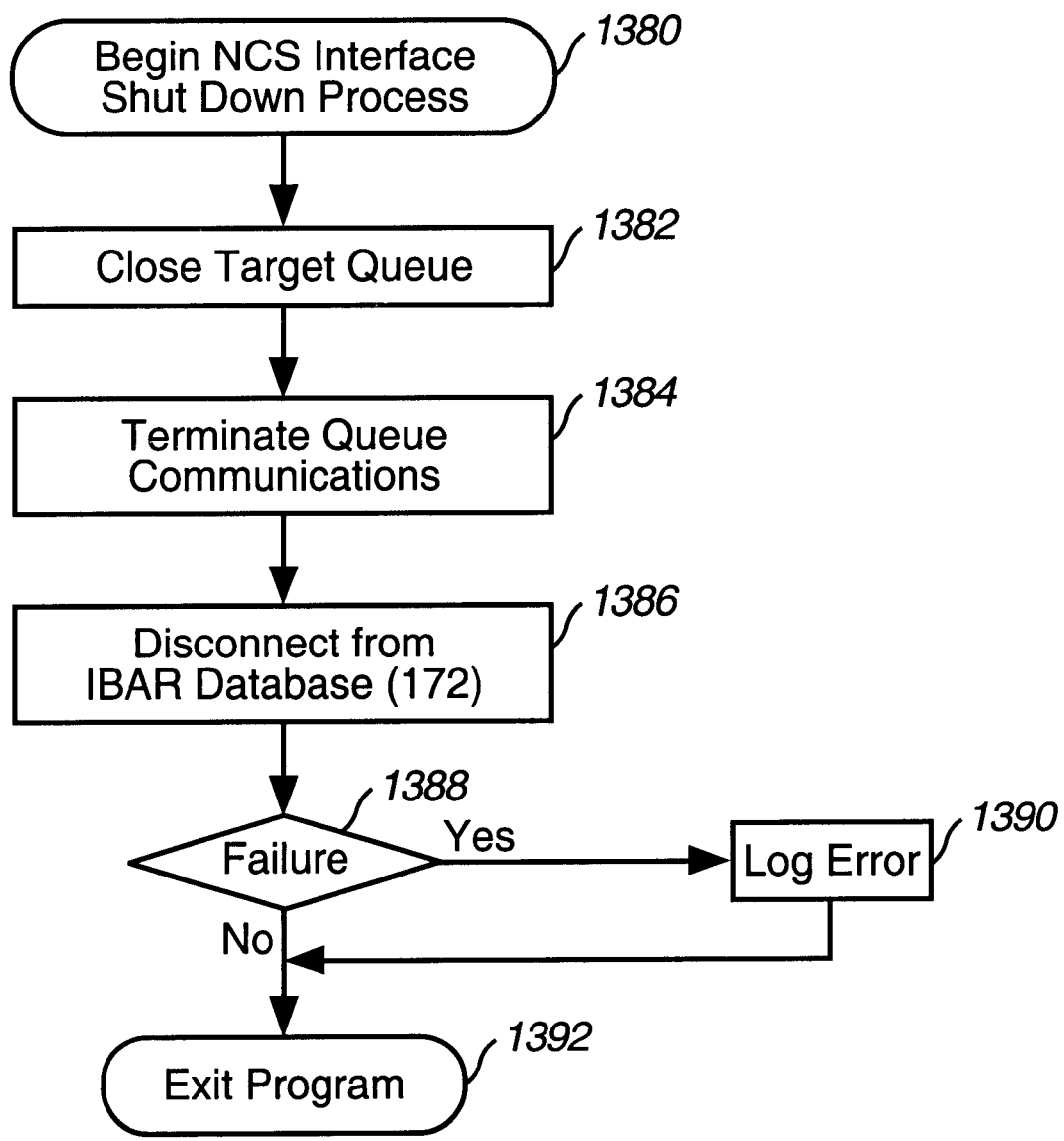

Turning now to FIG. 12J, the NCS Interface shut down process 1114 will be described and begins in block 1380. Next, the target queue is closed in block 1382. Next, queue communications are terminated in block 1384. Next, the NCS Interface disconnects from the IBAR Database 172 (FIG. 7) in block 1386. Decision block 1388 determines if any failures have occurred. If a failure has occurred, an error is logged in block 1390. If, however, a failure has not occurred, as determined in decision block 1388, or the error has been logged in block 1390, the NCS Interface ends processing in block 1392.

Figure 13:
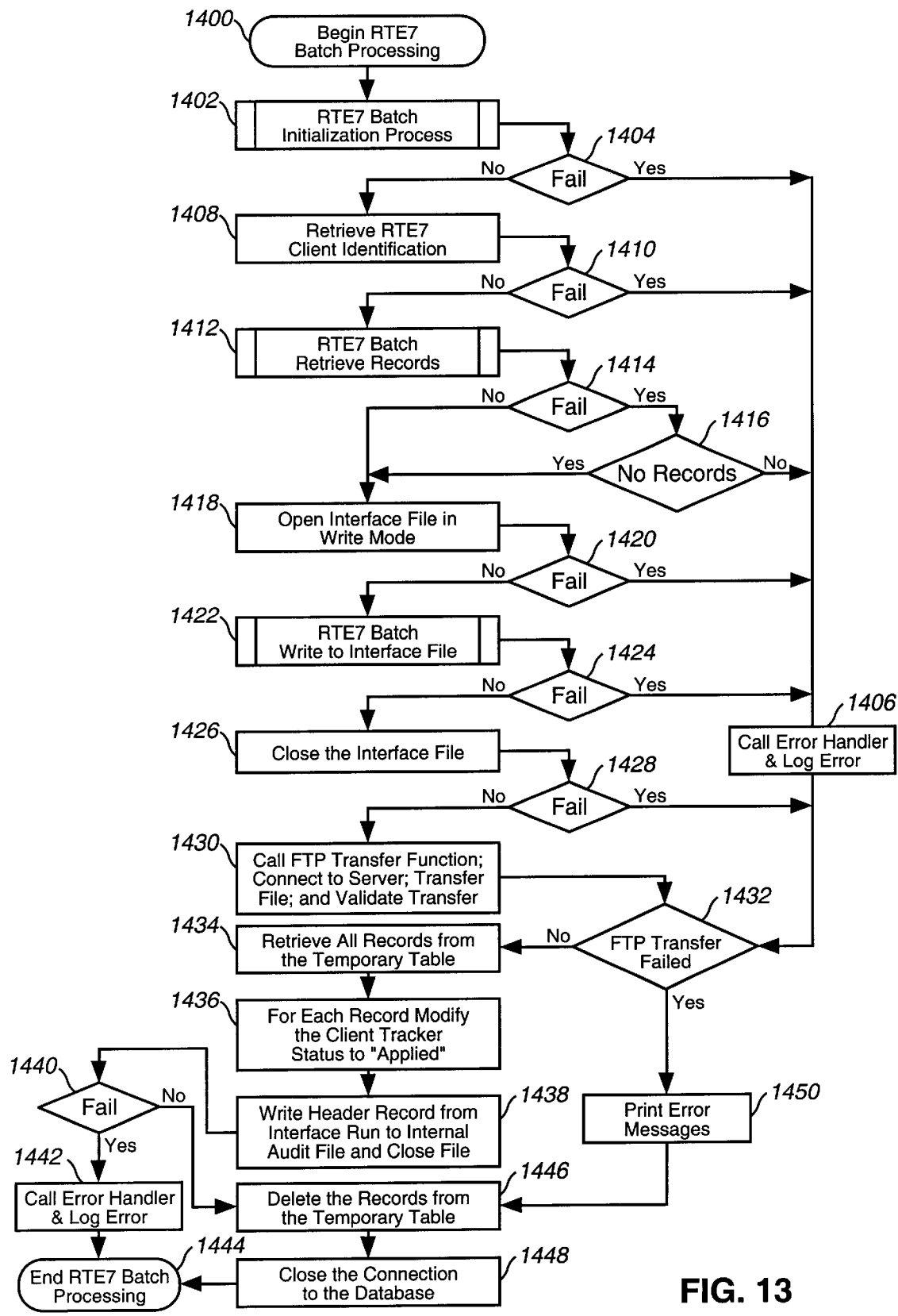
FIG. 13 is a flow chart for a Downstream Interface Subsystem for providing a RTE7 Batch Extract according to one embodiment.

Turning now to FIG. 13, the RTE7 batch extract process 216 will be described and begins in block 1400. Next, the RTE7 Batch initialization process beings in block 1402. The RTE7 Batch initialization process 1402 will be described below in reference to FIG. 13A. Decision block 1404 determines if the initialization failed. If the initialization failed, an error handler is called and the error is logged in block 1406. If, however, the initialization was successful, as determined in decision block 1404, the RTE7 client identification is retrieved in block 1408. Decision block 1410 determines if a failure occurred while retrieving the client identification. If a failure occurred, an error handler is called and the error is logged in block 1406. If, however, a failure did not occur, as determined in decision block 1410, the RTE7 Batch retrieve records process begins in block 1412. The RTE7 Batch retrieve records process 1412 will be described below in reference to FIG. 13B. Decision block 1414 determines if a failure occurred during the RTE7 Batch retrieve records process. If a failure did occur, decision block 1416 determines if any records were retrieved in process 1412. If there were records retrieved, an error handler is called and the error is logged in block 1406. If, however, an error did not occur, as determined in decision block 1414, or no records were retrieved in process 1412, as determined in decision block 1416, an interface file is opened in write mode in block 1418. Decision block 1420 determines whether a failure has occurred. If a failure has occurred, an error handler is called and the error is logged in block 1406. If, however, a failure has not occurred, as determined in decision block 1420, the RTE7 Batch write to interface file process begins in block 1422. The RTE7 Batch write to interface file process 1420 will be described below in reference to FIG. 13B. Decision block 1424 determines whether a failure has occurred. If a failure has occurred, an error handler is called and the error is logged in block 1406. If, however, a failure has not occurred, as determined in decision block 1424, the interface file is closed in block 1426. Decision block 1428 determines whether a failure has occurred. If a failure has not occurred, the FTP transfer function is called, a connection is made to the server, the file is transferred and the transfer is validated in block 1430. If, however, a failure has occurred, as determined in decision block 1428, or the error handling and logging of block 1406 is complete, or the file transfer of block 1430 is complete, decision block determines whether the FTP transfer failed. If the FTP transfer did not fail, all records are retrieved from the temporary table in block 1434 and each record is modified such that the client tracker status is updated to "Applied" in 1436. A header record from the interface run is written to an internal audit file and the file is then closed in block 1438. Decision block 1440 determines whether a failure had occurred. If a failure has occurred, an error handler is called and the error is logged in block 1442, and RTE7 Batch processing ends in block 1444. If, however, a failure has not occurred, as determined in decision block 1440, the records are deleted from the temporary table and the connection to the database is closed in block 1448. RTE7 Batch processing then ends in block 1444. If, however, the FTP transfer failed, as determined in decision block 1432, error messages are printed in block 1450 and the records are deleted from the temporary table in block 1446. The connection to the database is closed in block 1448 and RTE7 Batch processing ends in block 1444.

Figure 13A:
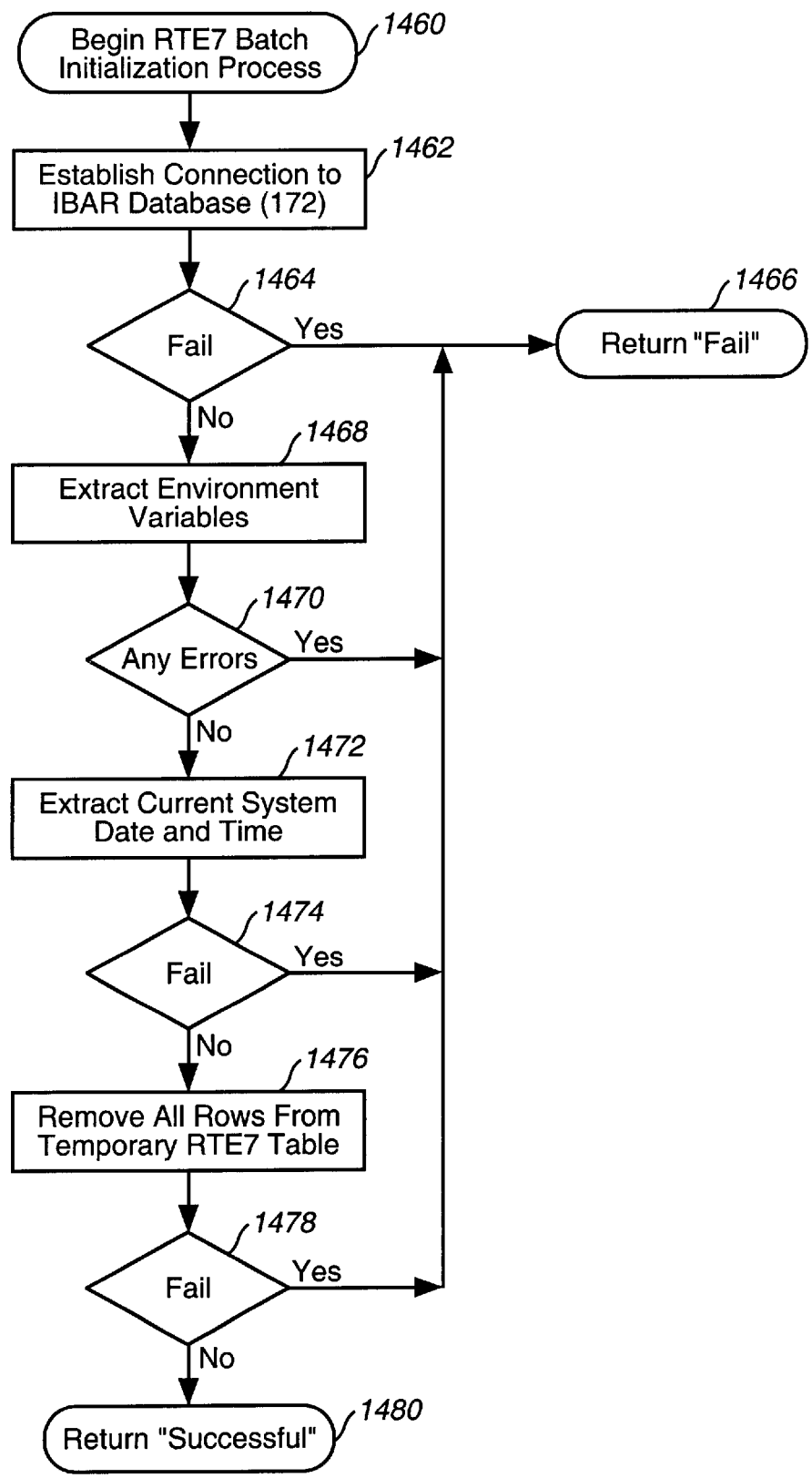
FIGS. 13A, 13B and 13C are flow charts for various processes within the Downstream Interface Subsystem for providing a RTE7 Batch Extract according to one embodiment.

Turning now to FIG. 13A, the RTE7 Batch initialization process 1402 will be described and begins in block 1460. Next, a connection to the IBAR Database 172 (FIG. 7) is established in block 1462. Decision block 1464 determines if the connection failed. If the connection failed, a failure notification is returned to the calling application in block 1466. If the connection to the IBAR Database 172 (Figure) did not fail, as determined in decision block 1464, the environment variables are extracted in block 1468. Decision block 1470 determines if any errors occurred while extracting the variables. If an error has occurred, a failure notification is returned to the calling application in block 1466. If, however, no errors have occurred while extracting variables, as determined in decision block 1470, the current system date and time are extracted in block 1472. Decision block 1474 determines if a failure occurred while extracting the current date and time. If a failure has occurred, a failure notification is returned to the calling application in block 1466. If, however, a failure has not occurred while extracting the date and time, as determined in decision block 1474, all rows from the temporary RTE7 table are removed in block 1476. Decision block 1478 determines if a failure occurred while removing the rows from the temporary RTE7 table. If a failure has occurred, a failure notification is returned to the calling application in block 1466. If, however, a failure has not occurred while removing the rows from the temporary RTE7 table, a successful notification is returned to the calling application in block 1480.

Figure 13B:
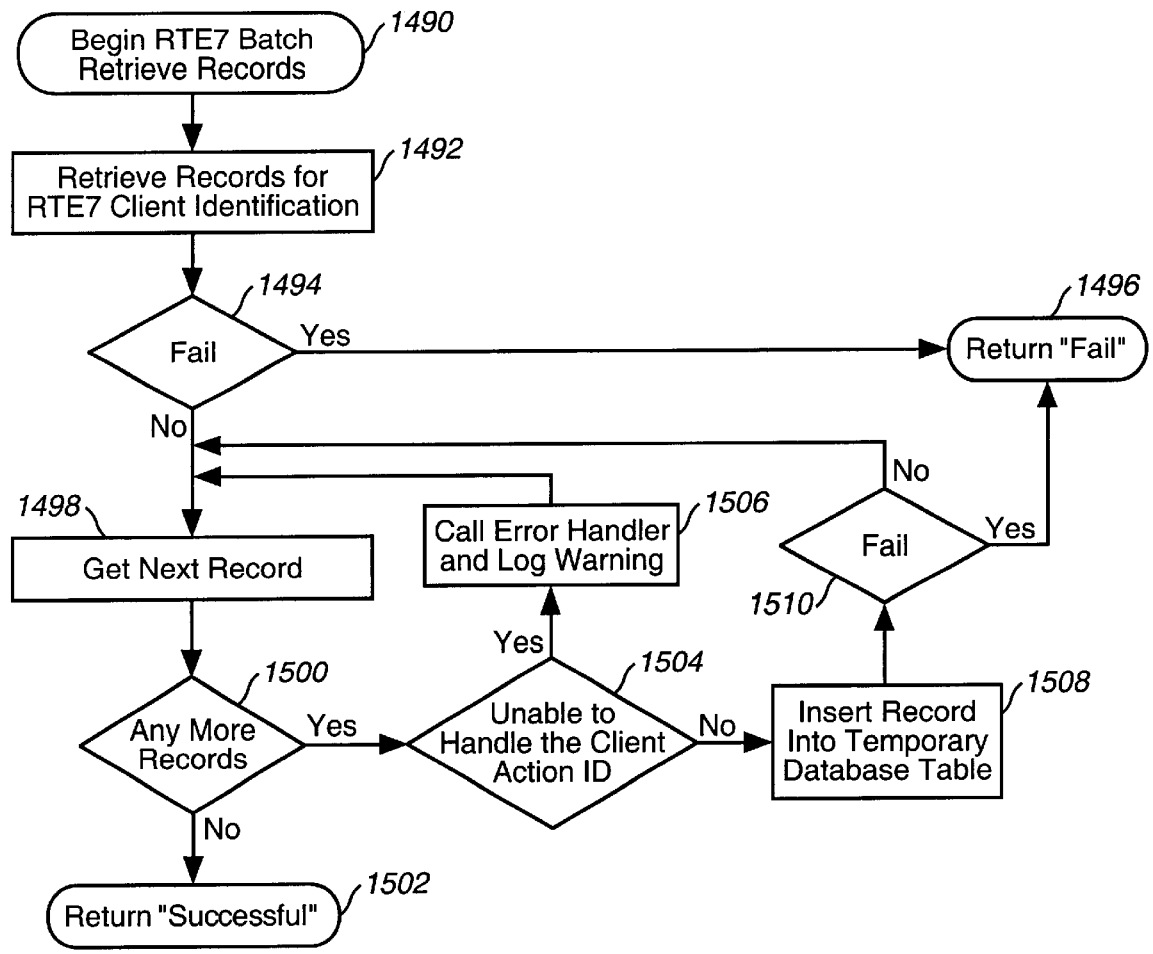

Turning now to FIG. 13B, the RTE7 Batch retrieve records process will be described and begins in block 1490. Next, records for the RTE7 client identification are retrieved in block 1492. Decision block 1494 determines if a failure has occurred while retrieving records for client identification. If a failure has not occurred, a failure notification is returned to the calling application in block 1496. If, however, a failure has not occurred while retrieving the records, as determined in decision block 1494, the next record is obtained in block 1498. Decision block 1500 determines if there are any more records. If there are no more records, a successful notification is returned in block 1502. If, however, there are more records, as determined in decision block 1500, decision block 1504 determines if the process is unable to handle the client action ID. If the process is unable to handle the client action ID, an error handler routine is called and a warning is logged in block 1506 and processing loops back to block 1498, where the next record is obtained. If, however, the RTE7 record retrieval is able to handle the client action ID, the record is inserted into the temporary database table in block 1508. Decision block 1510 determines if inserting the record into the temporary database table failed. If a failure has occurred, the process loops back to block 1498, where the next record is obtained. If, however, a failure has occurred, as determined in decision block 1510, a failure notification is returned to the calling application in block 1496.

Figure 13C:
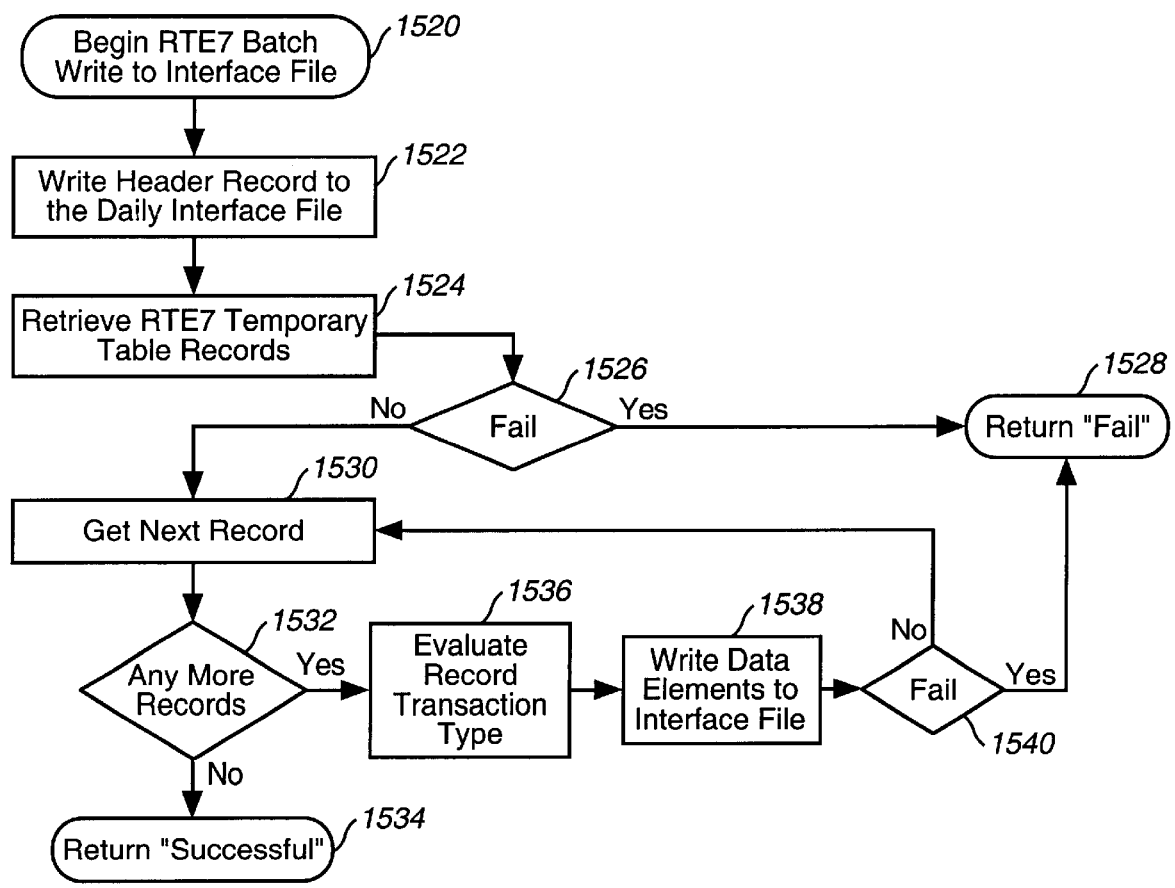

Turning now to FIG. 13C, the RTE7 Batch write to interface file will be described and begins in block 1520. The header record is written to the daily interface file in block 1522 and the RTE7 temporary table records are retrieved in block 1524. Decision block 1526 determines if retrieving the temporary records failed. If a failure has occurred, a fail notification is returned to the calling application in block 1528. If, however, a failure has not occurred, as determined in decision block 1526, the next record is obtained in block 1530. Decision block 1532 determines if there are any more records. If there are no more records, a successful notification is returned to the calling application in block 1534. If, however, there are more records, as determined in block 1532, the record transaction type is evaluated in block 1536 and the data elements are written to the interface file in block 1538. Decision block 1540 determines if a failure has occurred while writing data elements to the interface file. If a failure has not occurred, the process loops back to block 1530 where the next record is obtained. If, however, a failure has occurred, a failure notification is returned to the calling application in block 1528.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. An interface system that allows a telephone data repository to communicate with a separate external system, the interface system comprising:

a first communications link connecting the telephone data repository to an interface;

a second communications link connecting the interface to the external system; and the interface configured to retrieve a plurality of telephone data from the telephone data repository via the first communications link, format the plurality of telephone data into a plurality of formatted telephone data that is compatible with the external system, and to send the plurality of formatted telephone data to the external system via the second communications link, wherein the plurality of telephone data includes a plurality of activated telephone numbers, a plurality of deactivated telephone numbers, and a plurality of local number portability requests.

2. The interface system as recited in claim 1, wherein the first communications link comprises:

a data distribution subsystem;

a third communications link connecting the interface to the data distribution subsystem; and a fourth communications link connecting the data distribution subsystem to the telephone data repository.

3. The interface system as recited in claim 1, wherein the external system is an ANI Reference Information System.

4. The interface system as recited in claim 1, wherein the external system is a Metro Intelligent Network Administration Service Management System.

5. The interface system as recited in claim 1, wherein the external system is a Network Control System.

6. The interface system as recited in claim 1, wherein the external system is a Provisions Voice Network.

7. The interface system as recited in claim 1, wherein the plurality of telephone data comprises a plurality of telephone porting data defining how to route a call from a first service provider to a second service provider.

8. The interface system as recited in claim 1, wherein the plurality of telephone data comprises:

a plurality of telephone network data; and a plurality of subscription information.

9. The interface system as recited in claim 1, wherein the plurality of telephone data further comprises:

a plurality of modified telephone numbers.

10. The interface system as recited in claim 1, further comprising an application for updating an internal transaction table in the telephone data repository to reflect current status of processed data messages.

11. The interface system as recited in claim 1, wherein the interface is further configured to recover unprocessed data messages from the telephone data repository.

12. The interface system as recited in claim 1, wherein the interface is further configured to perform read and write operations on a plurality of interface sockets communicably coupled to the telephone data repository.

13. The interface system as recited in claim 1, and further comprising a plurality of second communications links connecting the interface to a plurality of differing external systems each having a differing format for said plurality of telephone data.

14. An interface system that allows a telephone data repository to communicate with a separate external system, the interface system comprising:

a first communications link connecting an interface to the external system;

a second communications link connecting the interface to a data distribution subsystem;

a third communications link connecting the data distribution subsystem to the telephone data repository; and the interface configured to retrieve a plurality of telephone data from the telephone data repository via the first communications link, format the plurality of telephone data into a plurality of formatted telephone data that is compatible with the external system, and to send the plurality of formatted telephone data to the external system via the second communications link, wherein the plurality of telephone data includes a plurality of activated telephone numbers, a plurality of deactivated telephone numbers, and a plurality of local number portability requests.

15. The interface system as recited in claim 14, wherein the external system is a Metro Intelligent Network Administration Service Management System.

16. The interface system as recited in claim 14, wherein the external system is a Network Control System.

17. The interface system as recited in claim 14, wherein the external system is a Provisions Voice Network.

18. The interface system as recited in claim 14, wherein the plurality of telephone data comprises a plurality of telephone porting data defining how to route a call from a first service provider to a second service provider.

19. The interface system as recited in claim 14, wherein the plurality of telephone data comprises:

a plurality of telephone network data; and a plurality of subscription information.

20. The interface system as recited in claim 14, wherein the plurality of telephone data further comprises:

a plurality of modified telephone numbers.

21. The interface system as recited in claim 14, further comprising an application for updating an internal transaction table in the telephone data repository to reflect current status of processed data messages.

22. The interface system as recited in claim 14, wherein the interface is further configured to recover unprocessed data messages from the telephone data repository.

23. The interface system as recited in claim 14, wherein the interface is further configured to perform read and write operations on a plurality of interface sockets communicably coupled to the telephone data repository.

24. The interface system as recited in claim 14, and further comprising a plurality of second communications links connecting the interface to a plurality of differing external systems each having a differing format for said plurality of telephone data.

25. A method that allows a telephone data repository to communicate with a separate external system, said method comprising:

connecting to the telephone data repository via a first communications link;

connecting the external system via a second communications link;

retrieving a plurality of telephone data from the telephone data repository via the first communications link;

formatting the plurality of telephone data into a plurality of formatted telephone data that is compatible with the external system; and sending the plurality of formatted telephone data to the external system via the second communications link, wherein the plurality of telephone data includes a plurality of activated telephone numbers, a plurality of deactivated telephone numbers, and a plurality of local number portability requests.

26. The method as recited in claim 25, wherein:

connecting the external system comprises connecting a plurality of differing external systems via a corresponding plurality of second communications links; and formatting the plurality of telephone data comprises formatting said plurality of telephone data into a plurality of differing formats that are each compatible with a respective one of the plurality of differing external systems.

27. An interface for communicating telephone data between a telephone data repository and a separate external system, said interface comprising:

means for retrieving a plurality of telephone data from the telephone data repository via the first communications link;

means for formatting the plurality of telephone data into a plurality of formatted telephone data compatible with the external system; and means for sending the plurality of formatted telephone data to the external system via a second communications link, wherein the plurality of telephone data comprises a plurality of telephone porting data defining how to route a call from a first service provider to a second service provider, wherein the plurality of telephone data includes a plurality of activated telephone numbers, a plurality of deactivated telephone numbers, and a plurality of local number portability requests.

28. The interface system as recited in claim 27, wherein said interface is connected to a plurality of external systems by a corresponding plurality of second communications links, wherein:

said means for formatting comprises means for formatting said plurality of telephone data into a plurality of differing formats; and said means for sending comprises means for sending said plurality of telephone data to said plurality of external systems in said plurality of differing formats.

* * * * *